United States Patent

Haney et al.

[15] 3,702,988

[45] Nov. 14, 1972

[54] DIGITAL PROCESSOR

[72] Inventors: Ralph D. Haney; James E. Zachar, both of Dayton; Charles J. Drozd, Centerville, all of Ohio

[73] Assignee: The National Cash Register Company, Dayton, Ohio

[22] Filed: Sept. 14, 1970

[21] Appl. No.: 72,084

[52] U.S. Cl. ............................................340/172.5

[51] Int. Cl. ............................................G06f 7/48

[58] Field of Search ....................................340/172.5

[56] References Cited

UNITED STATES PATENTS

| | | | |
|---|---|---|---|
| 3,315,235 | 4/1967 | Carnevale et al. | 340/172.5 |
| 3,579,201 | 5/1971 | Langley | 340/172.5 |
| 3,391,394 | 7/1968 | Ottaway | 340/172.5 |
| 3,440,618 | 4/1969 | Chinlund | 340/172.5 |
| 3,480,914 | 11/1969 | Schlaeppi | 340/172.5 |

*Primary Examiner*—Paul J. Henon
*Assistant Examiner*—Ronald F. Chapuran
*Attorney*—Louis A. Kline, John J. Callahan and Harry W. Barron

[57] ABSTRACT

A digital processor built entirely of metal-oxide semiconductor devices constructed on integrated circuits by large-scale integration techniques is shown. The processor includes a read-only memory means which provides a series of coded instruction signals in a serial-by-bit manner to a memory buss line. A plurality of logic circuits is coupled to the memory buss line, and each responds to selected ones of the instruction signals to perform a certain operation. There is also provided a plurality of registers which can be used in processing information.

31 Claims, 23 Drawing Figures

| | | | |
|---|---|---|---|
| 16D | 16C | 16B | 16A |
| 16E | 16F | 16G | 16H |

INVENTORS
RALPH D. HANEY
JAMES E. ZACHAR &
CHARLES J. DROZD

BY Louis A Kline
John J. Callahan
Harry W Barron
THEIR ATTORNEYS

INVENTORS
RALPH D. HANEY
JAMES E. ZACHAR &
CHARLES J. DROZD
BY
Louis A. Kline
John J. Callahan
Harry W. Barron
THEIR ATTORNEYS

INVENTORS
RALPH D. HANEY
JAMES E. ZACHAR &
CHARLES J. DROZD

BY Louis A. Kline
John J. Callahan
[signature]
THEIR ATTORNEYS

INVENTORS
RALPH D. HANEY
JAMES E. ZACHAR &
CHARLES J. DROZD
BY
Louis A. Kline
John J. Callahan
Harry W Barron
THEIR ATTORNEYS INVENTORS
RALPH D. HANEY
JAMES E. ZACHAR &
CHARLES J. DROZD
BY
Louis A. Kline
John J. Callahan
Harry W. Barron
THEIR ATTORNEYS

INVENTORS
RALPH D. HANEY
JAMES E. ZACHAR &
CHARLES J. DROZD

BY Louis A. Kline
John J. Callahan
Harris C. Bauer
THEIR ATTORNEYS

INVENTORS
RALPH D. HANEY
JAMES E. ZACHAR &
CHARLES J. DROZD

BY

Louis A. Kline
John J. Callahan
Harold D. Barron
THEIR ATTORNEYS

INVENTORS
RALPH D. HANEY
JAMES E. ZACHAR &
CHARLES J. DROZD

BY Louis A. Kline
John J. Callahan
Harry W. Barron
THEIR ATTORNEYS

PATENTED NOV 14 1972 3,702,988

SHEET 09 OF 11

INVENTORS
RALPH D. HANEY
JAMES E. ZACHAR &
CHARLES J. DROZD

BY

THEIR ATTORNEYS

PATENTED NOV 14 1972 3,702,988

INVENTORS
RALPH D. HANEY
JAMES E. ZACHAR &
CHARLES J. DROZD

BY Louis A. Kline
John J. Callahan
Harry W. Barron
THEIR ATTORNEYS

INVENTORS
RALPH D. HANEY,
JAMES E. ZACHAR &
CHARLES J. DROZD

BY Louis A. Kline
John J. Callahan
Harry W. Barron
THEIR ATTORNEYS

DIGITAL PROCESSOR

This invention relates to a digital processor and, more particularly, to a digital processor constructed essentially entirely of metal-oxide semiconductor integrated circuits for use in an operation requiring a processor of this type.

Modern digital computer technology seems to be striving towards highly sophisticated high speed, low access time digital processors. For many applications, the requirement for high speed is necessary, and the cost of the processor bears a minor consideration. However, in certain applications, the speed of the processor is relatively immaterial, and cost is a major factor. Such a system, for instance, could be a commercial terminal for use, for instance, as a retail point-of-entry terminal (cash register) in a department store, or a bank teller's terminal for use in a financial institution. In these types of terminals, the transaction is still limited by the speed at which a human being can operate the terminal. In this case, it matters little whether the processor can add two numbers in ten nanoseconds or whether it takes a millisecond to add these numbers, since the operator's capability of entering the information is much slower than either of these two times.

The other consideration involved in this type of terminal, as previously mentioned, is the cost. Where one wishes to use a digital processor as part of such a terminal, it is necessary to make the cost of this type of terminal relatively competitive in price; that is, the added advantages which may be derived from using a digital processor as the heart of the terminal must not be gained at the expense of so much cost that it becomes impractical or inefficient for a prospective purchaser to purchase one of these terminals.

One good way to reduce the cost and the size of any digital system is through the use of four-phase metal-oxide semiconductor (MOS) large scale integration (LSI) integrated circuits. On a given substrate of silicon, one may construct, by MOS LSI techniques, hundreds or thousands of different MOS transistor elements which operate as switches. Thus one may build a digital processor using the four-phase MOS LSI techniques on, for instance, twenty or thirty integrated circuits. The drawback when MOS integrated circuits are used is that they are relatively slow when compared to, for instance, transistor-transistor logic type integrated circuits. However, as previously mentioned, in certain applications speed is a relatively minor factor, and economy is the major consideration.

In accordance with this invention, there is provided a digital processor comprising read-only memory means for providing a serial sequence of instruction signals in a serial-by-bit manner to a memory buss. There is further provided a plurality of storage registers, each of which can assume a condition manifesting the storage thereby of at least one character of information. Each of the storage registers is capable of being selected to provide a signal indicative of a stored character of information in a serial-by-bit manner to at least one of either a destination buss or an origin buss. Each of the storage registers further is capable of being selected to be responsive to a signal appearing on an arithmetic buss. The digital processor further includes register selection means responsive to certain first ones of the instruction signals for selecting at least one of (1) a register to provide signals to the origin buss, (2) a register to provide signals to the destination buss, or (3) at least one register which responds to the signals on the arithmetic buss. One of the registers further has associated therewith logic means responsive to certain second ones of the instruction signals appearing on the memory buss to affect the condition of that register and responsive to certain other of the instruction signals to provide signals to the read-only memory means indicating the condition of that register.

A detailed description of the digital processor is hereinafter given with reference being made to the following figures, in which.

Figures 1, 15:
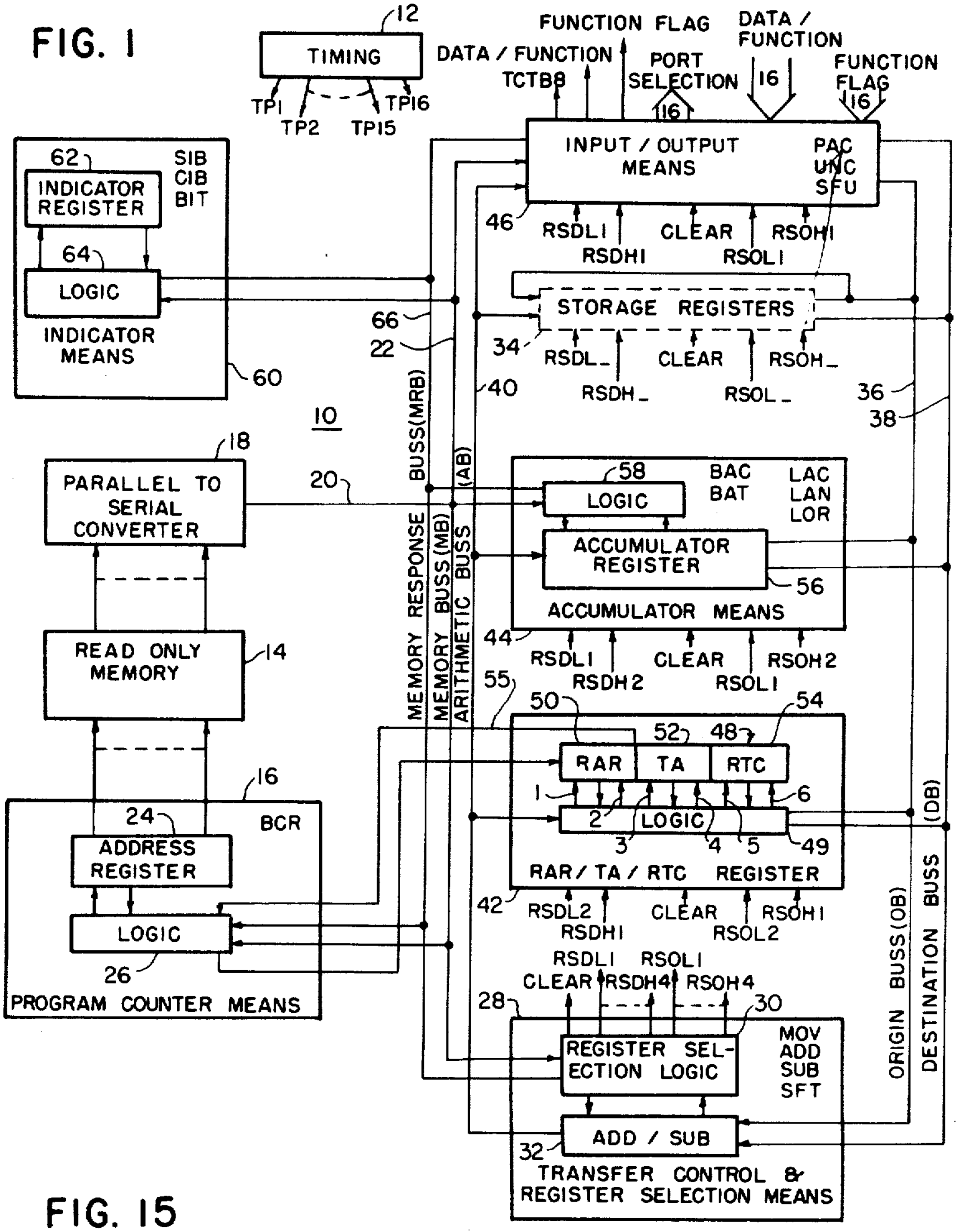
FIG. 1 is a general block diagram of the digital processor.
Figures 13, 14:
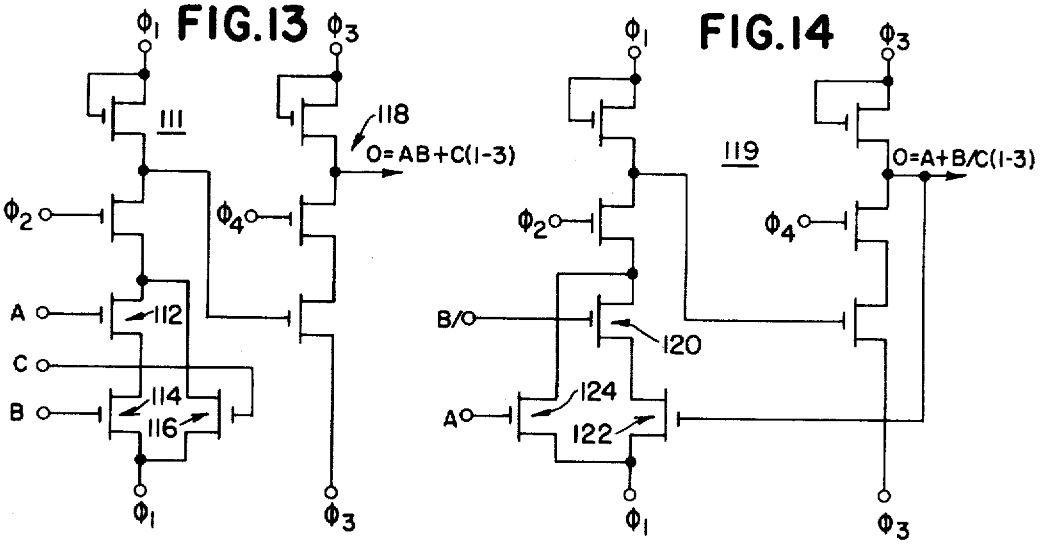
Figure 12:
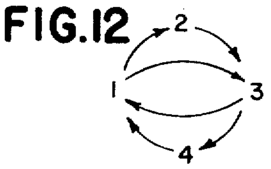

FIGS. 3 to 7 inclusive show various formats which the instruction signals of the digital processor can have;

FIGS. 8 through 11 illustrate, respectively, a one-gate, a two-gate, a three-gate, and a four-gate which are the basic building blocks of the logic circuitry used in the digital processor;

FIG. 12 is a diagram illustrating which gate can apply signals to or receive signals from which other gate;

FIG. 13 illustrates one stage of a shift register using four-phase MOS logic;

FIG. 14 illustrates a flip-flop latch circuit using four-phase MOS logic;

FIG. 15 shows how FIGS. 16 should be placed together; and

FIGS. 16A through 16H, when placed together, illustrate a more detailed diagram of the digital processor shown in FIG. 1.

Referring now to FIG. 1, there is shown a general block diagram of a digital processor 10 constructed in accordance with this invention. The digital processor 10 operates on a 16-bit periodic cycle, and a timing network 12 provides sixteen separate timing signals, TP1 through TP16. During the time, for instance, between TP1 and TP2, four separate signals are provided having four different phases of operation.

Figure 2:
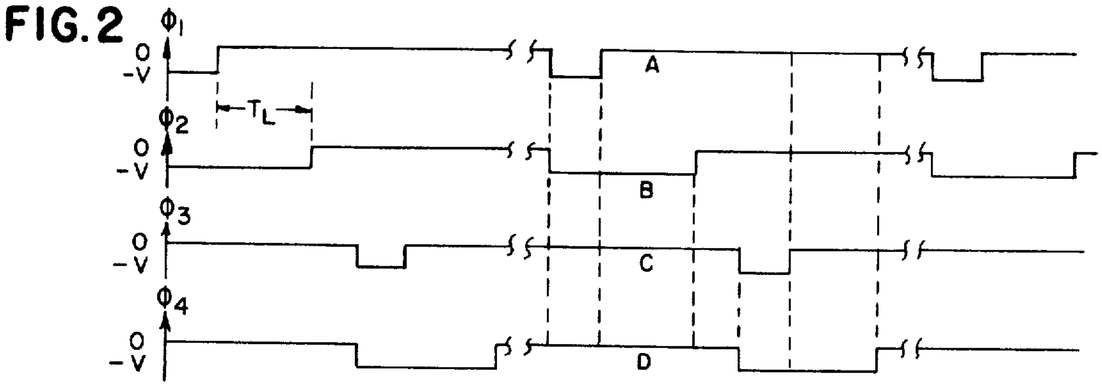
FIG. 2 is a series of waveforms illustrating the four-phase signals used in operating the various circuits included in the processor.

The four phases of operation are illustrated in FIG. 2 and are respectively designated $\phi_1$, $\phi_2$, $\phi_3$, and $\phi_4$. The $\phi_1$ and $\phi_3$ signals are applied to each integrated circuit, and means internal on each integrated circuit will generate the $\phi_2$ and $\phi_4$ pulses from the respectively applied $\phi_1$ and $\phi_3$ pulses. In addition, the necessary TP1–TP16 clock pulses are provided to each integrated circuit, and each of these corresponds to the time between $\phi_1$ signals.

Referring specifically to FIG. 2A, it is seen that the $\phi_1$ pulse is a relatively short pulse, and it occurs once each cycle of operation of the digital processor 10. The $\phi_2$ pulse is a longer-duration clock pulse than the $\phi_1$ pulse. $\phi_3$ is another shorter clock pulse, and $\phi_4$ is a longer-duration clock pulse. The leading edges of the $\phi_1$ and $\phi_2$ pulses occur together, as do the leading edges of $\phi_3$ and $\phi_4$ pulses. However, the trailing edges of each of the $\phi_1$, $\phi_2$, $\phi_3$, and $\phi_4$ clock pulses occur at different times; hence the term "four-phase."

Referring again to FIG. 1, the heart of the digital processor 10 is the read-only memory 14. This memory is a 4,096 word by 12-bit read-only memory. Thus, the memory can store 4,096 12-bit characters, each of which may be an instruction or a portion of an instruction for operating the digital processor 10. The read-only memory 14 is built entirely of MOS semiconductor devices, and it is programmed during manufacture. Where a logical "1" binary digit (bit) is to be used, a transistor is provided in a matrix which can be made to act as a short circuit, and, where a logical "0" bit is to be used, an open circuit is left.

The read-only memory 14, on command of signals applied thereto from the program counter means 16, will apply, in parallel, a series of signals indicating either logical "1" bits or logical "0" bits to the parallel-to serial converter 18. The parallel-to-serial converter 18 will apply the parallel instruction signal applied from the read-only memory 14 as a serial signal to the line 20 and from there to a memory buss 22. From the memory buss 22, the serial instruction is applied to each of several other units, which will be described hereinafter, by bussing techniques.

As previously mentioned, the location of any given instruction which can be provided by the read-only memory 14 is determined by the program counter means 16. The program counter means 16 includes an address register 24 and logic circuitry 26. The address register 24 includes a counter which will have any count therein between zero and 4,095. The particular count of the counter included in the address register 24 will determine the location in the read-only memory 14 which is to provide the instruction signal to the parallel-to-serial converter 18. For instance, if the count in the counter of the address register 24 indicates the number 1,029, then the instruction in the read-only memory 14 which is located in location 1,029 will be provided as the output of the read-only memory 14. The counter in the address register 24 is of the type which, unless otherwise signaled, will increment itself by "one" once each cycle. That is, after the 16 TP timing signals of any given cycle have been provided from the timing network 12, the counter in the address register 24 will increase its count by "one."

However, the counter in the address register 24 is also capable, on proper signals applied thereto from the logic circuit 26, of increasing its count by a non-incremental amount. This feature is necessary for branching of the program stored in the read-only memory 14 to take place; that is, so that the program can go from, for instance, the main program to a subroutine to accomplish a certain function and then back to the main program. The purpose of this, of course, is to keep the size of the read-only memory from becoming too large. Further, the counter in the address register 24 must be capable of holding a count for more than one cycle where the time required to execute an instruction is greater than one cycle.

Before referring to the remaining portions of the digital processor 10, it will be advantageous to describe the types of instructions which are provided from the read-only memory 14. For this, reference is made to FIGS. 3 through 7, where diagrams show the five different formats of the instruction words which may be provided by the read-only memory 14.

Figure 3:
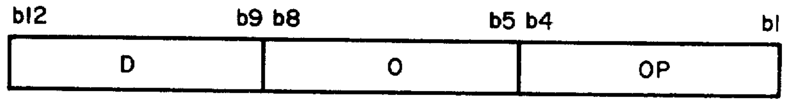

FIG. 3 shows the DOOP instruction format. This is a 12-bit instruction word in which bits *b*1 through *b*4 contain a four-bit operation code (OP) indicating which particular type of instruction this is. Bits *b*5 through *b*8 are a four-bit origin code (O) designating a certain register as an origin register, and bits *b*9 through *b*12 are a four-bit destination code (D) designating one of the registers as a destination register.

Figure 4:
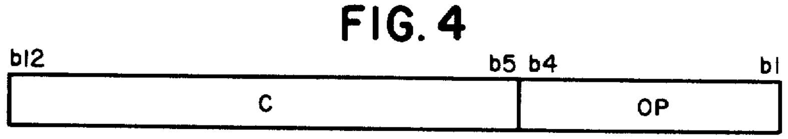

FIG. 4 shows the COP instruction format. Here, again, bits *b*1 through *b*4 are a four-bit operation code (OP) designating the particular type of COP instruction, and bits *b*5 through *b*12 in this instruction form an eight-bit coded constant (C) which is used in processing the instruction.

Figure 5:
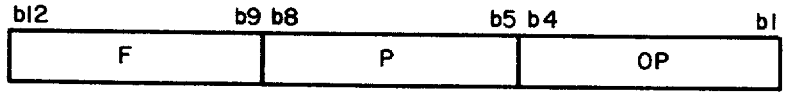

FIG. 5 shows the FPOP instruction format, and, again, bits *b*1 through *b*4 thereof are a four-bit operation code (OP) determining which type of FPOP instruction is involved. Bits *b*5 through *b*8 are a four-bit port code (P) designating one of 16 ports, and bits *b*9 through b12 are a four-bit function code (F) which designates a particular function to be sent to the port designated in bits *b*5 through *b*8.

Figure 6:
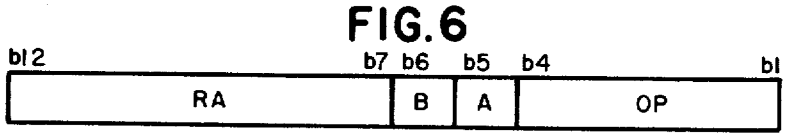

FIG. 6 shows the RAOP instruction format, and, again, bits *b*1 through *b*4 form a four-bit operation code (OP) indicating the particular type of RAOP instruction. Bits *b*5 and *b*6, respectively, are a two-bit constant (AB) which may designate a subinstruction to the instruction designated by the four-bit code. Bits *b*7 through *b*12 indicate a six-bit constant code (RA) which may be anywhere between plus or minus 31. If bit *b*12 of this RA constant number is logical "0," the RA number is a positive number and defined by bits *b*7 through *b*11; if bit *b*12 of the RA constant number is a logical "1" bit, then bits *b*7 through *b*11 define the complement of the negative number of the RA constant.

Figure 7:
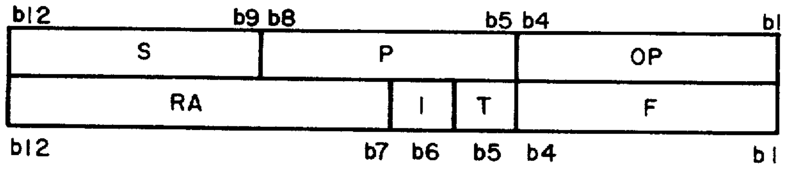

FIG. 7 shows the SPOP instruction format. This instruction is a two-character instruction. Bits *b*1 through *b*4 of the first character are the operation code (OP) of the particular type of SPOP instruction. Bits *b*5 through *b*8 are a four-bit port code (P) designating one of the 16 ports of the digital processor 10. Bits *b*9 through *b*12 of the first character are a four-bit status code (S) designating a particular status which could be applied to the digital processor 10 by the port selected by bits *b*5 through *b*8. In the second character, bits *b*1 through *b*4 are a four-bit function code (F) which designates a particular function which can be sent to the port designated by bits *b*5 through *b*8 of the first character. Bits *b*5 and *b*6 of the second character are a two-bit code (IT) which designates a subinstruction of the instruction defined by the OP code in bits *b*1 through *b*4 of the first character. Bits *b*7 through *b*12 of the second character form a coded RA constant of plus or minus 31 and are similar to bits *b*7 through *b*12 shown in the RAOP instruction in FIG. 6.

The COP and RAOP instruction formats shown in FIGS. 4 and 6, respectively, may have a second character associated with them. This second character will be a 12-bit address of a location to which a branch in the program is to be made.

Since the operation code OP of each of the five instruction formats shown respectively in FIGS. 3 through 7 is four bits, there are sixteen possible main instructions which can be responded to by circuitry in the digital processor 10. In addition to these 16 main instructions, the RAOP and SPOP instruction formats, shown in FIGS. 6 and 7, indicate that an instruction of this format can have four subinstructions. Table I is set out below, giving the sixteen main instructions of the digital processor 10 and the various subinstructions associated with each of the main instructions. It should be noted that, in the case of the DOOP type of instruction, there are subinstructions for the cases where the D and the O codes are not equal to zero and for the cases where the D and the O codes are both equal to zero. The significance of this will be described hereinafter.

each be unique to one of 16 possible registers which may be selected. Thereafter, the MOV, ADD, SUB, or SFT function will be performed.

In the digital processor 10, there are three special types of registers which are included, and there are from zero to thirteen storage registers 34 which may be selected. The number of storage registers 34 is dependent on the particular use to which the digital processor 10 will be put. Each of the storage registers 34 in turn may be one or more characters in size, where a character is defined as eight binary bits.

TABLE I

| | Main instruction | Sub instruction | Code | Type | Operation |
|---|---|---|---|---|---|
| 1 | PAC | | 0000 | COP | |
| | | PAL | C=1 | | (AC)→Port Address Reg; Hold port on Release Port Address. |
| | | PAR | C=2 | | |
| 2 | CIB | | 0001 | COP | (IND)ıC→IND. |
| 3 | MOV | ............ | 0010 | DOOP | |
| | | D,O≠O | | | (Ro)N→(Rd)1, AC, (Ro)1. |
| | | D,O=O | | | (AC)→DO; (Ro)N→(Rd)1, AC, (Ro)1. |
| 4 | BAC | | 0011 | COP | If (AC)=C, Branch; otherwise continue. |
| 5 | LAC | | 0100 | COP | C→AC. |
| 6 | SIB | | 0101 | COP | (IND + C→IND. |
| 7 | ADD | | 0110 | DOOP | |
| | | D,O≠O | | | (Rd)N + (Ro)N→(Rd)1, AC; (Ro)N→(Ro)1. |
| | | D,O=O | | | (AC)→DO; (Rd)N + (Ro)N→(Ro)1, AC; (Ro)N→(Ro)1. |
| 8 | BAT | | 0111 | COP | If for all Ci="1", (AC)i="1", Branch; otherwise continue. |
| 9 | LOR | | 1000 | COP | (AC) + C→AC. |
| 10 | SFU | | 1001 | FPOP | Issue function F on Port P. |
| 11 | SUB | | 1010 | DOOP | |
| | | D,O≠O | | | (Rd)N − (Ro)N→(Rd)1, AC; (Ro)N→(Ro)1. |
| | | D,O=O | | | (AC)→DO; (Rd)N→(Ro)N→(Rd)1, AC; (Ro)N→(Ro)1. |
| 12 | BIT | | 1011 | COP | If for all Ci="1", (IND)i="1", Branch; otherwise continue. |
| 13 | LAN | | 1100 | COP | (AC)·C→AC. |
| 14 | UNC | | 1101 | SPOP | |
| | | FFB | IT=11 | | If US≠S, Send F on P; Otherwise Branch by RA. |
| | | FTB | IT=10 | | If US=S, Send F on P; Otherwise Branch by RA. |
| | | BSF | IT=00 | | If US≠S, Branch by RA; Otherwise Continue. |
| | | BST | IT=01 | | If US=S, Branch by RA; Otherwise Contiuue. |
| 15 | SFT | | 1110 | DOOP | |
| | | SFT | D,O≠O | | (Ro)j→(Ro)j+1; (Ro)N→(Ro)1. |
| | | SFT | D,O=O | | (AC)→DO; (Ro)j→(Ro)j+1; (Ro)N→(Ro)1. |
| | | CLR | D=OO≠O | | O→Ro. |
| | | CLR | D,O=O | (AC) | DO(D=O); O→Ro. |
| 16 | BCR | | 1111 | RAOP | |
| | | BUC | AB=01 | | (PC) + RA→PC. |
| | | BSR | AB=11 | | (PC) + 1→RAR; INST + 1→PC. |
| | | BIR | AB=00 | | RAR + RA→PC. |
| | | BIS | AB=10 | | PC→RAR; RAR + RA→PC. |

The digital processor 10 includes a plurality of different types of registers, from which and to which information flows in the form of eight-bit coded character signals. The registers may be selected in response to signals provided from transfer control and register selection means 28, which includes register selection logic 30 and an ADD/SUB circuit 32. The transfer control and register selection means 28 will respond to the MOV, the ADD, the SUB, and the SFT signals, all of which are of the DOOP type shown in FIG. 3. The register selection logic 30 will decode the OP code in bits *b*1 through *b*4 of the particular instruction signal applied thereto to determine whether it is a MOV, an ADD, a SUB, or a SFT instruction.

Once the particular type of instruction is determined, then the D code and the 0 code of the instruction signal are decoded, and signals are respectively applied on lines RSDL1 through RSDH4 and RSOL1 through RSOH4. These lines are connected to each of the registers in the terminal which may be selected. A signal will appear on one of the RSDL1 through RSDL4 lines and one of the RSDH1 through RSDH4 lines, and on one of the RSOL1 through RSOL4 lines and one of the RSOH1 through RSOH4 lines. The two RSOL and RSOH signals and the two RSDL and RSDH signals will Each of the storage registers 34 will have two outputs to which the most significant positioned character may be applied serial by bit, least significant bit first. One of the outputs is connected to an origin buss 36, and the other output is connected to a destination buss 38. If the register selection logic 30 selects the register as an origin register by causing the RSOL and RSOH lines coupled to the register to be high, then any character which is transferred out of that register will be applied to the origin buss 36. On the other hand, if the register selection logic 30 selects the storage register as a destination register by causing the RSDL and RSDH lines coupled to the register to be high, any character which is transferred therefrom will be applied to the destination buss 38.

In the storage registers 34, the origin buss output of the register is coupled back as one input to the register. Thus, whenever the register is selected as an origin register, the output applied to the origin buss 36 is also applied to the input of the register and becomes the least significant character thereof. The storage registers 34 act, in this event, as a circular shift register. That is, when a character is provided to the origin buss 36, each of the remaining characters is increased in significance one position, and the character applied to the origin buss 36 is placed in the least significant character position of the register.

A second input of each of the storage registers 34 is coupled to an arithmetic buss 40, which is also coupled to the output of the ADD/SUB circuit 32. The storage register 34 which is selected as a destination register will respond to the signal appearing on the arithmetic buss 40 by storing, in the least significant character position thereof, the information manifested by that signal.

The origin buss 36 and the destination buss 38 are coupled as the two inputs to the ADD/SUB circuit 32. This circuit, in response to signals from the register selection logic 30, will perform either an addition, a subtraction, or a transfer of the information appearing on the origin and destination busses 36 and 38, to the arithmetic buss 40.

In addition to the storage registers 34 in the digital processor 10, there are also three special registers. These include the RAR/TA/RTC register means 42, the accumulator means 44, and an input buffer (not shown in FIG. 1) included in the input/output means 46. Each of these registers also may be selected as either an origin register or a destination register in response to the signals provided by the register selection logic 30.

The RAR/TA/RTC register means 42 includes a six-character RAR/TA/RTC register 48 and logic circuitry 49. The register 48 is not a shift register — in fact, two of the characters which can be provided thereby are not even stored in shift registers at all but merely are provided by a series of flip-flops.

The RAR/TA/RTC register 48 includes a two-character shift register called the RAR register 50; a two-character non-shift register called the TA register 52, which can provide two constant-value character signals on proper command; and a two-character shift register called the RTC register 54. There is no transfer from any one of the RAR register 50, TA register 52, or RTC register 54 to any other one of these registers.

Where the information from any one of the RAR register 50, TA register 52, or RTC register 54 is desired to be obtained, a signal is provided thereto from the logic circuit 49, indicating which of the characters and which of the registers is to be applied to the proper place. The two character positions of the RAR register 50 are designated the sixth and the fifth characters of the RAR/TA/RTC register 48; the two characters of the TA register 52 are the fourth and the third characters; and the two characters of the RTC register 54 are the second and the first characters.

A pointer line 1–6 is connected to each character of each register in the RAR/TA/RTC register 48 from the logic circuit 49. If the most significant character of the RAR register 50 is desired, then a signal on the pointer line 1, which is coupled to the sixth character position, will be on, and the remaining pointer line signals will be off. This will cause the most significant character of the RAR register 50 to be applied to the proper place. Similarly, if the least significant character of the TA register 52 is desired, then the pointer line 4 signal will be on, and the remaining five pointer line signals will be off; therefore, the least significant character of the TA register 52 will be applied to the proper place.

The registers respond to the pointer line 1–6 signals by applying signals indicating their stored contents back to the logic circuit 49, and, from there, they can be applied to either the origin buss 36 or the destination buss 38.

The two character positions of the RAR register 50 can be used to store a 12-bit signal indicating an address for the read-only memory 14. The twelve bits are stored as follows: bits *b*1 through *b*8 are stored in the least significant character position of the RAR register 50, and bits *b*9 through *b*12 are stored in the four least significant bit positions of the most significant character of the RAR register 50. The four most significant bit positions of the most significant character of the RAR register 50 are not used. Upon proper command, the RAR register 50 will shift the twelve bits stored therein over the line 55 to the program counter means 16 and have them inserted as the address in the address register 24. The RAR register 50 may also be used as a normal two-character storage register, and, for this usage, it can apply signals through the logic circuit 49 to either the origin buss 36 or the destination buss 38, and it can respond to signals appearing on the arithmetic buss 40 which are applied thereto through the logic circuit 49.

The TA register 52 can be used as a terminal address register. This register is not a shift register but is merely a series of flip-flops which can provide 16 bits of non-programmable coded information. The TA register 52 can apply its coded information through the logic circuit 49 to either the origin buss 36 or the destination buss 38, depending on whether the RAR/TA/RTC register 48 is selected as an origin register or a destination register. It is not responsive to any signals appearing on the arithmetic buss 40.

The RTC register 54 can be used as a real-time clock counter for counting a certain time; for instance, where a short wait is desired. It is a two-character, and therefore a 16-bit, shift register, so it may count a time up to $2^{16}$ — one times the 16-bit cycle of the digital processor 10. The RTC register 54 will respond to a signal appearing on the arithmetic buss 40 which is applied thereto through the logic circuit 49. Once each cycle, the count in the RTC register 54 will be decreased by "one" until it reaches zero. Periodic sampling of the RTC register 54 will be necessary to determine when the count therein is zero.

The accumulator means 44 includes a one-character accumulator register 56 and associated logic circuitry 58. The accumulator register 56 can be selected as either origin or destination by the register selection logic 30. Further, the accumulator register 56 will always be selected as a destination register whenever a MOV, ADD, OR SUB instruction signal is provided to the memory buss 22 and detected by the register selection logic 30. Thus, where information is moved from one of the storage registers 34 to another one of the storage registers 34, for instance, the information will also be applied to the accumulator register 56. The advantage of always selecting the accumulator register 56 as responsive to the arithmetic buss 40 signal is that instructions in the read-only memory 14 may be conserved; for instance, where one wishes to move a character from one register to another register and thereafter to check the character in the accumulator to determine its value, it may require several instructions — first to move it to the register, then to shift the register, then to move it to the accumulator and shift the registers again, and then to check the character. However, under the present setup, one may merely move the character to the register, and it is automatically placed in the accumulator, ready for checking.

The logic 58 portion of the accumulator means 44 is designed to be able to detect OP codes indicating the BAC, the BAT, the LAC, the LAN, and the LOR instructions. The exact operation when these instructions are detected will be described hereinafter.

The final register which may be selected by the register selection logic 30 is an input/output buffer register (not shown in FIG. 1) which is included as part of the input/output means 46. This register is used for buffering data applied to the digital processor 10 from one of the sixteen peripheral units which may be connected to the sixteen ports thereof. The information in the buffer register may be either data information or status information applied from the particular port. The information is applied to this buffer register only in response to a certain instruction.

Logic means (not shown in FIG. 1) are included in the input/output means 46 and cause the input/output means 46 to respond to the OP codes of the PAC, the UNC, and the SFU instruction signals applied to the memory buss 22. The output of the buffer register in the input/output means 46 is connected to the origin buss 36 and the destination buss 48.

Another register which is included in the digital processor 10, but one which is not under the control of the register selection logic 30, is the indicator means 60. The indicator means 60 includes a single character indicator register 62 and associated logic 64. The indicator means 60 is responsive to the SIB, the CIB, and the BIT instruction signals applied thereto from the memory buss 22. The SIB instruction signal can be used to cause one or more of the bits in the indicator register 62 to go from a logical "0" to a logical "1," and the CIB instruction signal can be used to cause one or more of the bits in the indicator register 62 to go from a logical "1" to a logical "0." The BIT instruction signal can be used to test the value of one or more bits in the indicator register 62 and to thereafter branch or continue the program in response to the results of the BIT test.

The program counter means 16 is responsive to the OP code for the BCR instruction provided on the memory buss 22.

There is further provided a memory response buss 66, which receives signals from the indicator means 60, from the input/output means 46, from the accumulator means 44, and from the transfer control and register selection means 32, and thereafter applies these signals to the logic circuit 26 in the program counter means 16. The signals applied to the memory response buss 22 are single pulse signals occurring at a given time in the TP1 through TP16 cycle of operation. The response of the program counter means 16 to the signal appearing on the memory response buss 66 is determined by the time at which the pulse is applied to the memory response buss 66.

With the above general description of the digital processor 10 in mind, a brief description of each of the sixteen basic instructions and the variations of these instructions will now be given. This description will be given with respect to the functional response of the various different means of the instructions. The detailed response of the means itself is given hereinafter. For an easier understanding of this description, reference should be made to Table I, previously given.

First, the MOV, ADD, SUB, and SFT instructions, to which the transfer control and register selection means 28 is responsive, will be considered. Each of these four instructions is of the DOOP format which is shown in FIG. 3; that is, they have a four-bit D code indicating a register to be selected as a designation register, a four-bit 0 code indicating a register to be selected as an origin register, and a four-bit OP code indicating which of the four instructions is then being applied to the register selection logic from the memory buss 22.

For each of these four instructions, means are included in the register selection logic 30 for detecting a situation where all four bits of both the D code and the 0 code of the instruction are logical "0." If this situation is detected, then the eight bits which are then being stored in the accumulator register 56 are transferred to the register selection logic 30, and these will be processed by the register selection logic 30 as if they had been the eight bits in the D and the 0 portions of the instruction applied thereto from the memory buss 22. Under this option, the four least significant bits stored in the accumulator register 56 correspond to the origin register address, and the four most significant bits stored in the accumulator register 56 correspond to the destination register address.

On the assumption that the D and O codes of the instructions are non-zero, or, alternatively, assuming that the accumulator character had already been transferred to the register selection logic 30, a description of the operation involved for each of the MOV, ADD, SUB, and SFT instructions, to which the transfer control and register selection means 28 responds, will now be given. The MOV instruction is an instruction for moving a character from one selectable register to another selectable register. The character is moved from the most significant character position of the selected origin register and applied to the origin buss 36. At the same time, this character is circularly shifted and applied back to the input of the selected origin register into the least significant character position thereof. The character being transferred is applied from the origin buss 36 through the ADD/SUB circuit 32 and applied unchanged in content to the arithmetic buss 40. From there, it is applied into the accumulator register 56 and into the least significant character position of the selected destination register. The remaining characters in the selected destination register are increased in significance one position, with the most significant character previously stored disappearing.

Where the ADD instruction has been recognized by the register selection logic 30, the selected origin register will apply its most significant character to the origin buss 36 and, at the same time, to its least significant character position, while at the same time increasing the significance by one of each of its remaining characters. Similarly, the destination register will apply its most significant character to the destination buss 38 while increasing the significance of its other characters by one position. The ADD/SUB circuit will then respond to the character signals appearing on the origin buss 36 and the destination buss 38 by performing a binary addition of these characters and apply a signal manifesting the added sum to the arithmetic buss 40. The arithmetic buss 40 signal is then stored in the accumulator register 56 and the least significant character position of the selected destination register.

For the SUB instruction, the origin and destination registers are selected to apply their most significant characters to the origin buss 36 and the destination buss 38, and the binary value manifested by the character signal appearing on the origin buss 36 is subtracted from the binary value manifested by the character signal appearing on the destination buss 38 in the ADD/SUB circuit 32. A signal manifesting the binary difference is then applied to the arithmetic buss 40 to be stored in the accumulator register 56 and the lowest significant position of the selected destination.

The SFT instruction causes a circular shift to occur in the selected register. In the SFT instruction signal, the 0 code of the instruction designates the selected register, while the D code designates the number of shifts, by character position, which are to occur in the selected register. For instance, if the D code of the instruction applied to the register selection logic 30 from the memory buss 22 had been 0011 and the 0 code had been 0100, this would indicate to the register selection logic 30 that the register four is to have the characters therein circularly shifted three character positions upward; that is, the three most significant characters are shifted to the three least significant character positions, and all of the characters are increased three positions in significance.

Another version of the SFT command is in the event that only the D code of the instruction is binary zero. In this event, the SFT instruction will cause all of the characters stored in the selected register, as determined by the 0 code of the instruction, to become binary zero. Hence, this is a subinstruction of the SFT instruction which is designated as the CLR, or clear, subinstruction. When the CLR subinstruction is detected, a signal will appear on the CLEAR line from the register selection logic 30 and be applied to the selected origin register to clear that register (except for the ARITHMETIC register 48, as will be explained hereinafter).

The time required to perform the normal MOV, ADD, or SUB instructions is equal to one cycle of the timing network 12. If the D and 0 codes of the instruction are 0–0–0–0, then an additional cycle is required in order to move the contents of the accumulator register 56 to the register selection logic 30. For the SFT instruction, the time required to perform the instruction depends on the D code of the instruction (number of character positions shifted). If the D code is 0–0–0–0 (CLR instruction) or 0–0–0–1, then one cycle is needed; if the D code is 0–0–1–0 or 0–0–1–1, two cycles are needed; if the D code is 0–1–0–0 or 0–1–0–1, three cycles are needed, etc. If both the D code and the 0 code are 0–0–0–0, an additional cycle is required to transfer the contents of the accumulator register 56 to the register selection logic 30.

The register selection logic 30 will send a response over the memory response buss 66 after the instruction has been performed, instructing the program counter means 16 to cause the next sequential instruction from the read-only memory 14 to be read.

The accumulator means 44 responds to five instructions, which are the BAC, the BAT, the LAC, the LAN, and the LOR instructions. Each of these instructions are of the COP format; that is, there are an eight-bit C code defining a binary constant and a four-bit OP code designating the particular instruction.

The response of the logic 58 of the accumulator means 44 to the LAC instruction is to cause the constant designated by the C code of the instruction to be stored in the accumulator register 56. The LAN instruction will cause a logical AND to be performed between the accumulator register 56 stored character and the C code of the instruction, with the resultant being placed back into the accumulator register 56 as the new stored character thereof. Similarly, the LOR instruction will cause a logical OR to be performed between the accumulator register 56 character and the character defined by the C code of the instruction, with the resultant placed back in the accumulator register 56 as a new stored character.

For the LAC, the LAN, and the LOR instructions, the time required to perform the operation is equal to one cycle of the timing network 12, and the logic circuit 58 sends a response over the memory response buss 66 instructing the program counter means to read the next sequential instruction in the read-only memory 14.

The BAC and the BAT instructions will cause a branch of the program counter means 16 to occur under certain conditions. In the case of a BAC instruction, the branch is to occur if, for every logical "1" in the C code, there is a corresponding logical "1" in the accumulator register 56. If a branch is to occur for either of these instructions, the address of where the branch is to be made is given in the next sequential location of the read-only memory 14. If no branch is to occur, this next sequential location is meaningless, and the program should continue with the instruction found in the location following it.

If no branch is to occur, the logic circuit 58 applies a signal over the memory response buss 66 indicating that no absolute branch is to be taken. The program counter means 16 responds to this signal by allowing the counter in the address register 24 to increment itself one extra time before reading an instruction from the read-only memory 14. If a branch is to occur, the logic circuit 58 applies a signal over the memory response buss 66 indicating that an absolute branch is to occur. The program counter means 16 responds to this signal by causing the next read-only memory location to be read and placed on the memory buss 22. Thereafter, the program counter means places the code of the memory buss 22 signal in the address register 24 and reads the instruction at the location manifested by the memory buss 22 signal. The time required to perform a BAC or BAT instruction is two cycles of the timing network 12.

Logic (not shown) in the input/output means 46 will respond to the PAC, the UNC, and the SFU instructions appearing on the memory buss 22. From Table I, it is seen that the PAC instruction is of the COP type, as shown in FIG. 4, and that there are two subinstructions for the PAC instruction, which are the PAL and PAR subinstructions. The PAL subinstruction is recognized when the C code of the PAC instruction is a binary "1," or 0–0–0–0–0–0–0–1, and the PAR subinstruction is recognized when the C code of the PAC instruction is a binary "2," or 0–0–0–0–0–0–1–0. The occurrence of a PAL subinstruction will cause the acc umulator character to be transferred to the input/output means 46 to lock it on to the port defined by the four least significant bits of the accumulator character. In executing any subsequent instructions to the PAL subinstruction, any P codes in the instructions will be ignored, and all instructions will respond to the port which has been locked on by the PAL subinstruction signal. The PAR subinstruction, on the other hand, will release the locked-on port, so that normal operations can continue thereafter.

The PAC instructions require one cycle to be performed, and the response on the memory response buss 66 is to read the next instruction.

The next instruction to which the input/output means 46 will respond is the UNC instruction, which has the two character SPOP format shown in FIG. 7. This instruction, it should be recalled, is a two character instruction, and it has the IT code in bits *b5* and *b6* of the second character, indicating that four subinstructions of this main instruction can exist. These subinstructions are the FFB subinstruction, the FTB subinstruction, the BSF subinstruction, and the BST subinstruction.

After the OP code of the signal on the memory buss 22 is recognized as the first character of a UNC instruction, the input/output means 46 will cause the status signal, one of which is continually being applied to each of the sixteen ports of the digital processor 10, which is applied to the port defined by the P code of the first character, to be compared with the S code in the first character. If the S code of the first character is equal to the status code applied to the selected port of the input/output means 46, an equal compare flag is set; otherwise the flag is not set.

Thereafter, the second character of the instruction is applied to the memory buss 22, and the input/output means 46 responds to the IT code of the second character to determine which UNC subinstruction is involved. If the IT code is 1–1, then the FFB subinstruction is present and requires that, if the code of the status signal applied to the selected port is not equal to the S code, then the function signal defined in the F code of the second character is to be sent to the peripheral unit coupled to the selected port P. If the unit status code and the S code of the first character are equal, a branch by the RA constant should be made.

If the IT code is 1–0, then the FTB subinstruction is present. For this subinstruction, if the unit status code and the S code are the same, then the function signal defined by the F code should be sent to the selected port; otherwise a branch by the RA constant should be made. If the IT code is 0–0, then the BSF subinstruction is present, and this indicates that, if the unit status code and the S code of the instruction are unequal, a branch by RA should be made; otherwise, the program counter should increment itself by "one" and continue in the normal manner. Finally, if the IT code is 0–1, the BST subinstruction is present, and this indicates that, if the unit status code is equal to the S code of the instruction, a branch by RA should be made. Otherwise, the program counter should increment itself and continue in the normal manner.

The time required to perform any of the UNC subinstructions is two cycles of operation. The response which the input/output means applies to the memory response buss 66 for the first character of the UNC instruction will instruct the program counter means 16 to apply a signal to the memory buss 22 indicating the character stored in the next read-only memory 14 location and to instruct the other means in the digital processor 10 not to treat it as an instruction. After the second character of the UNC instruction is applied to the memory buss 22, the input/output means 46 sends a signal over the memory response buss which instructs the program counter means 16 to either take a relative branch and proceed with the program, or merely cause the next sequential instruction to be read from the read-only memory 14.

The third type of instruction to which the input/output means 46 responds is the SFU instruction, which is an instruction of the FPOP format shown in FIG. 5. This instruction, when detected by the input/output means 46, will cause a function signal having the F code of the instruction to be sent to the peripheral unit coupled to the port defined by the P code of the instruction. An example of where this instruction could be used would be to instruct the printer to print a character. The character could be subsequently sent, but the printer would place itself in a condition to receive that character and print the symbol defined by the character signal code subsequently sent.

The time required to perform the SFU instruction is one cycle of operation, and the signal applied to the memory response buss 66 instructs the program counter means 16 to cause the next sequential instruction in the read-only memory to be read.

The indicator means 60 will respond to the SIB, CIB, and BIT instruction signals applied thereto from the memory buss 22. Each of these three instructions has the COP format; that is, they have the four bit OP code, specifying which type of instruction, and the eight bit C code, which is an eight-bit constant.

The response by the logic 64 of the indicator means 60 to the SIB instruction is to cause a logical OR to be performed between the eight-bit character stored in the indicator register 62 and the eight bits in the C code of the instruction, with the resultant being stored in the indicator register 62. The response to the CIB instruction is to cause a logical AND to be performed between the eight-bit character stored in the indicator register 62 and the logical inversion of the eight bits of the C code of the instruction, with the resultant being stored in the indicator register 62.

The SIB instruction generally is used to set one or more of the bits in the indicator register 62 to a logical "1" state from a previous logical "0" state. This is done by having the C field contain a logical "1" in the position corresponding to the desired bit to be set. Therefore, the logical OR function would cause a logical "1" bit to be thereafter stored in the proper position of the indicator register 62. The CIB instruction is generally used to clear the indicator register of one or more logical "1" bits. In this case, the desired bits to be cleared would have a logical "1" in the "C" code of the instruction in the positions thereof corresponding to the bit or bits to be cleared. After the "C" code is logically inverted and the logical AND is performed, the result is a logical "0" replacing the previous logical "1."

The time required for the SIB and CIB instructions in one cycle of operation, and the response on the memory response buss 66 instructs the program counter means 16 to read the next instruction from the read-only memory 14.

A third signal to which the indicator means 60 responds is the BIT instruction. The logic circuit 64 of the indicator means 60 tests the contents of the indicator register 62 to see whether, for every logical "1" bit in the C code, there is a corresponding logical "1" bit in the indicator register 62. If the test is positive, a branch in the program to the location indicated by the contents of the next sequential location of the read-only memory 14 is required. If the results of the test are negative, the next character in the read-only memory 14 should be skipped, and the one following it should be read and treated as an instruction signal.

The response on the memory response buss 66 for the BIT instruction is the same as it was for the BAC and BAT instructions previously described. The time required to perform the BAT instruction is two cycles of operation.

The final one of the sixteen instructions which can be applied from the read-only memory 14 to the memory buss 22 is the BCR instruction, which is a branch instruction. This instruction is of the RAOP format shown in FIG. 6, and there are four subinstructions associated therewith, which depend on what the BA code is.

If the BA code is 1–0, the BUC subinstruction occurs and indicates that the address register 24 is to change its count by the RA factor. If the BA code is 1–1, the BSR subinstruction occurs. The response to the BSR subinstruction is for an absolute branch to be made and for the contents of the address register 24 to be modified to address the next sequential instruction of the read-only memory 14 and then stored in the RAR register 50, with the eight least significant bits of the address being stored in the least significant character of the RAR register 50 and the four most significant bits of the address to be stored in the four least significant bit positions of the most significant character of the RAR register 50. The logic circuit 26 will then respond to the next occurring signal applied to the memory buss 22 and cause the address register 24 to assume the count manifested by this signal. Thereafter, the read-only memory 14 will begin applying instruction signals from the branched-to address specified by the previously-mentioned following signal.

A third subinstruction of the BCR instruction is the BIR subinstruction, which occurs when the BA code is 0–0. The response of the program counter means 16 to the BIR subinstruction is to cause the contents of the RAR register 50 to be modified by the RA constant and, as modified, to be placed in the address register 24 as a new address thereof. This instruction can be used for returning the address register 24 to the main logic after it had been branched therefrom by the BSR subinstruction.

The final subinstruction of the BCR instruction is the BIS subinstruction, which occurs when the BA code is 0–1. The response to this instruction is to have the contents of the address register 24 modified to address the next sequential instruction of the read-only memory 14 and then stored in the RAR register 50, and to have the contents of the RAR register 50 modified by the RA constant and then stored in the address register 24 to become the new address of the address register 24.

The time required to perform the BCR instruction is two cycles of operation. The response on the memory response buss 66 for the BSR subinstruction instructs the program counter means to cause the next sequential location of the read-only memory to be read and applied to the memory buss 22 but not be treated as an instruction signal by the means responsive to instruction signals. The response on the memory response buss 66 for the BUC, the BIR, and the BIS subinstructions instructs the program counter means to adjust the count of the counter in the address register 24 by the RA constant and to proceed normally from the new address.

Before an understanding of the detailed diagram of the digital processor 10, shown in FIGS. 16A through 16H, can be had, a general understanding of four-phase MOS logic circuitry is necessary, since the detailed illustration in FIGS. 16A through 16H will consist of labeled blocks of logic for which equations and operation, but not detailed circuitry, will be given. The following description concerning FIGS. 8 through 13 will explain the circuits which may be constructed in response to the logical equations which will be given.

Figures 8, 9, 10, 11:
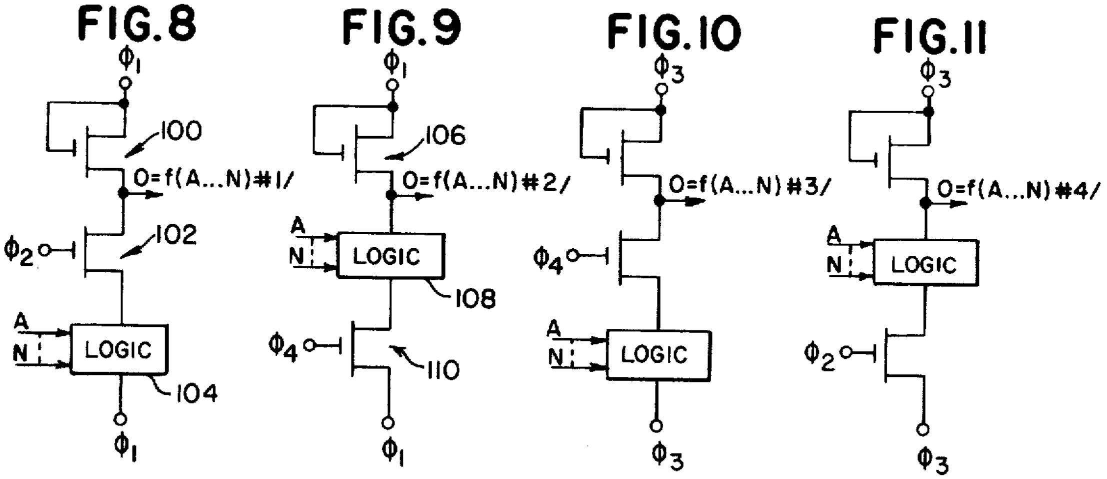

FIGS. 8 through 11 show the basic building blocks used in four-phase MOS logic circuitry. These building blocks are respectively called "1," "2," "3," or "4" gates and are respectively shown in FIG. 8, FIG. 9, FIG. 10, and FIG. 11. In FIG. 8, the "1" gate shown includes a first MOS transistor 100, which is designated as a load transistor; a second MOS transistor 102, which is designated an isolation transistor; and a series of MOS transistors connected together to form a logic circuit 104. Examples of the form circuit 104 can take will be hereinafter given in more detail. The gate electrode of the load transistor 100 is connected to the drain electrode thereof, and both of these are connected to the $\phi_1$ signal, shown in FIG. 2A. The source electrode of the load transistor 100 and the drain electrode of the isolation transistor 102 are coupled together, and the output 0 from the "1" gate is taken from this connection. The source electrode of the isolation transistor 102 is connected to the drain electrodes of at least some of the transistors in the logic circuit 104, and the source electrodes of at least some of the transistors in the logic circuit 104 are connected to the $\phi_1$ signal. The gate electrode of the isolation transistor 102 is connected to the $\phi_2$ signal, and the gate electrodes of the transistors in the logic circuit 104 are connected to the input signals A through N. A general statement concerning the configuration of the logic circuit 104 would be that, wherever two signals are to have a logical AND performed therebetween, the transistors to which those signals are applied will be connected in series, and, wherever two signals are to have a logical OR performed therebetween, the transistors to which those signals are applied will be connected in parallel. The output signal 0 from a "1" gate can be written as a function of the various input signals followed by a slash, indicating that it is inverted. As used herein, a slash ("/") following a term in a logical equation signifies a logical inversion of that term. For instance, if B is true, on, or logical "1," B/ is false, off, or logical "0." Set off to the side of this equation would be the term "(1)," indicating a "1" gate. Hereinafter, the terms "logical '1'," "on," or "-true" will signify a negative voltage, and the terms "Logical '0'," "off," or "false" will signify a voltage less than the threshold voltage of an MOS transistor, such as ground potential.

The operation of the "1" gate shown in FIG. 8 will now be described with the assumptions being made that (1) the output is coupled to the gate electrode of another MOS transistor (not shown), which is a capacitive load, and (2) the logic circuit 104 consists of a single transistor, hereinafter called the logic transistor, having its source connected to the $\phi_1$ signal and its drain connected to the source electrode of the isolation transistor 102. The input to the gate electrode of the logic transistor will be the input voltage A, which is first assumed to be negative during the time the $\phi_2$ signal is negative. During the time that the $\phi_1$ signal is negative, the $\phi_2$ signal also will be negative, as seen from FIGS. 2A and 2B, and, thus, both the load transistor 100 and the isolation transistor 102 will be conductive. Since the load transistor 100 is conductive, the voltage at the output 0 will be negative, and this will cause the capacitive load to become negatively charged. After the $\phi_1$ signal returns to ground voltage, but before the time the $\phi_2$ signal returns to ground voltage, as seen during the time $T_L$ between FIGS. 2A and 2B, the load transistor 100 will become nonconductive and exhibit an extremely high drain-to-source impedance, while the isolation transistor 102 will remain conductive and exhibit a relatively low drain-to-source impedance. In this event, one must look to the state of conductivity of the transistor in the logic circuit 104. Since it was assumed that the input voltage A was negative, the logic transistor will be conductive; hence the output signal will be at ground voltage, since the drain electrode of the conductive logic transistor is connected to the $\phi_1$ signal, which is now at ground voltage. If the input voltage A was at ground potential, the logic transistor would be nonconductive; hence the output voltage 0 would be the negative voltage stored in the capacitive load. Thus, the "1" gate just described acts as an inverter circuit; that is, the output signal, 0, is equal to the opposite of the input signal A. Written as a logical equation, this becomes $$O=A/(1),$$

where the "(1)" term signifies a "1" gate.

Referring now to FIG. 9, a "2" gate is shown. The "2" gate similarly has a load transistor 106 having its drain and gate electrodes connected together and to the $\phi_1$ signal. The output from a "2" gate is taken from the source electrode of the load transistor 106, which is also connected to the drain electrodes of at least some of the transistors in a logic circuit 108, which may be similar in construction to the logic circuit 104. The source electrodes of at least some of the transistors in the logic circuit 108 are connected to the drain electrode of an isolation transistor 110, which has its source electrode connected to the $\phi_1$ signal and its gate electrode connected to the $\phi_4$ signal. To understand the operation of a "2" gate, assume that (1) the output 0 is connected to a capacitive load and (2) there is a single logic transistor in the logic circuit 108 having its gate electrode connected to the input voltage A, its drain electrode connected to the output signal 0, and its source electrode connected to the drain electrode of the isolation transistor 110. During the time the $\phi_1$ signal is negative, the load transistor 106 will be conductive, and a negative signal will become stored in the capacitive load, thereby making the output signal 0 a negative voltage. When the $\phi_1$ signal returns to ground level, there will be no immediate path through which the capacitive load can discharge to ground, even though the logic transistor may be conductive. If the input signal A had been at ground potential, the logic transistor would be nonconductive, so the output signal 0 will remain at the negative voltage stored in the capacitive load. However, if the input signal is a negative voltage, the logic transistor is conductive, and, during the time the $\phi_4$ pulse is negative, the isolation transistor 110 is conductive. Therefore, during the $\phi_4$ negative time, the capacitive load can discharge to ground ($\phi_1$ is at ground potential when $\phi_4$ is negative) through the logic transistor the the isolation transistor 110. Then, after $\phi_4$ returns to ground, but before $\phi_3$ returns to ground, the output signal 0 will be at ground potential. Thus, the "2" gate acts as an inverter circuit in this case. The logical equation for a "2" gate is:

$$O=A/ \qquad (2)$$

where the term "(2)" indicates a "2" gate.

Referring now to FIG. 10, there is shown a "3" gate, which is identical to the "1" gate shown in FIG. 8, with the exception that the $\phi_3$ and $\phi_4$ signals are used in place of the respective $\phi_1$ and $\phi_2$ signals used in FIG. 8. The output of the "3" gate is also an inverted version of the input applied thereto, where the logic circuit includes only a single transistor.

Referring now to FIG. 11, there is shown the final building block in four-phase logic, which is a "4" gate. The "4" gate is identical to the "2" gate shown in FIG. 9 with the exception that the $\phi_3$ and $\phi_2$ signals are used in place of the respective $\phi_1$ and $\phi_4$ signals used in FIG. 9. The equations for the "3" and "4" gates shown in FIGS. 10 and 11 are:

$$O=A1 \qquad (3)$$

$$O=A1 \qquad (4)$$

Referring now to FIG. 12, there is a chart showing which types of gates may feed and/or be responsive to which other types of gates. The numbers 1, 2, 3, and 4 indicate the respective "1," "2," "3," and "4" gates shown in FIGS. 8 through 11. From the chart in FIG. 12, it is seen that a "1" gate can apply a signal to either a "2" gate or a "3" gate. Similarly, a "2" gate can only apply a signal to a "3" gate. A "3" gate can apply a signal to either a "4" gate or a "1" gate, while a "4" gate can only apply a signal to a "1" gate.

With the above basic building blocks in mind, two examples of designing logic circuits using four-phase MOS circuits will now be given. In both examples, a "1" gate performs logic and feeds an inverter "3" gate. First, the example will be given for a situation where one desires to provide a negative output signal when either a C input signal is negative or an A input signal and a B input signal are negative; that is, a circuit to perform the logical function A B + C.

FIG. 13 shows a "1" gate, "3" gate combination circuit 111, which satisfies these requirements where the logic is performed in the "1" gate and the "1" gate output is inverted in the "B" gate to get the required result. Since the signals A and B must occur negative together in order to get 0 as a negative voltage, A and B are in a logical AND relationship; hence the logic transistors 112 and 114 are connected in series with the A and B input signals respectively applied thereto, thereby forming an AND gate. Alternatively, output signal 0 could be negative if the C input signal had been negative. Therefore C is in a logical OR relationship with A and B; hence the transistor 116 is connected in parallel with the two serially-connected logic transistors 112 and 114, and input signal C is connected thereto, thereby forming the OR gate. The output from the "1" gate in FIG. 13 can be written as the logical equation $$O=(A\,B+C)/ \qquad (1)$$

Here the symbol "/" indicates an inversion; that is, 0 is negative only when the desired situation does not occur. The symbol (1) indicates the logic given in the equation is performed in a "1" gate. If this output is applied to the input of the logic transistor in the "3" gate inverter 118 in FIG. 13, the output O becomes the equation:

$$O=A\,B+C \qquad (1\text{–}3)$$

The notation (1–3) used here indicates that the input signals are applied to a "1" gate and the output signal is taken from a "3" gate, with the output of the "1" gate being applied as the input of the "3" gate. There is also a one-bit time delay between the application of the A, B, and C signals and the provision of the $O$ signal. The circuit 111 of FIG. 13 could be one stage of a shift register, where, for instance, A had come from the previous stage of the register and where B and C are other inputs which can affect the register in desired manners.

Another common type of equation used in logical design is the latch equation, which may be written as:

$$O=A+B/\,0$$

Here O becomes negative when A becomes negative, and O remains negative until B/ goes to ground from its normally negative value. FIG. 14 shows a circuit 119, which will perform this logic function. In this case, the transistors 120 and 122 are connected in series, with the transistor 120 having its gate electrode connected to the B/ data signal, and the transistor 122 having its gate electrode connected to the output signal O. The transistor 124 is connected in parallel with the transistors 120 and 122, and its gate electrode is connected to the A input signal. This circuit operates so that, whenever the A signal goes negative, the output signal O will go negative. This, in turn, will render conductive the transistor 122, and, since the normally negative signal is applied to the transistor 120, it will be conductive. This will keep the output signal 0 negative, even though A returns to ground. When the B signal goes negative, and therefore the B/ signal goes to ground, the transistor 120 will become nonconductive, and thus the output signal O will go back to ground. Hence the circuit shown in FIG. 14 operates as a logical latch, or as an R–S flip-flop circuit; it is turned on by the A signal and turned off by the B signal.

Reference is now made to FIG. 15, which shows a diagram of how the FIGS. 16A through 16H should be placed together to show the detailed logical diagram of the digital processor 10.

Figure 16A:
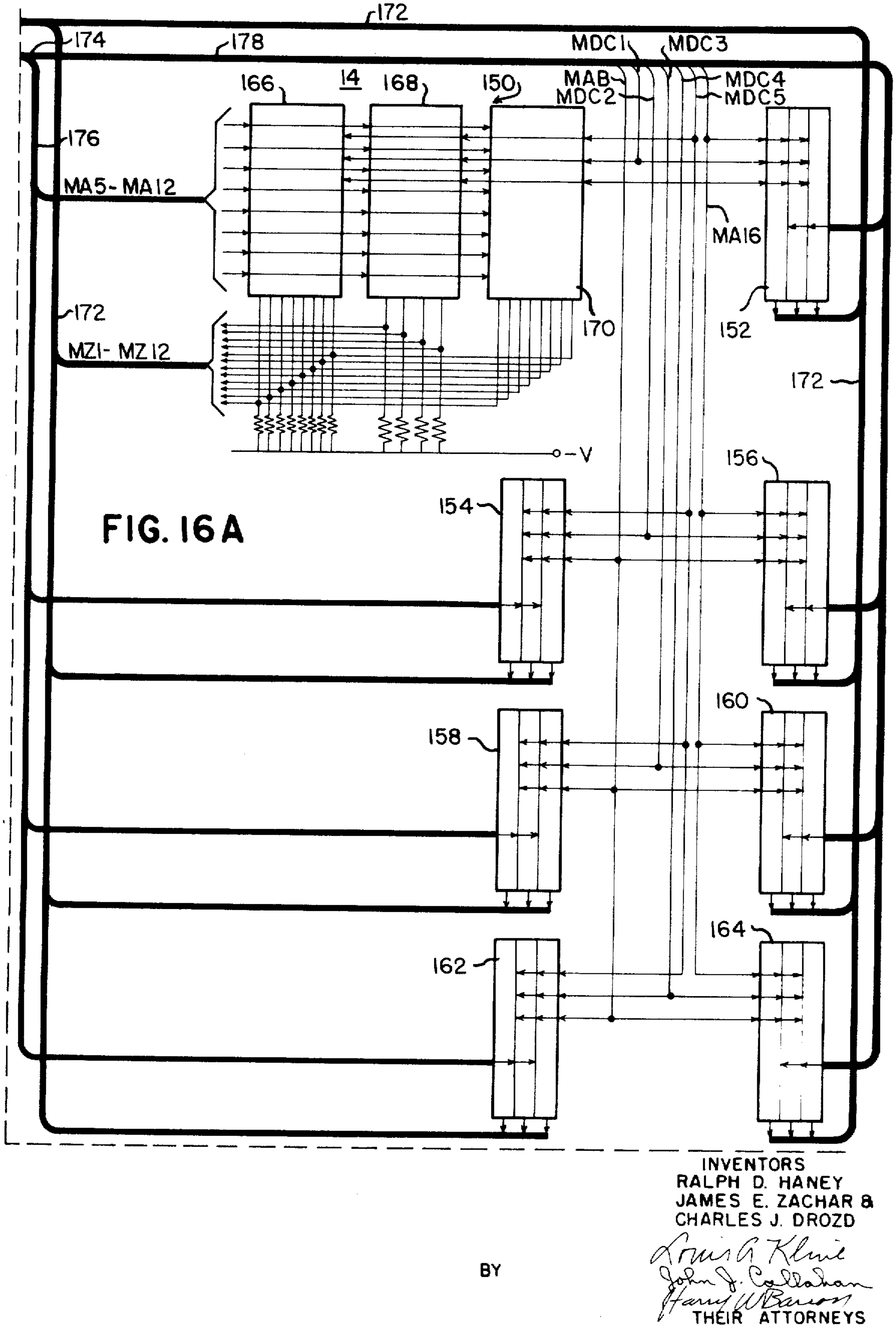

Referring specifically to FIG. 16A, the read-only memory 14 is shown. The read-only memory 14, as previously explained, is a 4,096 word by 12 bit read-only memory which can be implemented on 24 MOSLSI integrated circuit arrays. These 24 integrated circuit arrays are subdivided into eight groups, 150, 152, 154, 156, 158, 160, 162, and 164, of three arrays apiece. Each of the eight groups represents 512 words of the memory. Group 150 includes three arrays 166, 168, and 170. The arrays 166 and 170 are organized as 256 word by 8 bits read-only memories, and the array 168 is organized as a 512 word by 4 bits read-only memory.

Each of the arrays 166, 168, and 170 receives, in parallel, the low order nine lines from the program counter means 16. These low order lines respectively carry the MA5 through MA13 signals. In order to make up the twelve bit words, the array 166 and one half of the array 168 are selected, or, alternatively, the array 170 and the other half of the array 166 are selected. The 8 bits of the selected word from the arrays 166 and 170 are applied, respectively, to eight outputs thereof, and the 4 bits of the selected word from the array 168 are applied, respectively, to four outputs thereof. Thus, the eight outputs from one of the arrays 166 or 170, along with the four outputs from the array 168, will produce the 12 signals MZ1 through MZ 12, which manifest the 12 bit instruction word desired.

The 12 bit instruction word is applied in parallel along the line 172, which is in fact 12 separate lines carrying the MZ1 through MZ 12 signals, respectively.

As will be seen hereinafter, the program counter means 16 provides, as the output of the address register 24, 15 separate signals, which are the MA5 through MA13, the MA16, and the MDC1 through MDC5 signals. These signals are applied, in parallel, to the read-only memory means 14 through the line 174. The line 174 branches into two lines, 176 and 178. The line 176 carries the MA5 through MA12 signals, and the line 178 carries the MA13, and MA16, and the MDC1 through MDC5 signals. The MA5 through MA12 signals on the line 176 will hereinafter be called the eight low order signals, and these are applied to eight inputs of each of the arrays 166, 168, and 170. These eight signals act as pure address signals to select one of the words stored in the arrays. The MA13 signal applied through the line 178 is also applied to each of the arrays 166, 168, and 170, and is used as an array select signal. If MA13 is equal to a logical "1," then the array 166 is selected; and, if MA13 is equal to a logical "0," then the array 170 is selected. Similarly, if MA13 is equal to a logical "1," the part of the array 168 which is associated with the array 166 is selected; and, if MA13 is equal to a logical "0," the part of the array 168 which is associated with the array 170 is selected.

The MA16 and the MDC1 through MDC5 signals are used to select which one of the eight groups 150, 152, 154, 156, 158, 160, 162, or 164 is to provide the instruction signal. One may consider the eight groups as being organized in a 2×4 matrix. Each of the signals MDC1 through MDC4 is applied, respectively, to one of four rows of the matrix. For instance, the signal MDC1 is applied to groups 150 and 152, while the signal MDC2 is applied to groups 154 and 156. Only one of the MDC1 through MDC4 signals will be indicating a logical "1" at any given time. The signal MDC5 is merely an inverted version of the signal MA16. These two signals are used to select one of the two columns of the eight groups. The line carrying the signal MDC5 is connected to groups 150, 154, 158, and 162, while the line carrying the signal MA16 is connected to groups 152, 156, 160, and 164. When a logical "1" appears in the signals MDC1 and MDC5, for instance, then group 150 will be selected to receive the MA5 through MA12 and the MA13 signals to provide an instruction word on the MZ1 through MZ12 output line 172.

Figure 16B:
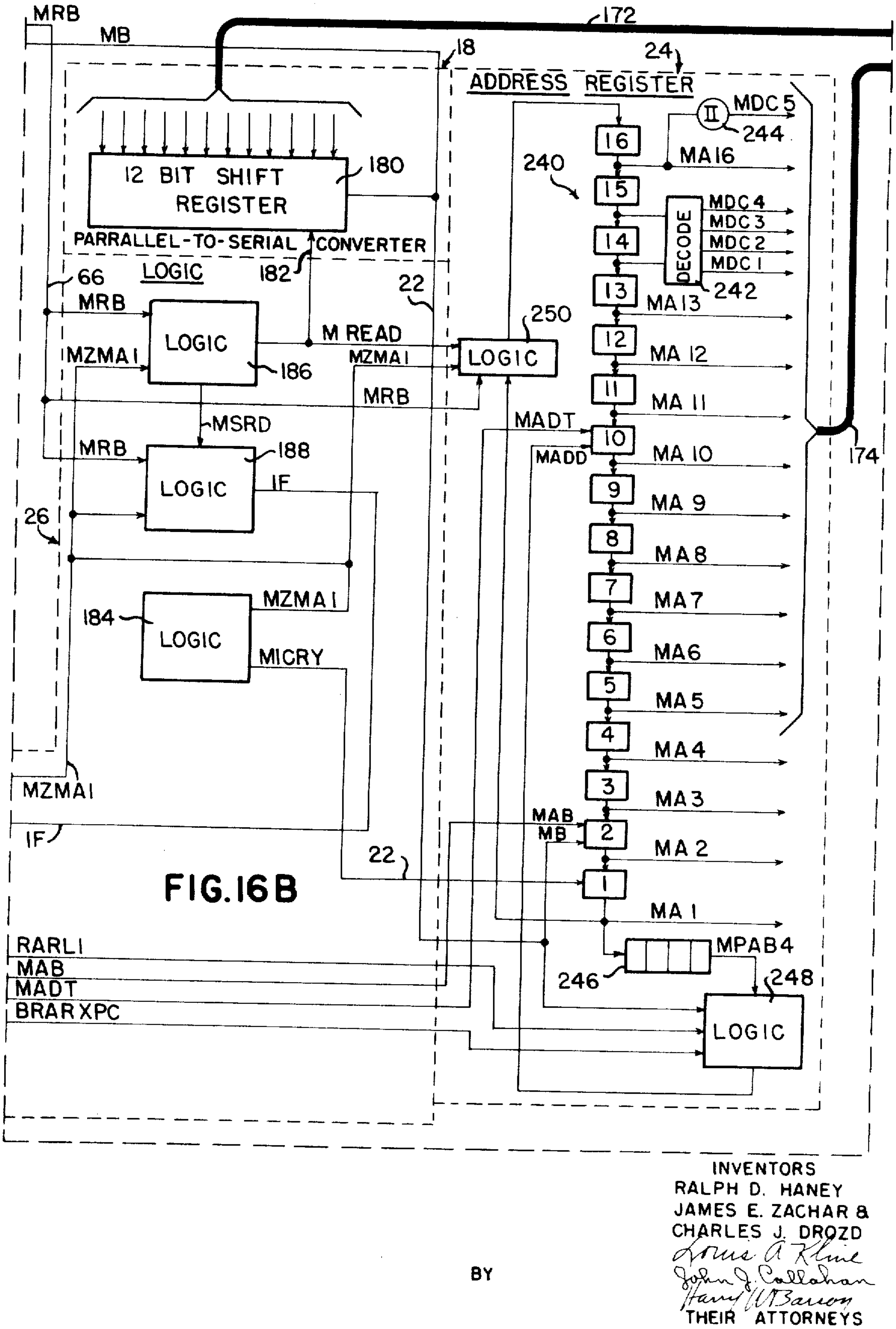

Referring now to FIG. 16B, there is shown a portion of the program counter means 16 and the serial-to-parallel converter 18. The portion of the program counter means 16 which is shown includes the entire address register 24 and a portion of the logic 26 associated therewith. The line 172, which includes the 12 parallel outputs MZ1 through MZ12 from one of the read-only memory groups, is applied to the parallel-to-serial converter circuit 18. The parallel-to-serial converter circuit 18 includes a twelve stage shift register 180 having 12 separate parallel inputs, to each one of which a respective one of the MZ1 through MZ12 signals is applied. The 12 bit shift register 180 also has a single serial output, to which is applied a signal containing the 12 serially occurring bits manifesting the read-only memory 14 signal. The output of the shift register 180 is connected to the memory buss 22. A MREAD signal is applied to each stage of the shift register 180 over a line 182 and will cause the shift register to be responsive to the signals applied thereto on the line 172 and to thereafter apply the twelve bit serial instruction signal from its serial output to the memory buss 22. The logical equations for the shift register 180 are:

MBZ12 = MREAD MZ12 (1-3)
MBZ11 = MREAD MZ11 + MBZ12 (1-3)
MBZ10 = MREAD MZ10 + MBZ11 (1-3)
MBZ9 = MREAD MZ9 + MBZ10 (1-3)
MBZ8 = MREAD MZ8 + MBZ9 (1-3)
MBZ7 = MREAD MZ7 + MBZ8 (1-3)
MBZ6 = MREAD MZ6 + MBZ7 (1-3)
MBZ5 = MREAD MZ5 + MBZ6 (1-3)
MBZ4 = MREAD MZ4 + MBZ5 (1-3)
MBZ3 = MREAD MZ3 + MBZ4 (1-3)
MBZ2 = MREAD MZ2 + MBZ3 (1-3)
MBZ1No.1 = (MREAD MZ1 + MBZ2)/ (1)
MBZ1No.2 = (MBZ1No.1)/ (2)
MBB = (MBZ1No.2)/ (3)
MB = MBB/ —

The signal applied to the memory buss 22 is derived by outputting the signal MBB through an inverting output driver circuit.

The timing sequence involved in this circuit is that the first or least significant bit of the instruction signal which was applied by the line MZ1 from the read-only memory 14 is applied to the memory buss 22 during the time the TP1 timing signal is occurring. The second bit of the instruction signal is applied during the time the TP2 timing signal is occurring, and so forth until the last bit of the instruction signal is applied during the time the TP12 timing signal is occurring. During the time times TP13 through TP16, no signal will be applied to the memory buss 22.

Figure 16C:
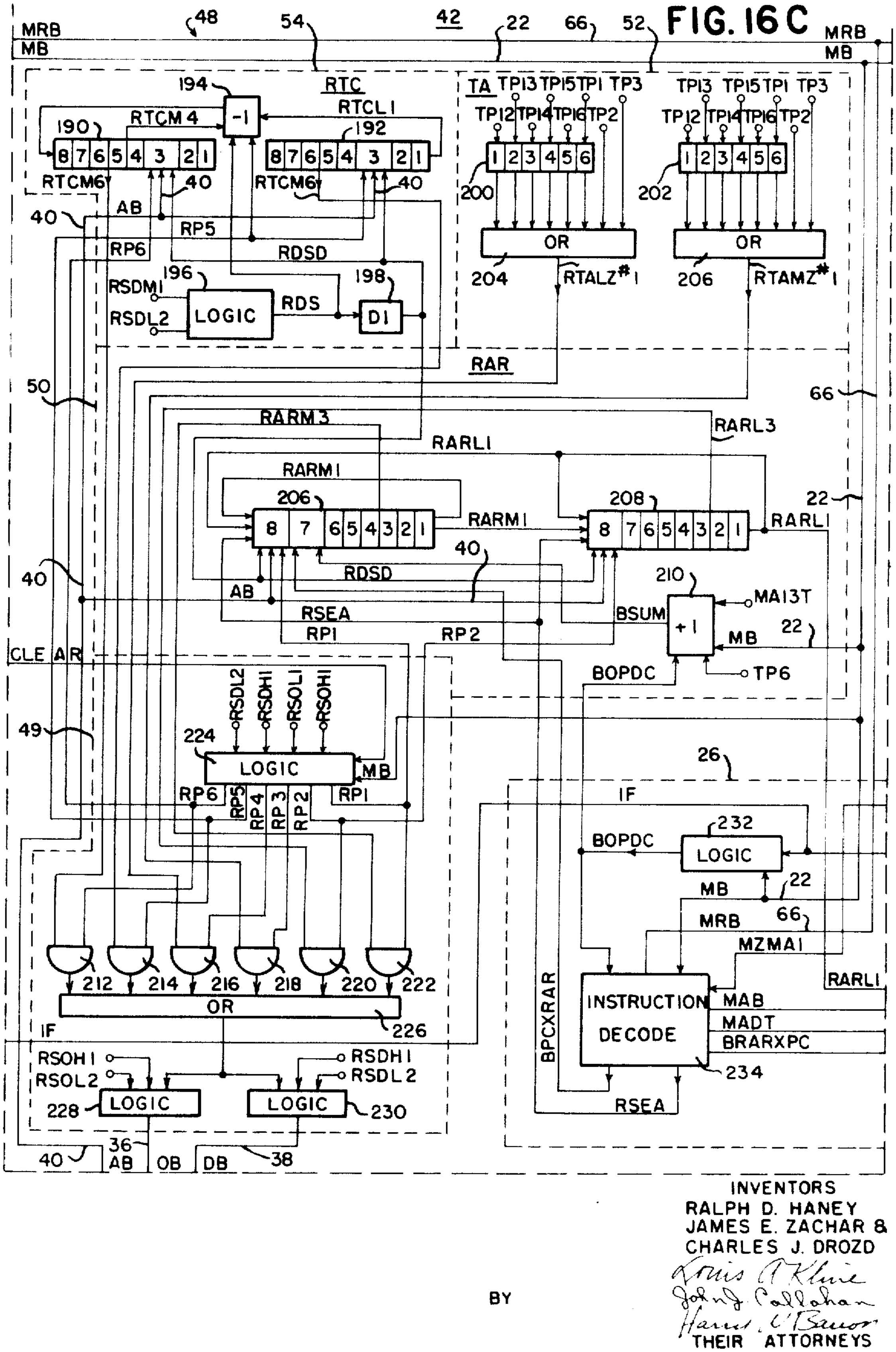

Reference is now made to the logic 26, which is shown in FIG. 16B and a portion of FIG. 16C. Before a discussion of the logic circuits included in the logic 26, an understanding of the details of the responses on the memory response buss 66 is necessary. The time at which a pulse appears on the memory response buss 66 indicates to the logic 26 what subsequent action should be taken in response to a particular type of instruction. The various means responsive to instruction signals are connected to the memory response buss 66 by a single transistor which is normally held off. When a particular means responsive to an instruction is supposed to respond in a predetermined manner by applying a signal to the memory response buss 66, the transistor is then turned on at the appropriate time. Only one of these transistors in the digital processor 10 should be active at any given time. A similar connection to the origin buss 36 and the destination buss 38 is used for the selectable registers connected thereto.

There are five possible responses on the memory response buss 66. Each output stage from the means responsive to instruction signals which is connected to the memory response buss 66 is a "1" gate; therefore, the timing cannot be described in terms of the regular time bits (that is, TP1 through TP16) because these timing pulses are derived from "3" gates. However, since the output of a "1" gate is delayed by one half of a bit time from the output of a previous "3" gate, the "1" gate timing can be described in terms of TP times plus a half-bit time, or, in other words, TP-½. Hence, the "1" gate output driven by the TP9 clock signals would be TP9-½. With this in mind, the time at which a pulse is applied to the memory response buss 66 and a particular meaning of that pulse at that time will now be considered.

The times at which pulses may be applied to the memory response buss 66 are at TP7-½, TP8-½, TP12-½, TP13-½, and TP14-½. When a signal is applied to the memory response buss 66 at time TP7-½, it conveys the "take relative branch" response, which tells the logic 26 to treat the last six bits of the then-occurring instruction signal on the memory buss 22 as a relative branch address and to adjust the count in the address register 24 by the RA constant and to thereafter read from the new address, treating the output as an instruction. The instructions which possibly can provide signals to the memory response buss 66 at time TP7-½ would include the second word of the UNC instruction and the BUC, the BIR, and the BIS subinstructions.

The next type of response which can be applied to the memory response buss 66 can occur at time TP8-½ and means "read next word." The logic 26 reads the next word by issuing an MREAD signal at the next TP16 timing signal, but it does not treat the memory output as an instruction signal by not issuing the IF flag, which will be discussed hereinafter. An example of this would be the response for the first word of the UNC instruction, since the first four bits of the second word of the UNC instruction do not define an OP code.

The next type of signal which can be applied to the memory response buss 66 is applied at time TP12-½; this means "do not take an absolute branch." The logic 26 responds to this signal by not issuing an MREAD signal at the next TP16 timing signal, and allowing the program counter to increment a second time. Thereafter, the MREAD signal will be issued at the following TP16 time, and the output will be treated as an instruction. Instructions which can apply this signal to the memory response buss 66 include the BIT, the BAT, and the BAC instructions. In each of these instructions where a branch is indicated, the address of the branch is given in the next instruction provided from the read-only memory 14. Hence, where the branch is not to be taken, the following signal provided by the read-only memory 14 is meaningless and hence need not be provided to the memory buss 22.

The next type of response which can be applied to the memory response buss 66 is a pulse which occurs at both times TP12-½ and TP13-½, which means "take an absolute branch." The logic 26 responds to this type of a signal by issuing an MREAD statement at the following TP16 and treating the memory output as a 12-bit absolute branch address and not as an instruction signal. It places this address in the counter of the address register 24 and issues another MREAD statement at the following TP16, treating the output from the read-only memory 14 at this time as an instruction. Examples of this type of response are the BAC, the BIT, and the BAT instructions when they are calling for a branch to occur, and the BSR, which always requires a branch to occur.

The final type of response which may be applied to the memory response buss 66 by the remaining portions of the digital processor 10 is a signal occurring at time TP14-½, which means "read the next instruction." The logic 26 responds to this response by issuing an MREAD statement at the following TP16 and treating the memory output as an instruction signal. Hence, it issues the IF flag. Instructions providing this type of response include the SFU instruction, the second word of the UNC instruction when there is to be no branch, and the MOV, the SFT, the ADD, the SUB, the LAC, the SIB, the CIB, the LAN, and the LOR instructions. In each of these instructions, it is seen that there is no branch necessary and that the word following the then-occurring instruction word does not have any special meanings. Hence, the next signal on the memory buss 22 is taken as a normal instruction.

Reference is now made to the details of the logic 26, and in particular to the logic 184, which is a diagnostic switch circuit. This circuit includes a single pole double throw switch and is provided to control the starting point of the program counter. The switch may be momentarily contacted either to the right or to the left, with the center being off. When the switch is thrown one way, a binary "1" is forced into the address register 24, and, when the switch is thrown the other way, a binary "0" is forced into the address register 24. The purpose of this switch in the logic 184 is to provide a means for either starting execution in the normal program or allowing the serviceman to start program execution in a diagnostic routine. When the switch is in one position, a signal called SWD1 is provided, and, when it is in the other position, a signal called SWD2 is provided. Each of these signals will set a flip-flop M1PC or MZPC, respectively.

The logic circuit 184 will provide a signal MZMA1 in response to the switch being in one of the active positions and will provide both signals MZMA1 and MICRY if the switch is in the other active position. The logic equations for the logic circuit 184 are:

M1PC = TCIR3 (SWD2 + M1PC MZMA1/) (1-3)

MZPC = TCIR3 (SWD1 + MZPC MZMA1/) (1-3)

M1CRY = TCIR3 (M1PC MREAD + M1CRY (REMRPS/ + TP14/ + M1PC)) (1-3)

MZMA1 = TCIR3 (MREAD (MZPC + M1PC) + MZMA1 (REMRPS/ + TP14/ + M1PC + MZPC)) (1-3)

REMRPS = MRB3 + REMRPS MREAD/ + MSRD (1-3)

MRB3 = (MRB + TCIR)/ (3)

The TCIR3 signal which appears in the equations above is an inverted version of a TCIR signal taken from a "3" gate. The TCIR signal is an initial reset edge detector signal which is generated external to the digital processor 10. When the TCIR signal becomes true, the digital processor 10 should be initialized with the program counter set at binary 0. When the TCIR3 signal makes the transition to a logical "1," execution should begin. To accomplish this, the edge detect circuit is used.

The TCIR signal is an initial reset signal which is generated external to the digital processor 12. This signal is in a logical "1" condition whenever it can be determined that the digital processor 12 is not receiving the proper operating conditions, such as the proper voltage or the proper repetition rate of the clock circuit. Because of the frequency with which the TCIR signal is used, it is not shown in the drawings to avoid cluttering. However, from the equations it should be easily understood where this equation should be applied. Similarly, since the timing pulses TP1–TP16 are also frequently used, they are not shown in the drawings but must be considered from the equations set forth herein.

Referring to the above equations for the diagnostic switch logic 184, the switch output signals SWD1 and SWD2 set latch circuits M1PC and MZPC in the logic 184. These latch circuits hold as long as the MZMA1 output signal from the logic 184 remains false. This technique is a latching technique to guard against switch bounce. The MZMA1 and the M1CRY output signals from the logic 184 are set by the first MREAD signal after the M1PC or MZPC latch circuits are set. These signals remain on as long as the switch is held in either the SWD1 or the SWD2 position. Meanwhile, the next instruction is provided to the memory buss 22 when the MREAD signal occurred and a response is generated on the memory response buss 66. This response sets the REMRPS signal, which holds until the next MREAD signal is issued. However, further MREAD signals will be inhibited by the MZMA1 signal, as will be seen when reference is made to the generation of the MREAD signal. Thus, the entire digital processor system is held idle until the switch is released.

When the switch is released, the MZMA1 and M1CRY output signals from the logic 184 are reset at time TP14, allowing an instruction to be read by the issuance of an MREAD signal at the next TP16 time. But, in the mean time, the MZMA1 signal has forced the program counter to binary "0," as will be explained hereinafter. However, if the M1CRY signal also had been on, it would have set the program counter carry signal MCRY (to be explained hereinafter); therefore, the address register 24 would have been at a binary "1" count.

Referring now to the logic circuit 186 and the logic circuit 188, an explanation of how the MREAD signal and the instruction flag IF signal are derived will now be given. The logic equations for the logic circuit 186, in which the MREAD signal is provided in response to signals appearing from the memory response buss 66 and the MZMA1 signal from the logic circuit 184 are:

MSRD = MZMA1/ (MRB3 (TP8 + TP13 + MSRD TP2 (1-3)
MISSR = (MRB3 + MZMA1) (TP14 + TP9) + MSRD TP2 + MISSR TP16/ (1-3)
MREAD = MZMA1/ TP15 (TCED + MRB3 + MISSR) (1-3)
MRB3 = (MRB + TCIR)/ (3)
TCIR3 = (TCIR)/ (3)
TCIR3D = TCIR3 (1-3)
TCED = TCIR3 TCIR3D/ + TCED MREAD/ (1-3)

The MREAD signal is the signal to indicate to the shift register 180 that the instruction signal is to be applied to the memory buss 22. It is provided at time TP16 in response to the "read next instruction" response on the memory response buss 66, the MISSR signal, or the MSRD signal. The MISSR signal is set to remember to issue the MREAD signal at the next TP16 time for the "take absolute branch" and the "read next word" responses on the memory response buss 66. The MSRD signal is set when the MREAD signal is not to be set at the next TP16 time, but the second TP16 time; that is, for the "do not take absolute branch" and the "-take relative branch" responses on the memory response buss 66. The MREAD signal is inhibited whenever the MZMA1 signal is true, in order to idle the digital processor 10 when the diagnostic switch is used. The MZMA1 signal is also necessary for resetting the MSRD signal and for setting the MISSR signal. In this way, an MREAD signal will always be issued at the TP16 time following the release of the diagnostic switch.

The MREAD signal is also set by clock signals TP15 to be true during the TP16 time and the TCED signal to issue an MREAD signal following the transition of the TCIR signal becoming false. The MREAD signal is also set at time TP15 and comes true at time TP16 when the MRB3 signal is true. This happens when the memory response buss 66 signal was true at time TP14-½, indicating that the next instruction signal is to be read.

The MISSR signal is set at time TP9 and time TP14 when the MRB3 signal is true. The TP9 and TP14 times which set the MISSR signal correspond to the TP8-½ and TP13-½ responses on the memory response buss 66, indicating that the next word from the memory is to be read or that an absolute branch is to be taken. These responses require that the character stored in the next sequential location of the read-only memory 14 is to be read, but not treated as an instruction.

The MSRD signal is set at either time TP8 or time TP13, in response to memory response buss 66 signals occurring at times times TP7-½ and TP12-½. These times correspond to responses on the memory response buss 66 relatively indicating that a relative branch is to be taken or that an absolute branch is not to be taken. The MSRD signal is reset after the following TP2 time, at which time it is used to set the MISSR signal to remember to issue the MREAD signal during the following TP16 time.

The instruction flag IF signal is issued by the logic circuit 188 in response to the signals on the memory response buss 66 and the MZMA1 signal from the logic circuit 184. This signal is applied to each of the means in the digital processor 10 which respond to instruction signals appearing on the memory buss 22. It informs these means whether or not the then-existing signal on the memory buss 22 is to be treated as an instruction signal. The logical equations for the issuance of the IF signal by the logic circuit 188 are:

MISSF = (MSRD + MZMA1) TP1 + MISSF TP16/ (1-3)
MGFLG No. 1 = (MZMA1/ TP15 (TCED + MRB3 + MISSF + MGFLG INFL))/ (1)
MGFLG = (MGLFG No. 1 + TCIR)/ (3)
INFL No. 1 = (MGFLG TP16 + IFL TP4/)/ (1)
IFL = INFL No. 1)/ (3)
INFL No. 2 = (INFL No. 1)/ (2)
INFL = (INFL No. 2)/ (3)
IF = INFL/

The MGFLG signal is set to remember to issue an instruction flag IF at the following TP1 time. The MISSF signal is set to remember to issue the IF signal not at the following TP1 time, but at the TP1 time after that.

The INFL No. 1 is set at TP16 time by the MGFLG signal. The holding term for the INFL 1 signal is the IFL TP4/ term, and this holds the INFL No. 1 signal for 4 bit times. The INFL No. 2 signal and the INFL signal then invert the signal twice to give the correct sense at the output. The MGFLG signal is reset in a "1" gate by the MZMA1 signal when the diagnostic switch is used, and in a "3" gate by the TICR signal for initial reset purposes.

When the TCIR signal goes off, the MGFLG signal is set with the TP15 clock signal and the TCED signal in order to issue the MGFLG flag signal for the following instruction signal. The MGFLG flag signal is also set with clock signal TP15 and the MRB3 signal. This corresponds to the "read next instruction response" appearing on the memory response buss 66, which would require an IF signal to be issued at the next TP1 time.

The MISSF signal is set at TP1 time when the MZMA1 signal is true. This is to provide for the first IF signal after release of the diagnostic switch. The MSRD signal from the logic circuit 186 also sets the MISSF signal after time TP1, so it will remember to issue an IF signal at the following TP1 timing signal for the cases where a "take relative branch" or a "take absolute branch" or a "don't take absolute branch" response is required from the signal appearing on the memory response buss 66. The MISSF signal sets the MGFLG signal at time TP15 when the diagnostic switch is not used. This, in turn, sets the INFL signal. The instruction flag IF signal is merely the INFL signal applied through an inverting driver circuit.

Reference is now made to FIG. 16C, in which the RAR/TA/RTC register 42 and the remainder of the logic 26 associated with the program counter means 16 are shown. Before a discussion of the remainder of the logic 26, it would be advantageous to understand the RAR/TA/RTC register 42. It should be recalled that the RAR/TA/RTC register 42 is three separate registers; namely, the RAR register 50, the TA register 52, and the RTC register 54.

The RTC register 54 is a two-character shift register which constitutes the first and the second characters of the RAR/TA/RTC register 48. Each of the characters in the RTC register 54 is stored in one of the eight bit shift registers 190 or 192. The most significant character in the RTC is stored in the shift register 190, while the least significant character is stored in the shift register 192. The output RTCM1 from the least significant stage of the shift register 190 is coupled as an input to the most significant stage of the shift register 192. The output RTCL1 from the least significant stage of the shift register 192 is coupled as one input to a decrement by "one" logic circuit 194, which causes one to be subtracted from the count once each cycle of operation. The output RTCM4 from the fourth stage of the most significant character shift register 192 is also coupled to the logic circuit 194, as are the RDS and the RP5 signals, which will be described hereinafter. The output from the logic circuit 194 is coupled as an input to the most significant stage of the shift register 190.

The third stage of the least significant character shift register 190 has applied thereto, in addition to the output from the fourth stage, the signals appearing on the arithmetic buss 40 and the RP6 and RDSD signals, which will be described hereinafter. Similarly, the third stage of the most significant character shift register 192 has applied thereto signals appearing on the arithmetic buss 40, the RP5 signal, and the RDSD signals.

The RDS signal is formed by performing, in logic 196, a logical AND function on the RSDH1 and the RSDL2 signals which are provided by the register selection logic 30 in the transfer control and register selection means 28. The RDSD signal is the RDS signal delayed by one bit time by the delay network 198.

The logical equations associated with the RTC register 54 are:

RTCL1 = RTCL2 (1-3)
RTCL2 = RTCL3 (1-3)
RTCL3 = RTCL4 (RDSD RP5)/ + AB RDSD RP5 (1-3)
RTCL4 = RTCL5 (1-3)
RTCL5 = RTCL6 (1-3)
RTCL6 = RTCL7 (1-3)
RTCL7 = RTCL8 (1-3)
RTCL8 = RTCM1 (1-3)
RTCM1 = RTCM2 (1-3)
RTCM2 = RTCM3 (1-3)
RTCM3 = RTCM4 (RDSD RP6)/ + AB RDSD RP6 (1-3)
RTCM4 = RTCM5 (1-3)
RTCM5 = RTCM6 (1-3)
RTCM6 = RTCM7 (1-3)
RTCM7 = RTCM8 (1-3)
RTCM8 = (RTCL1 + RTCRY) (RTCL1 RTCRY)/ (1-3)
RTCYS = RP5 RDS TP1 + RTCYS (RTZD + TP15/) (1-3)
RTCRY = RTCYS TP1 + RTCRY RTCL1/ (1-3)
RTZD = RTCM4 + RTZD TP15/ (1-3)

As seen from these equations, the RTC register 54 is a real-time clock register having two characters which may be loaded from the arithmetic buss 40 when either RP6 or RP5 is true.

After the least significant half of the register has been loaded (that is, the shift register 192), the register becomes a 16-bit, "down-one counter," which decrements once each cycle, or 16 TP times, until reaching binary zero. The decrementing then stops. The above equations for RTCL1 through RTCM8 are the equations for the shift registers 190 and 192. As long as the signal RDSD and the RP6 or RDSD and RP5 signals remain false, the two shift registers act as a single 16-stage end around shift register. When the RDSD and RP6 signals occur simultaneously, the signal on the arithmetic buss 40 is loaded into the third stage of the most significant character shift register 192. When RDSD and RP5 signals are true, the signal on the arithmetic buss 40 enters the third stage at the least significant character shift register 190. The terms RTCYS, RTCRY, and RTZD stand, respectively, for real time carry set, real time carry, and real time zero detect, and these signals provide the decrement-one logic circuit 194 action which provides the input to the eighth stage of the shift register 190.

The RDSD signal is true from times TP15 through TP6 when the register has been selected as a destination register. The data on the arithmetic buss 40 is also framed from times TP15 through TP6. Therefore, after loading both characters of the register, the lowest order bits of the count are presented in the first stage of the shift register 190 as signal RTCL1 at time TP2. The carry flip-flop signal RTCRY is set with time pulse TP1 and comes true at time TP2. When the RTCYS signal is true, the RTCRY signal will remain true as long as zeros are coming out of the first stage of the least significant character shift register 192 as the RTCL1 signal.

The exclusive OR input to the eighth stage of the most significant character register 190 complements the RTCL1 signal up to and including the first logical "1" bit. This is a decrement algorithm. This process continues with the RTCRY signal becoming set at the beginning of each cycle until RTCYS no longer is true. RTCYS signal is set with the RDS, RP5, and TP1 signals occurring simultaneously. This is at the end of the time when the first or least significant bit appearing on the arithmetic buss 40 is loaded. It remains true until TP15, when it will go false if the RTZD signal is false, and the RTCRY signal will not set at the following TP1 time. The RTZD signal is set with the output at RTCM4 and reset at time TP15. The RTZD signal will come true some time in the 16-bit cycle if there is at least one logical "1" bit in the register. When the register has decremented to binary zero, the RTZD signal does not come true, the RTCYS signal is allowed to reset, and the RTCRY signal does not set to decrement again. This causes the decrementing action to cease when the contents of the RTC register 54 becomes binary zero.

The contents of the RTC register can subsequently be transferred to the accumulator and then tested for the zero condition by, for instance, the BAC instruction. This is the only way to determine when the RTC 54 register count has reached zero, in that no means are provided to signal this condition. However, such means could be provided by additional circuitry.

Reference is now made to the TA register 52, shown in FIG. 16C. This register, which is not a shift register, forms the third and fourth characters of the six character RAR/TA/RTC register 48. Signals manifesting these two characters are enabled by the RP3 and RP4 signals, respectively, which will be explained subsequently.

The low order six bits of each character are provided from six flip-flop circuits, each of which is constructed to provide either a logical "1" or a logical "0" signal when triggered by one of the TP12 through TP1 timing pulses. The two most significant bits in the low order register are merely the TP2 and TP3 time clock pulses and hence are always logical "1." The least significant character of the TA register 52 is provided by the register 200, and the most significant character of the TA register 52 is provided by the register 202.

The outputs from the least significant register 200 are provided to an OR gate 204, which performs a logical OR function on all eight bits to provide the RTALZ No. 1 signal. Since each of the flip-flops in the means 200 is activated by a different one of the time clock pulses, so that only one bit at a time will be provided to the OR gate 204 and as the RTALZ No. 1 signal, thus this signal will be an eight bit serialized signal. Similarly, the OR gate 206 will be provided with the eighth most significant character signals from the register 202 in the same manner as was provided by the OR gate 204 and will provide the serial-by-bit RTAMZ No. 1 signal.

Now, referring to the RAR register 50, it is seen that this register consists of two eight-bit shift registers, the most significant character shift register 206 and the least significant character shift register 208. The output from each of the eight stages of the most significant character flip-flop 206 is a RARM signal, followed by a number designating the particular stage. Similarly, the output from each of the eight stages of the least significant character shift register 208 is a RARL signal, followed by a number indicating the particular stage. The RARL output from the first stage of the least significant character register 208 is applied to the input of the eighth stage of the least significant character register 208 and to the input of the eighth stage of the most significant character register 206. The RARM1 output from the least significant stage of the most significant character register 206 is also applied to the eighth stage of the most significant character register 206 and to the eighth stage of the least significant character register 208. An RSAE signal, to be described hereinafter, is also applied to the eighth stage of each of the registers 206 and 208, as is the RDSD signal and the signal appearing on the arithmetic buss 40. Further, the RP1 signal is applied to the eighth stage of the register 206, and the RP2 signal is applied to the eighth stage of the register 208. A BPCXRAR signal and a BSUM signal are applied as inputs to the seventh stage of the most significant character register 206. It should be noted that, in each case, the input to a particular stage will also include the output from the previous stage. For instance, the output from the fifth stage of the register 206 is applied as at least one input to the fourth stage of the register 206.

The BSUM signal is provided from a BSUM +1 logic circuit 210 in response to the signals appearing on the memory buss 22, a BOPDC signal, which will be described subsequently, and the MA13T signal, which is merely the MA13 signal inverted.

The logical equations for the RAR register 50 are:

RARM1 = RARM2 (1-3)
RARM2 = RARM3 (1-3)
RARM3 = RARM4 (1-3)
RARM4 = RARM5 (1-3)
RARM5 = RARM6 (1-3)
RARM6 = RARM7 (1-3)
RARM7 = RARM8 BPCXRAR/ + BSUM BPCXRAR (1-3)
RARM8 = (RARM1 RSEA/ + RARL1 RSEA)(RDSD RP2)/ + AB RDSD RP2 (1-3)
RARL1 = RARL2 (1-3)
RARL2 = RARL3 (1-3)
RARL3 = RARL4 (1-3)
RARL4 = RARL5 (1-3)
RARL5 = RARL6 (1-3)
RARL6 = RARL7 (1-3)
RARL7 = RARL8 (1-3)
RARL8 = (RARL1 RSEA/ + RARM1 RSEA) (R S RP1) + AB RDSD RP1 (1-3)
BCAY = ROPDC TP6 MB + BCAY MA13T (1-3)
MA13B No. 4 = (MA13T BCAY) (4)
BSUM = (MA13T + BCAY) MA13BC No. 4 (1-3)

Referring now to the logic 49, the RTCM6, the RTCL6, the RTALZ No. 1, the RTAM No. 1, the RARM3, and the RARL3 signals are each applied, respectively, to one input of six two-input AND gates 212, 214, 216, 218, 220, and 222. The other input from each of these AND gates 212, 214, 216, 218, 220, and 222 is, respectively, coupled to the RP1, RP2, RP3, RP4, RP5, and RP6 signals, which are provided by a logic circuit 224. The logic circuit 224 provides the RP1 through RP6 signals in response to the application thereto of the RSOH1, RSOL2, RSDH1, and RSDL2 signals provided by the register selection logic 30 in the transfer control and register selection means 28. RP1–RP6 signals are the pointer signals previously referred to. Further, there are provided to the logic circuit 224 the CLEAR signal from the register selection logic 30 and the signal appearing on the memory buss 22. The equations in the logic circuit 224 are:

RP6 = TCIR3 (TCED + RAP RP1 + RPH RP6 + CLRT TP6 ROSD) (1-3)
RP5 = TCIR3 (RAP RP6 + RPH RP5) (1-3)
RP4 = TCIR3 (RAP RP5 + RPH RP4) (1-3)
RP3 = TCIR3 (RAP RP4 + RPH RP3) (1-3)
RP2 = TCIR3 (RAP RP3 + RPH RP2) (1-3)
RP1 = TCIR3 (RAP RP2 + RPH RP1) (1-3)
TCIR3 = (TCIR)/ (3)
ROS No. 1 = (RSOH1 + RSOL2)/ (1)
ROS No. 2 = ROS No. 1)/ (2)
ROS = (ROS No. 2)/ (3)
RDS No. 1 = (RSDH1 + RSDL2)/ (1)
RDS No. 2 = (RDS No. 1)/ (2)
RDS = (RDS No. 2)/ (3)
ROSD = ROS (1-3)
RDSD = RDS (1-3)
CLEAR No. 3 = (CLEAR)/ (3)
CLRT = (CLEAR No. 3)/ (4)
RAP = CLEAR No. 3 TP5 (ROS + RDS) (1-3)
RAP No. 2 = (RAP No. 1)/ (2)
RPH = (RAP No. 2 + CLEAR ROSD No. 2)/ (3)
ROSD No. 2 = (ROSD No. 1)/ (2)

It is seen that the logic circuit 224 is actually a six-flip-flop pointer register and is used to provide one of the RP1 through RP6 signals as a logical "1" signal, with the remainder of these signals being a logical "0" signal. Since each of the RP1 through RP6 signals will activate one of the AND gates 212, 214, 216, 218, 220, or 222, and since a respective output from each of the six characters of the RAR/TA/RTC register 42 is provided to the other input of these respective AND gates, one and only one character can be provided at the output of only one of the AND gates 212, 214, 216, 218, 220, and 222. The outputs of each of these AND gates 212, 214, 216, 218, 220, and 222 are all coupled as inputs to a six-input OR gate 226. The output of the OR gate 226 is coupled to one input of each of logic circuits 228 and 230, which merely may be three input logic circuit 230. The output of the logic circuit 228 is connected to the origin buss 36, and the output of the logic circuit 230 is connected to the destination buss 38. The RSOH1 and RSOL2 signals from the register selection logic 30 are applied to the second and third inputs of the logic circuit 228, and, when the RAR/TA/RTC register 42 is selected as an origin register, these signals will enable the logic circuit 228 and thereby provide the output of the OR gate 236 to the origin buss. Similarly, the RSDH1 and RSDL2 signals are connected to the other two inputs of the logic circuit 230, and, when the RAR/TA/RTC register 42 is selected as a destination register, the logic circuit 230 will be enabled, and the output from the OR gate 26 will be applied to the destination buss 38.

The outputs from each of the logic circuits 228 and 230 will be an eight-bit serial-by-bit character. The particular character will be dependent upon which of the pointers RP1 through RP6 is on, which in turn is dependent upon operation of the logic circuit 224. For instance, if the pointer RP6 is on, with the pointers RP1 through RP5 off, then the register 212 will be enabled, and the RTCM6 signal will be applied to the output of the OR gate 226 and thereafter to either the origin or destination busses 36 and 38.

From the equations given above, it is seen that, when the CLR instruction occurs, resulting in a signal being applied on the CLEAR line applied to the logic circuit 224, the pointer will be reset to RP6. The clear signal will have no effect on the contents of the registers which is different from the operation of the CLEAR signal in the normal data registers.

Next, reference is made to the portion of the logic circuit 26 as shown in FIG. 16C. This portion of the logic circuit is responsive to signals applied thereto by the memory buss 22 to decode the instructions provided and further to issue the proper signals allowing the address register and the remainder of the logic 26 associated therewith to properly respond to the instruction signal appearing on the memory buss 22. A further function of this portion of the logic 26 is to operate in conjunction with the RAR register 50 so that the proper interaction between the RAR register 50 and the address register 24 will occur.

The portion of the logic circuit 26 shown in FIG. 16C includes a logic circuit 232 and an instruction decode circuit 234. The logic circuit 232 is responsive to the application thereto of the instruction flag signal IF and the signal appearing on the memory buss 22. The logical equation for the logic circuit 232 is given as follows:

BOPDC = IF TP1 MB + BOPDC (MB + TP13)(1-3)

The instruction decode circuit 234, it is seen that the BOPDC signal, the MZMA1 signal, and the signal on the memory buss 22 are applied thereto, and, in response to these signals, the instruction decode circuit will issue the MAB signal, the MADT signal, the BRARXPC signal, the BPCXRAR signal, and the RSAE signal. The logical equations for the instruction decode circuit 234 are:

BCR = BOPDC TP5 + BCR TP2/ (1-3)
BSR = BOPDC TP7 + BSR TP2/ (1-3)
BOPDC No. 2 = (BOPDC No. 1)/ (2)
BOPDC No. F = (BOPDC No. 2)/ (3)
BMRB No. 4 = ((BCR TP7 + BSR (TP12 + TP13)) BOPDC No. F + BOPDC TP14)/ (4)
BMRB = (BMRB No. 4)/ (1)
MRB = BMRB
BPCXRARE = BOPDC TP6 + BPCXRARE TP6/ (1-3)
BPCXRAR = BPCXRARE (1-3)
BRARXPC = BCR TP6 MB/ + BRARXPC TP6/ (1-3)
RSEA = (BRARXPC No. 1 BPCXRARE No. 1)/ (3)
TAB = MRB3 MRB3D TP14 + TAB TP4/ (1-3)
MRB3D = MRB3 (1-3)
MAB = MZMA1/ (TAB TP16 + MAB TP16/ (1-3)
MADT = MZMA1/ (MRB3 TP8 + MADT TP4/) (1-3)
MRB3 = (MRB + TCIR)/ (3)

The branch operation code flip-flop signal BOPDC provided from the logic circuit 232 will detect the BCR instruction, which has an operation code of 1-1-1-1. It is set at time TP1 when both the IF signal and the signal on the memory buss 22 are true. The signal is held high as long as a logical "1" bit continues to appear on the memory buss 22. If the memory buss 22 contained all twelve one bits of the command signal, this would be regarded as a no operation code. In this case, the BOPDC signal is held for one extra bit time through TP13, so as to be used to issue the correct response on the memory response buss 66, which would be "read next instruction." This response would be issued by the response of logic in the instruction decode circuit 234 to the BOPDC signal.

The BCR signal provided to the instruction decode circuit 234 is set by the BOPDC signal occurring in conjunction with time TP5. It is therefore true for all of the four branch commands of this type of signal. The BSR subinstruction causes a BSR signal to be set with the BOPDC signal and TP7 time occurring simultaneously. This BSR signal comes true only for the BSR command, since the AB code therefor is 1-1, or for the no operation type of command, which causes a response of "read next instruction" to be issued on the memory response buss 66.

A single transistor is provided to produce the response on the memory response buss 66, and this transistor must be fed by "1" gate. This "1" gate signal is the BMRB signal, and the MRB signal applied to the memory response buss 66 results from applying the BMRB signal through an inverting driver. The memory response logic is implemented in a "4" gate by providing a BMRB No. 4 signal, which feeds the BMRB "1"

gate. This combination produces a normally false signal from the "1" gate into the transistor driver, keeping it normally off. A half bit delay occurs in the "4" gate-"1" gate combination. The BMRB No. 4 signal is issued by the TP7 time and the BCR signals both being true, and the BOPDG No. F signal being true (BOPDC being false). The BOPDC signal will be false at TP7 for either or both of the A or B bits being false of the BCR instruction. The response in this case is then on the memory response buss 66 at time TP7-½, which is the "take relative branch" response, which is appropriate for the BUC, the BIR, and the BIS subinstruction signals. A "take absolute branch" response will be issued at TP12-½ and TP13-½ for the BSR subinstruction, and a "read next instruction" response is given on the memory response buss 66 at time TP14-½ for the no operation case if the BOPDC signal is still true at this time.

The implementation of the equations for RARM1 through RARM8 and RARL1 through RARL8 which have previously been given forms the two eight-bit shift registers of the RAR register 50. These registers normally recirculate on an eight-bit basis when the RSAE (register shift end around) signal is false. The registers shift on a sixteen-bit basis under two conditions, which are (1) when the contents of the address register 24 is being transferred to the RAR register 50, and (2) when the contents of the RAR register 50 is being transferred to the address register 24.

The first condition occurs for the BSR and BIS types of BCR instruction signal supplied over the memory buss 22. Note that both of these types of instruction signals have command codes that are true for the first 5 bits; that is, operation codes of both are 1-1-1-1, and the A code of each is -1-. The BPCXRARE (program exchange with the RAR early code) signal is set by time TP6 when the BOPDC signal is still true. This flag is then true from time TP7 until the following TP6 time. The BPCXRAR signal is delayed by a single bit time from the BPCXRARE signal to create a flag from time TP8 through the following TP7 time. The RSEA signal which is normally false becomes true for 16 bit times from TP8 to the following TP7, and the + 1 logic circuit 210 output signal BSUM is loaded into the stage seven of the most significant character register 206 of the RAR register 50 during this time, as seen from the equation for RARM7 given previously and set out again here:

$$RARM7 = RARM8\ BPCXRAR/ + BSUM\ BPCXRAR \quad (1\text{-}3)$$

Reference to Table I, previously given, shows that, in the case of the BSR type of instruction, it is desired to increase the program counter by "one" and then store it in the RAR, while, in the case of the BIS type of instruction, it is desired to store the address unchanged in the RAR. This logic circuit 210 accomplishes this function.

The equations for BSUM, MA13BC No. 4, and BCAY which previously have been given with respect to the RAR register 50 equations form the logic circuit 210 in FIG. 16C. The logic circuit 210 can increment the MA13T signal serially when the BCAY signal has been set. Note that the MA13T signal is the MA13 signal inverted. The logic circuit 210 is required for the BSR subinstruction when the contents of the address register 24 are to be increased by "one" before being applied to the RAR register 50. The MA13 output from the address register 24 was chosen because at this the address has already been incremented once and points to the location following that where the BSR or BIS types of instructions are stored. For the case of the BSR type of instruction, the BCAY signal is set at time TP6, with a logical "1" bit appearing on the memory buss 22 if the BOPDC signal is high and the address is incremented once more by the adder circuit 210. For the BIS type of instruction, the BCAY signal is not set, since the B code thereof is a logical "0" and this occurs at time TP6; thus the address passes through the adder circuit 210 unchanged.

The second condition where the RAR register 50 is to shift on a 16-bit basis is when the contents of the RAR register 50 is to be transferred to the address register 24, and this occurs for the BIR and the BIS subinstructions. The BRARXPC flag controls this transfer. As previously explained, the BCR signal flag is set for any of the branch commands. The BRARXPC flag signal is set at time TP6 if the BCR signal is true and a logical "0" appears on the memory buss 22. This condition includes the BIS and the BIR subinstructions, both of which have a B code of -0-. The BRARXPC flag is framed from time TP7 through the following TP6 time and in turn makes the RSAE signal true for the same period. Note that, with the RSAE signal true, the contents of the RAR register 50 is presented at the output of the first stage of the least significant character register 208 as the RARL1 signal and is framed from times TP7 to the following TP6.

The MADT (memory adder transfer flag) signal, which is provided by the instruction decode circuit 234 when the MZMA1 signal is false and a "take relative branch" response at time TP7-½ is provided on the memory response buss 66, is then raised for the 12 bit times from TP9 through the following TP4 to strobe the 12 bit address into the tenth stage of the address register 24. This flag is also raised for the same 12-bit time when the contents of the address register 24 is to be modified by the RA constant. The MADT flag signal is reset by the MZMA1 signal becoming true when the diagnostic switch is used or by the TP4 pulse. The MADT signal becomes true for the BUC, the BIX, and the BIR subinstructions and for the UNC instruction signals.

The MAB (absolute branch flag) signal must be set whenever the MRB3 signal is true at times TP13 and TP14, as a result of a "take absolute branch" response provided to the memory response buss 66. The MRB3D signal is a memory response buss 66 signal MRB delayed one and one half TP times. When this signal is true and the MRB3 signal is true at time TP14, the "take absolute branch response" was provided to the memory response buss 66 at times TP12-½ and TP13-½. The tab signal is set under these conditions at time TP14. When the MZMA1 signal is false, the MAB signal is set when the TAB signal becomes true at time TP16; this flag is framed from TP1 through the following TP16 to strobe the memory buss 22 into the address register 24.

Referring again to FIG. 16B and, in particular, to the address register 24, it should be recalled that the address register 24 must be capable of containing the 12-bit address which establishes the location to be read in the readsonly memory 14. The address register must be capable of incrementing its count by one, of modifying its count by up to plus or minus 31, or of accepting a new 12-bit count. In addition, the address register 24 must be capable of being forced to either a binary zero or a binary one by the diagnostic switch in the logic circuit 184.

The main portion of the address register 24 is a counter 240, which is a 16-stage "add one" counter; that is, it must be capable of incrementing its count by "one" each 16 TP times. The counter 240 is a sixteen stage shift register, each stage thereof being respectively designated as 1 through 16, and the output from each stage respectively providing an MA signal having a number corresponding to that stage. For instance, the output of the 12 stage of the counter 240 is the MA12 signal. The MA15 and MA14 signals are applied to a full decoder circuit 242, which provides the MDC1 through MDC4 signals in response thereto. The MDC5 signal is merely the MA16 signal applied through an inverter circuit 244. The MA1 signal from the counter 240 is applied through a four-bit delay circuit 246, and the output of the delay circuit 246 is applied to a logic circuit 248, which provides the MADD signal. The MA1 signal is also applied to a logic circuit 250, the output of which is applied as the input to the sixteenth stage of the counter 240.

The 10 stage of the counter 240, in addition to having the MA11 signal applied thereto, also has the MADT signal and the MADD signal applied thereto. The second stage of the counter 240, in addition to having the MA3 signal applied thereto, has the MAB signal and the signal appearing on the memory buss 22 applied thereto. The first stage of the counter 240, in addition to having the MA2 signal applied thereto, has the M1CRY signal applied thereto.

The logic circuit 248, in addition to having the delay circuit 246 output signal applied thereto, has the signal appearing on the memory buss 22, the RARL1 signal, and the BRARXPC signal applied thereto. The logic circuit 250, in addition to having the MA1 signal applied thereto, has the MREAD signal and the MZMA1 signal applied thereto.

The logical equations for the counter 240 and the logic circuit 250 are:

MA16 = MA1MCR No. 4 (MA1 + MCRY)   (1-3)
MA1MCR No. 4 = (MA1 MCRY)/   (4)
MA16 No. 2 = (MA16 No. 1)/   (2)
MDC = (MA16 No. 2)/   (3)
MA15 = MA16   (1-3)

MA14 = MA15   (1-3)
MA15 No. 2 = (MA15 No. 1)/   (2)
MA14 No. 2 = (MA14 No. 1)   (2)
MDC1 = (MA15 No. 2 + MA14 No. 2)/   (3)
MDC2 = (MA15 No. 2 + MA14 No. 1)/   (3)
MDC3 = (MA15 No. 1 + MA14 No. 2)/   (3)
MDC4 = (MA15 No. 1 + MA14 No. 1)/   (3)
MA13 = MA14   (1-3)
MA12 = MA13   (1-3)
MA11 = MA12   (1-3)
MA10 = MA11 MADT/ + MADT MADD   (1-3)
MA9 = MA10   (1-3)
MA8 = MA9   (1-3)
MA7 = MA8   (1-3)
MA6 = MA7   (1-3)
MA5 = MA6   (1-3)
MA4 = MA5   (1-3)
MA3 = MA4   (1-3)
MA2 = MA3 MAB/ + MAB MB   (1-3)
MA1 = MA2 MZMA1/ TCIR3   (1-3)
MCRY = TCIR3 MADT/ MAB/ (TP2 (MADVCR MZMA1/ + M1CRY) + MCRY MA1 TP14/)   (1-3)
MADVCR = MREAD + MRB3 TP13 + MADVCR TP2/   (1-3)
TCIR3 = TCIR/

The incrementing function of the address register 24 is performed in the logic circuit 250 by means of an exclusive OR gate which applies the input signal to the sixteenth stage of the counter 240 along with a carry flip-flop which provides a MCRY signal. The MCRY signal is set when the address register 24 is to increment and is held as long as logical "1" bits are coming out of the counter 240 as the MA1 signal. In the normal incrementing processing of information by the address register 24, the MAB, the MADT, the MZMA1, and the M1CRY signals are all nonvarying and set at a logical "0," while the TCIR3 and the MADVCR signals are nonvarying and set at a logical "1." Thus, the MCRY signal is set by the TP2 timing pulse and comes true at time TP3. It will be reset as soon as the MA1 signal becomes a logical "0."

The MA5–MA16 stages of the counter 240 control the location of the read-only memory 14 which is to be read, and the state of MA5–MA16 at TP15 is the valid count.

The following table shows an example of how a binary 11 (1–0–1–1) in the counter 240 is incremented to a binary 12 (1–1–0–0) between the TP15 times. In the table, a "1" indicates that the signal is on, or logical "1," whereas the absence of a "1" indicates that the signal is off, or logical "0."

| TP | 15 | 16 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| MCRY | | | | | 1 | 1 | 1 | | | | | | | | | | |
| MA16 | | | | | | | | 1 | 1 | | | | | | | | |
| MA15 | | | | | | | | | 1 | 1 | | | | | | | |
| MA14 | | | | | | | | | | 1 | 1 | | | | | | |
| MA13 | | | | | | | | | | | 1 | 1 | | | | | |
| MA12 | | | | | | | | | | | | 1 | 1 | | | | |
| MA11 | | | | | | | | | | | | | 1 | 1 | | | |
| MA10 | | | | | | | | | | | | | | 1 | 1 | | |
| MA9 | | | | | | | | | | | | | | | 1 | 1 | |
| MA8 | 1 | | | | | | | | | | | | | | | 1 | 1 |
| MA7 | | 1 | | | | | | | | | | | | | | | 1 |
| MA6 | 1 | | 1 | | | | | | | | | | | | | | |
| MA5 | 1 | 1 | | 1 | | | | | | | | | | | | | |
| MA4 | | 1 | 1 | | 1 | | | | | | | | | | | | |
| MA3 | | | 1 | 1 | | 1 | | | | | | | | | | | |
| MA2 | | | | 1 | 1 | | 1 | | | | | | | | | | |
| MA1 | | | | | 1 | 1 | | 1 | | | | | | | | | |

From this table, it is seen that the carry flip-flop signal MCRY is set after the TP2 time and remains set until after a logic "0" appears as the MA1 signal. As long as both the MA1 and the MCRY signals are either logical "0" or logical "1," the signal applied to the MA16 stage at the next TP pulse will be a logical "0." However, when only one, but not both, of the MA1 and MCRY signals are logical "1," then a logical "1" will be applied to the MA16 stage; in other words, an exclusive logical OR function of these two signals is performed, as seen from the equation for MA16 shown above. Hence it is seen, by referring to the above chart, that the 1–0–1–1 initially in the eighth through fifth stages of the counter 240 is incremented to the 1–1–0 –0 by this procedure.

Certain instructions, such as the BAT, BIT, BAG and BSR instructions, require that a full 12 bits replace the contents of the counter 240. This is known as an absolute branch and is accomplished in the second stage of the counter 240. It should be recalled that the address contained at time TP15 in the counter 240 is the proper address of the instruction signal which is to be read at the following TP16 time. At time TP16, signals appear at the memory output and are applied to the parallel-to-serial converter 18. The data is applied to the memory buss 22, the first bit appearing on the memory buss 22 at the time TP1, the second bit appearing at time TP2, etc. The absolute branch address will be the first 12 bits appearing on the memory buss 22.

When an absolute branch is to occur, the MAB signal provided from the instruction decode circuit 234 in FIG. 16C will be true for the 16 bit times between TP1 and the following TP1. When this occurs, logic circuitry within the second stage of the counter 240 prevents the input from being applied thereto from the third stage and takes its input from the memory buss 22. In this manner, the 16 bits occurring during the next instruction are applied and recirculated through the address register 24 and into the counter 240. More specifically, at time TP2, the first bit of the memory response buss 22 will be stored in the second stage of the counter 240. During time TP3, the second bit of the new address will be stored in the second stage, and the first bit of the new address will be stored in the first stage. Thereafter, the bit stored in stage one of the time TP4 will be circulated through the logic circuit 250 and stored into the 16th stage. In the event of the absolute branch requirement, the MCRY signal is false because the MAB1 signal is now false, and therefore the logic circuit 250 does not increment by "one" the count applied thereto.

Certain other of the instructions require that the program counter be modified by up to plus or minus 31 locations. For this, the four bit delay 246 and logic circuit 248 are necessary. It should be recalled that the RA constant appears on the memory buss 22 from times TP7 through TP12. If the RA constant is positive, the first five bits which occur from TP7 through TP11 will contain the binary number of the relative branch and the sixth bit thereof will be a logical "0." If the branch is to be in a negative direction, the first 5 bits will be the two's complements of the RA constant, and the sixth bit will be a logical "1."

The equations pertinent to the logic circuit 248 and the delay 246 are set out below:

$$\mathrm{MPAB1} = \mathrm{MA1} \quad (1\text{-}3)$$

$$\mathrm{MPAB2} = \mathrm{MPAB1} \quad (1\text{-}3)$$

$$\mathrm{MPAB3} = \mathrm{MPAB2} \quad (1\text{-}3)$$

$$\mathrm{MPAB4} = \mathrm{MPAB3} \quad (1\text{-}3)$$

$$\mathrm{MPAB5} = \mathrm{BRARXPC}\ \mathrm{RARL1} + \mathrm{BRARXPC}/\ \mathrm{MPAB4} \quad (1\text{-}3)$$

$$\mathrm{MFTC} = \mathrm{MB}\ \mathrm{TP12} + \mathrm{MFTC}\ \mathrm{TP2}/ \quad (1\text{-}3)$$

$$\mathrm{MADIP} = \mathrm{MB} + \mathrm{MFTC} \quad (1\text{-}3)$$

$$\mathrm{MAHS} = (\mathrm{MADIP}\ \mathrm{MPAB5} + \mathrm{MADIPB5}\ \text{No. }4)/ \quad (1)$$

$$\mathrm{MADIPB5}\ \text{No. }4 = (\mathrm{MADIP} + \mathrm{MPAB5}) \quad (4)$$

$$\mathrm{MACY} = (\mathrm{TP7} + \mathrm{TP3})/((\mathrm{MADIP} + \mathrm{MPAB5})\ \mathrm{MACY} + \mathrm{MPAB5}\ \mathrm{MADIP}) \quad (1\text{-}3)$$

$$\mathrm{MACYF} = (\mathrm{MACY})/ \quad (1)$$

$$\mathrm{MADD} = ((\mathrm{MACYF} + \mathrm{MAHS})\ \mathrm{MACHS}\ \text{No. }4)/ \quad (3)$$

$$\mathrm{MACHS}\ \text{No. }4 = (\mathrm{MACYF}\ \mathrm{MAHS})/ \quad (2)$$

The MPAB1 through MPAB4 signals are the signals respectively applied from each of the four stages of the four-bit delay circuit 246. The MADD signal is the output from the logic circuit 248, and this, along with the MADT signal, is applied as the inputs of the tenth stage of the counter 240. When the MADT signal provided from the instruction decode circuit 234 is logical "0," thereby indicating no relative branches to occur, the input to stage 10 of the counter 240 is from stage 11. However, when the MADT signal is logical "1," the input to stage 10 will be the MADD signal, and the signal applied from stage 11 will be inhibited.

Referring to the above equations again, the MPAD5 signal selects the address which the RA constant is to modify. This address, it will be recalled, can be either from the address register 24 as the MPAB4 signal or from the RAR register 50 as the RARL1 signal. If the BRARXPC flag is true, the address which the RA constant is to modify will be the one stored in the RAR register 50 and provided as the RARL1 signal, and, if the BRARXPC flag is false, the address will be the one provided from the four-bit delay circuit 246 as the MPAB4 signal.

The MFTC signal is a flag indicating that the two's complement is being added. It is set if the bit on the memory buss 22 is a logical "1" at time TP12. It is reset after time TP2. The MADIP signal is the RA constant appearing on the memory buss 22.

It should be noted that the MADD signal does not come on until the TP9 timing signal is occurring. Prior to this time, the count originally defined at time TP15 by the MA5 through MA16 signals will have been transferred into the four-bit delay circuit 246 and the first eight stages of the counter 240. Thereafter, an adder circuit, defined by the remaining equations set out above, causes a binary addition between the MADIP signal and either the MPAB4 or the RARL1 signal to occur to affect the original count.

Figure 16D:
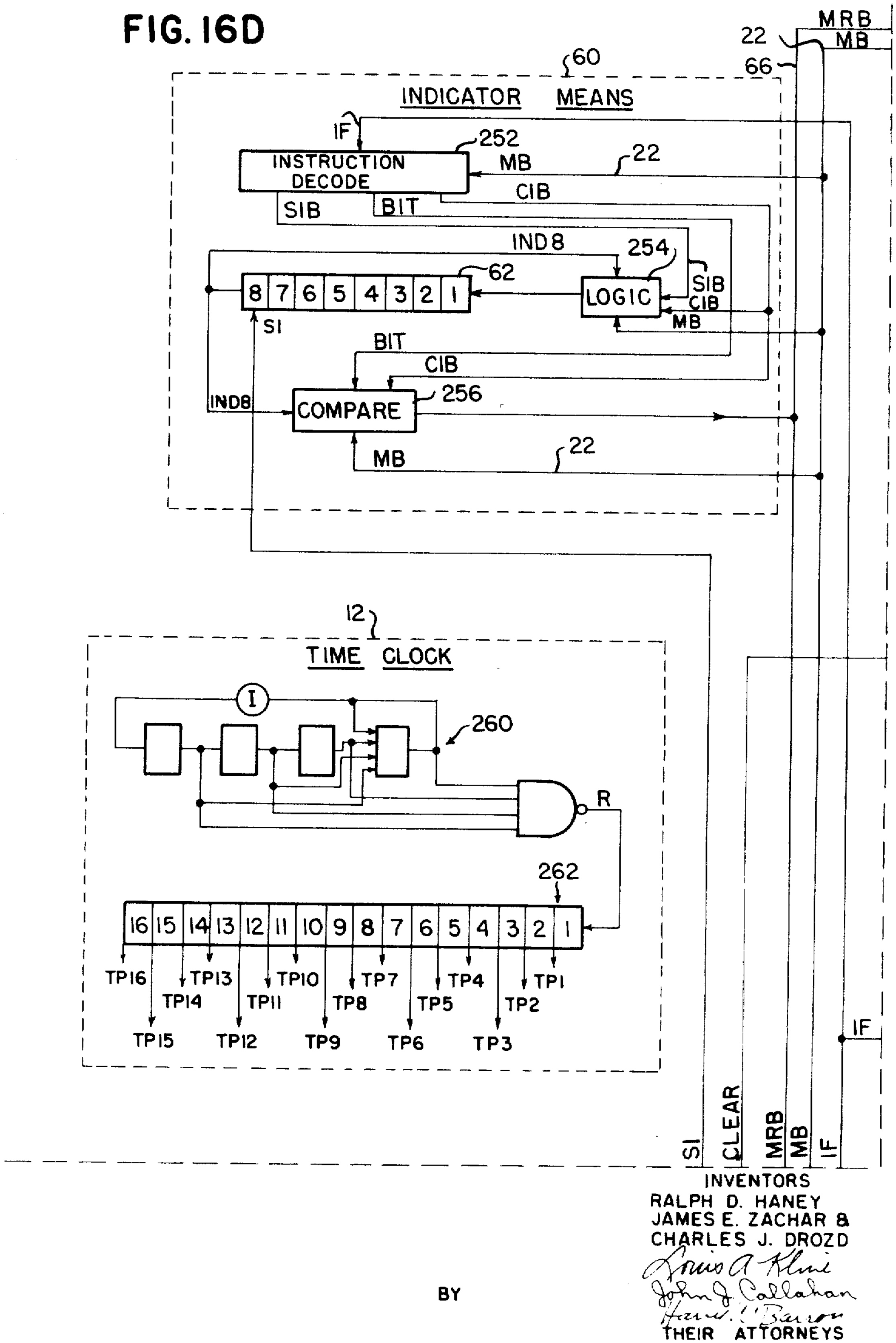

Referring now to FIG. 16D, there are shown the indicator means 60 and the timing circuit 12. Referring specifically to the indicator means 60, it is seen that it includes the indicator register 62, which is an eight-bit shift register having inputs applied to the first stage thereof and providing an output from the last stage thereof. The indicator means 60 also includes an instruction decode circuit 252, which is responsive to the application thereto of the signals appearing on the memory buss 22 and the IF signal. In response to these signals, the instruction decode circuit 252 provides the SIB, the BIT, and the CIB signals indicative of these particular instruction signals appearing on the memory buss 22.

There is also provided a logic circuit 254, which has applied thereto the IND8 output signal from the indicator register 62, the SIB and the CIB signals from the instruction decode circuit 252, and the signal appearing on the memory buss 22. There is also provided a compare logic circuit 256, which has the IND8 signal and the bit and the CIB signals and the signal on the memory buss 22 applied thereto. The compare logic circuit 256 provides the proper signal to the memory response buss 66.

The logic equations for the instruction decode circuit 252 are:

SICI = IF TP2 MBDLY MB/ + SICI TP16/ (1-3)
MBDLY = MB (1-3)
SIB = SICI MB/ MBDLY TP4 + SIB TP16/ (1-3)
CIB = SICI MB/ TP4 + CIB TP16/ (1-3)
BI = IF TP2 MB MBDLY + BI TP16/ (1-3)
BIT = BI MB MBDLY/ TP4 + BIT TP16/ (1-3)

The operation codes for the SIB and CIB signals appearing on the memory buss 22 are 0–1–0–1 and 0–0–0–1, respectively. Since the lower order two bits are logical "1" and logical "0" in both cases and appear on the memory buss 22 during times TP1 and TP2, respectively, an SICI flip-flop, which provides the SICI signal, can be used to decode this combination. The MBDLY signal delays the memory buss 22 signal by a single bit time. Therefore, as seen from the equation for SICI above, the SICI signal is set at time TP2 when the MBDLY and the MB/ signals are both logical "1" and hold until TP16 time. The SIB signal is then set after time TP1 if a logical "1" appeared on the memory buss 22 at time TP3 and a logical "0" appeared at time TP4, and it holds until time TP16. The CIB signal is set after time TP4 where a logical "0" appears on the memory buss 22 at time TP4, and this signal is on for the CIB and the SIB instruction commands. The BIT signal is similarly set when the operating code 1–0–1–1 for the BIT instruction signal occurs, and it holds until time TP16.

The equations for the eight-bit indicator register 62 are set forth below:

IND1 = IND8 CIB/ + SIB MB + IND8 MB/ (1-3)
IND2 = IND1 (1-3)
IND3 = IND2 (1-3)
IND4 = IND3 (1-3)
IND5 = IND4 (1-3)
IND6 = IND5 (1-3)
IND7 = IND6 (1-3)
IND8 = IND7 + SI (1-3)

From these equations, it is seen that the logic circuit 254 is actually a part of the first stage of the indicator register 62. the SI term which occurs in the IND8 equation sets the eighth bit of the indicator register 62 whenever a data character enters the input buffer from a port. The SI signal will be explained in more detail hereinafter with respect to FIG. 16H.

The indicator register 62 acts as a true eight-bit shift register when the CIB and SIB signals are false. Whenever a CIB instruction signal appears on the memory buss 22, the SIB signal will be false and the CIB signal will be true for the 12 bit times between TP5 and TP16. With the CIB signal true, the register 62 is no longer a pure shift register. The IND8 signal is copied in IND1 only when the memory buss 22 signal is a logical "0; " otherwise, a logical "0" is inserted as the IND1 signal. This is required result for the CIB instruction command.

If the SIB instruction is being executed, the SIB and CIB signals are true. Again the IND8 signal is copied in IND1 when the signal appearing on the memory buss 22 is logical "0." However, when the memory boss 22 signal is a logical "1," a logical "1" is inserted as the IND1 signal, regardless of what the IND8 signal was. This is the proper result for the SIB instruction command. No harm is done by having the SIB and the CIB signal flags last through time TP16 rather than becoming false at time TP12, because the signal on the memory buss 22 will always be logical "0" from time TP13 through TP16. Hence a saving in logic can be accomplished by doing this.

The indicator register 62 is framed so that the least significant bit stored therein is presented as the IND8 signal, each TP13 and TP5 time. The BIT instruction signal must compare the C code of the instruction with this output signal and determine what response to give on the memory response buss 66. This is accomplished in the compare logic 256, for which the logical equations are:

BITCRY = TP4 + BITCRY BIT (IND8 + MB/) (1-3)
MRBI No. 1 = (TP11 BIT + TP13 CIB + TP12 BITCRY (MB/ + IND8))/ (1)
MRBI No. 2 = (MRBI No. 1)/ (2)
MRBI = (MRBI No. 2)/ (3)
MRBIC = (MRBI)/ (4)
MRB = MRBIC/

The BITCRY signal always comes true at TP5 and holds as long as the BIT signal is true and either the signal on the memory bus 22 is false or the IND8 signal is true. It should be noted that, during the time TP5 through TP12, the C code of the BIT instruction will be on the memory buss 22. Hence, the BITCRY signal will be reset only when there is a logical "1" in the C code of the instruction and a logical "0" as the IND8 signal. Thus, the BITCRY signal may be used to determine whether a "take absolute branch" or a "don't take absolute branch" is required to be issued on the memory response buss 66 as the MRB signal, which is determined by the MRBIC signal.

A single inverting driver transistor provides the MRB signal to the memory response buss 66, and its input is the MRBIC signal. The MRB signal is the MRBI No. 1 signal delayed one and one half TP times. For the SIB and the CIB instructions, the CIB signal is always true, and the "read next instruction" response, which is to be generated at time TP14-½, is required. Therefore, time TP13 is used to generate it in the MRB No. 1 signal.

When the BIT signal is true, a response should be generated at time TP12-½ for both of the possible responses of "take absolute branch" and "don't take absolute branch." Therefore the MRBI No. 1 signal is set by the BIT signal being a logical "1" at time TP11. A response on the memory response buss 66 should also be given at time TP13-½ if the BITCRY signal is a logical "1" at time TP12, indicating a "take absolute branch" response. This response must be set in the MRBI No. 1 signal at time TP12. However, at time TP12 there is still one bit of the register to be tested; therefore time TP12 and the BITCRY signal only set the MRBI No. 1 flip-flop to provide the MRBI No. 1 signal when the comparison (IND8 + MB/) is also true.

Referring now to the timing circuit 12 shown in FIG. 16D, it is seen that the basic cycle is determined by a state-of-the-art four-stage Johnson counter 260, which generates a pulse once each cycle. This Johnson counter is cyclic on a 16-bit cycle, and the output signal therefrom, pulse R, is true for 15 of the 16 bit times in the cycle and false for one of those 16 times. The pulse R provided by the Johnson counter 260 is applied to a 16-bit shift register 262. The logical equations for the Johnson counter 260 and the shift register 262 are:

CR1 = CR4/ (1-3)
CR2 = CR1 (1-3)
CR3 = CR2 (1-3)
CR4 = R(CR3 + CR1 CR2 CR4) (1-3)
R = (CR1 CR2 CR3 CR4)/ (4)
TP1 = R (1-3)
TP2 = TP1 (1-3)
TP3 = TP2 (1-3)
TP4 = TP3 (1-3)
TP5 = TP4 (1-3)
TP6 = TP5 (1-3)
TP7 = TP6 (1-3)
TP8 = TP7 (1-3)
TP9 = TP8 (1-3)
TP10 = TP9 (1-3)
TP11 = TP10 (1-3)
TP12 = TP11 (1-3)
TP13 = TP12 (1-3)
TP14 = TP13 (1-3)
TP15 = TP14 (1-3)
TP16 = TP15 (1-3)

Note that each of the TP terms above is inverted. However, before being applied to other portions of the digital processor 10, they are applied through an inverting driver.

One bit time after the false R signal is applied to the input of the first stage of the shifter register 262, a signal TP1 is applied as the output of the first stage. One bit time later, a signal TP2 is applied as the output of the second stage, etc., until sixteen bit times after the false R pulse occurred, a signal is applied from the output of the sixteenth stage of the shift register 262. At that time, a new false R pulse is being applied to the first stage, which later appears as a new set of TP1 through TP16 signals. The time period of the Johnson counter 260 may be 111 microseconds.

Figure 16E:
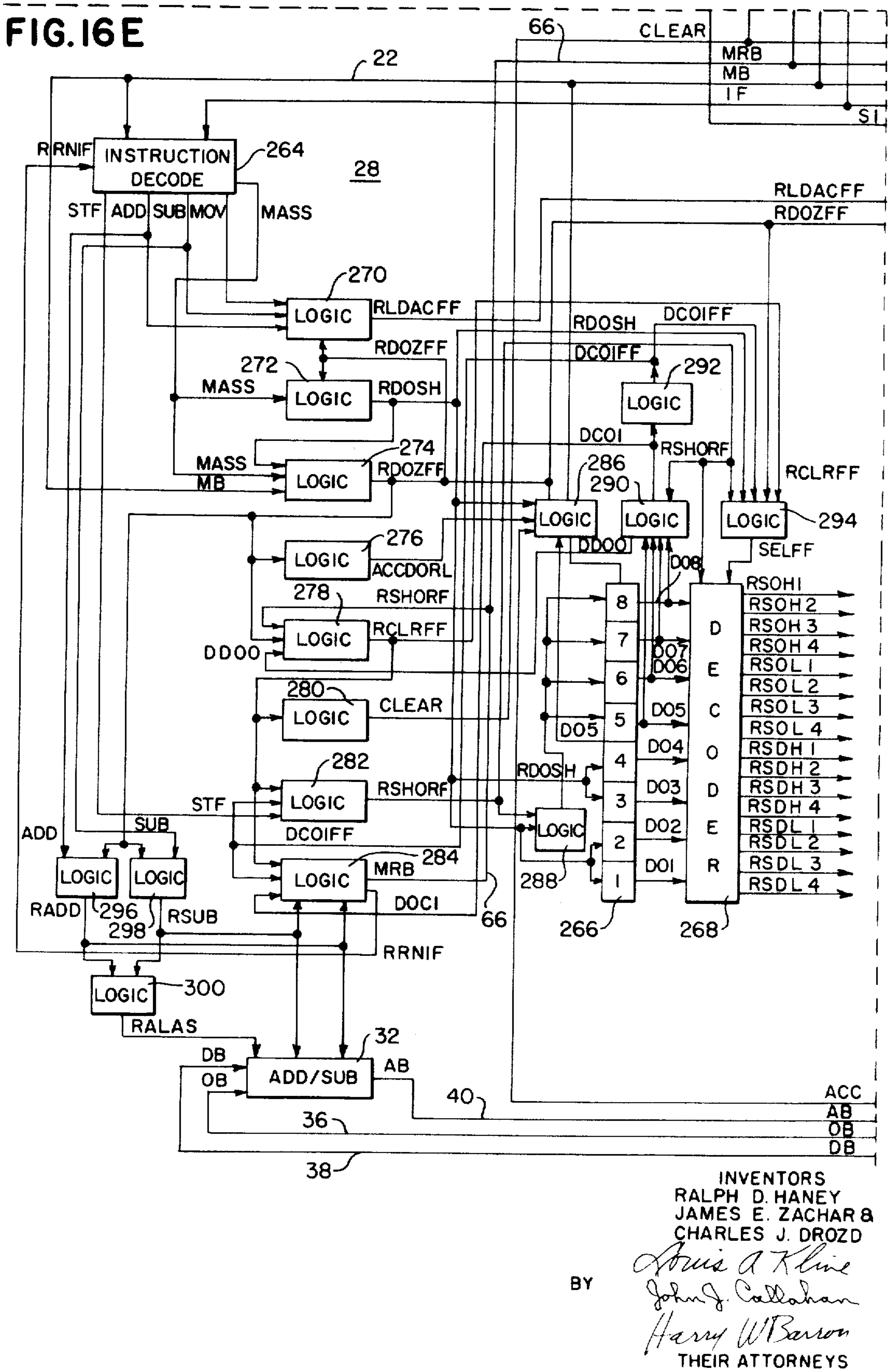

Referring now to FIG. 16E, there is shown a detailed diagram of the transfer control and register selection means 28. The transfer control and register selection means 28 includes an instruction decode circuit 264, which is responsive to the application thereto of the signals appearing on the memory buss 22, the IF instruction flag signal provided by the logic circuit 188 in FIG. 16B, and a RRNIF signal, which is the memory response buss 66 signal inverted. In response to these three signals, the instruction decode circuit 264 provides an SFT signal, an ADD signal, a SUB signal, and a MOV signal, each respective one of which is provided when the instruction signal bearing the same description appears on the memory buss 22. In addition to these four signals, the instruction decode circuit 264 also provides a MASS signal any time any of the SFT, ADD, SUB, or MOV signals are provided. The logic equations for the instruction decode circuit 264 are:

MASS = IF TP2 MB MBDLY/ + MASS TP10/ (1-3)
MBDLY = MB (1-3)
MOV 1 = (MASS TP4 MB/ MBDLY/ + MOV RRNIF)/ (1)
MOV = (MOV 1 + TCIR)/ (3)
SFT = MASS TP4 MB MBDLY + SFT TP15/ (1-3)
ADD No. 1 = (MASS TP4 MB/ MBDLY + ADD RRNIF)/ (1)
ADD = (ADD No. 1 + TCIR)/ (3)
SUB No. 1 = (MASS TP4 MB MBDLY/ + SUB RRNIF)/ (1)
SUB = (SUB No. 1 + TCIR)/ (3)

Since the least significant two bits of each operation code of the MOV, ADD, SUB, and SFT instruction signals are the same (that is 1–0), a single flip-flop can be used as a common decode for these two bits. This results in the MASS signal being provided when any of these four instruction signals occurs. The remaining two bits of the four-bit operation code for each of the four instruction signals is then decoded by logic defined, the remainder of the equations given above in four individual flip-flops resulting in the MOV, the SFT, the ADD, and the SUB signals being provided. The MASS signal comes true at time TP3 and remains true through time TP10. After time TP4, the appropriate one of the four signals MOV, ADD, SUB, or SFT becomes true, depending upon the memory buss 22 signal at times TP3 and TP4. The MOV, ADD, and SUB signals will remain set until they are reset by the RRNIF signal going false as a result of a response on the memory response buss 66. The SFT signal is reset by the TP15 timing signal.

The remainder of the transfer control and register selection circuit 28 includes a plurality of logic circuits each of which will be discussed hereinafter, and a DO (destination-origin) register 266, which provides a plurality of signals to a decoder circuit 268. The decoder circuit 268 provides the RSOH1 through RSDL4 signals applied to the various selectable registers in the digital processor 10. Each of the plurality of logic circuits, the DO register 266, the decoder circuit 268, and the ADD/SUB circuit 32 of the transfer control and register selection means 28 will first have their structure and timing described individually, and thereafter a description of the operation of the entire transfer control and register selection means 28 will be given.

The logic circuit 270, in response to the MOV, the SUB, and the ADD signals and a signal to be described, designated as the RDOZFF signal, provides the RLDACFF signal, which is applied to the accumulator means 44, according to the logic equation:

RLDACFF = TP14 RDOZFF/ (MOV + ADD + SUB) + RLDACFF TP6/ (1-3)

The RLDACFF signal is set after time TP14 if RDOZFF is false and one of the MOV, ADD, or SUB signals is true; it is reset at the following TP6 time.

The logic circuit 272 is responsive to the MASS signal applied from the instruction decode circuit 264 and the RDOZFF signal, and provides the RDOSH signal in accordance with the logical equation:

RDOSH = TP4 (RDOZFF + MASS) + RDOSH TP12/ (1-3)

The RDOSH signal is set with the TP4 and the MASS or RDOZFF signals and is reset at TP12.

The logic circuit 274 is responsive to the RDOSH signal, the MASS signal, and the signal appearing on the memory buss 22 and provides the RDOZFF signal at its output. The logical equation for this circuit is:

RDOZFF = MASS TP4 + RDOZFF (RDOSH MB/ + RDOSH/ TP4/) (1-3)

The RDOZFF signal is set after time TP4 when the MASS signal is true, and it remains set as long as a logical "0" appears on the memory buss 22 and the RDOSH signal is true, or until the following time TP4 when the RDOSH signal goes false if not previously reset by a logical "1" on the memory buss 22.

The logic circuit 276 is responsive to the RDOZFF signal provided by the logic circuit 274 and provides the ACCDORL signal according to the equation:

ACCDORL = RDOZFF TP4 + ACCDORL TP12/ (1-3)

The ACCDORL signal is set after time TP4 if the RDOZFF signal is true at time TP4, and it is held from time TP5 through time TP12.

The logic circuit 278 is responsive to an RSHORF signal, the RDOZFF signal, and a DDOO signal to provide the RCLRFF signal as its output, according to the logical equation:

RCLRFF = TP13 RSHORF DDOO RDOZFF/ + RCLRFF TP51 (1-3)

The RCLRFF signal is set with the RDOZFF signal being false and the DDOO and RSHORF signals being true at time TP13, and is reset after the following TP5 time.

The logic circuit 280 is responsive to the RCLRFF signal to provide the CLEAR signal according to the logic equation:

CLEAR = RCLRFF/ (1)

The logic circuit 280 is merely a "1" gate inverter, which inverts the RCLRFF signal.

The logic circuit 282 responds to the RCLRFF signal, the DC01FF signal, and the SFT signal to provide the RSHORF signal according to the logical equation:

RSHORF No. 1 = (SFT TP11 + RSHORF RRESH)/ (1)
RSHORF = (TCIR + RSHORF No. 1)/ (3)
RRESH = ((TP3 + TP11) (RCLRFF + DC02FF))/ (4)

The RSHORF signal is set at time TP12 when the SFT signal is true at time TP11, and holds until it is reset by the RRESH signal going false. The RRESH signal can go false at either TP3 or TP11 when either the RCLRFF signal or the DC01FF signal is true.

The logic circuit 284 is responsive to the RCLRFF signal, the DC01FF signal, the DC01 signal, the RADD signal, and the RSUB signal, and provides the RRNIF signal and the MRB signal to the memory response buss 66. The logical equations for the logic circuit 284 are:

RRNIF = (TP14(DC01 + DC01FF + RADD + RSUB + RCLRFF + RDOZFFI MOV))/ (4)
MRB = (RRNIF)/ (1)
RDOZFF No. 2 = (RDOZFF No. 1)/ (2)
RDOZFFI = (RDOZFF No. 2)/ (3)

The MRB signal is applied to the memory response buss 66, and it is merely the RRNIF signal applied to a "1" gate. The RRNIF signal is false at time TP14 to cause the MRB signal to be true at time TP14-½, thereby indicating the "read next instruction" response.

The DO register 266 is an eight-bit shift register which can provide the signals D01 through D08 at eight respective outputs thereof. The logical equations for the DO register 266 are:

D08 = RDOSH (MB + ACC ACCDORL) + RDOSH/ RSHORFDL RDOZFF/ (D05 RDCCFF)/ (D05 + RDCCFF) + (RDOSH + RSHORFDL)/ D08 (1-3)
D07 = (RDOSH + RSHORFDL) D08 + (RDOSH + RSHORFDL)/ D07 (1-3)
D06 = (RDOSH + RSHORFDL) D07 + (RDOSH + RSHORFDL)/ D06 (1-3)
D05 = (RDOSH + RSHOFDL) D06 + (RDOSH + RSHORFDL)/ D05 (1-3)
D04 = RD0SH D05 + RD0SH/ D04 (1-3)
D03 = RD0SH D04 + RD0SH/ D03 (1-3)
D02 = RD0SH D03 + RD0SH/ D02 (1-3)
D01 = RD0SH D02 + RD0SH/ D01 (1-3)
D08 No. 2 = (D08 No. 1)/ (2)
D07 No. 2 = (D07 No. 1)/ (2)
D06 No. 2 = (D06 No. 1)/ (2)
D05 No. 2 = (D05 No. 1)/ (2)
D04 No. 2 = (D04 No. 1)/ (2)
D03 No. 2 = (D03 No. 1)/ (2)
D02 No. 2 = (D02 No. 1)/ (2)
(D01 No. 2 = (D01 No. 1)/ (2)
RDCCFF = TP4 + TP12 + D05/ RDCCFF (1-3)
RSHORFDL = RSH0RF (1-3)

The logic circuit 286 is actually a portion of the eighth stage of the D0 register 266 in accordance with the equation for D08. The logic circuit 286 is responsive to the application of the D05 signal, the ACC signal from the accumulator register 56, the ACCD0RL signal from the logic circuit 276, and the RD0SH signal from the logic circuit 272. The logic circuit 288 provides the (RD0SH + RSH0RFUL) signal to the fifth through eighth stages of the D0 register 266. The logic circuit 288 is responsive to the RSH0RF signal provided by the logic circuit 282 and to the RD0SH signal provided by the logic circuit 272. The RD0SH signal provided by the logic circuit 272 is also applied to the first through fourth stages of the D0 register 266.

The D05 through D08 signals of the D0 register 266 are provided as inputs to the logic circuit 290, along with the RSH0RF signal from the logic circuit 282. The logic circuit 290 provides a DC01 output signal and a DD00 output signal upon the occurrence of certain other signals. The logical equations for the logic circuit 290 are:

DC01 No. 1 = (D08 + D07 + D06 + D05/ + RSH0RFDL/ + DC0F)/ (1)
DC0F = (TP5 + TP13)/ (4)
DC01 No. 2 = (DC01 No. 1)/ (2)
DC01 = (DC01 No. 2)/ (3)
DD00 = (D08 No. 2 + D07 No. 2 + D06 No. 2 + D05 No. 2)/ (3)

The DC01 signal provided by the logic circuit 290 is applied as an input to the logic circuit 292 to set a DC01FF signal, which is reset after time TP4 according to the equation:

DC01FF = DC01 + DC01FF TP4/ (1-3)

The logic circuit 294 is provided to provide a SELFF signal to the decode circuit 268. The logic circuit 294 is responsive to the RD0ZFF signal, the RCLRFF signal provided by the logic circuit 278, the DC01FF signal provided from the logic circuit 292, the RD0SH signal provided from the logic circuit 272, and the RSH0RF signal provided from the logic circuit 282. The logic equation for the logic circuit 294 is:

SELFF = TP12 RD0SH (RD0ZFFI + MB) + SELFF ((TP4 + TP12)/ + (RCLRFF + DC01FF)/ (TP4/ + RSH0RF)) (1-3)

The SELFF signal is provided at time TP12 if the RD0SH signal is true and if either the RD0ZFFI or memory buss 22 signals are true; this occurs for the D, 0 ≠ 0 option when it is reset at time TP4. Where D, 0 = 0, the RD0ZFFI signal inhibits the SELFF signal for one cycle.

The decoder circuit 268 is responsive to the D01 through D08 signals, and the SELFF signal and the RSH0RF signal. It provides the RS0H1 through RS0H4, the RS0L1 through RS0L4, the RSDH1 through RSDH4, and the RSDL1 through RSD14 signals, which are subsequently applied to the various selectable registers associated with the digital processor 10. The logical equations for the decoder circuit 268 are:

RS0H1 = (SELFF No. 1 + D04 No. 2 + D03 No. 2)/ (3)
RS0H2 = (SELFF No. 1 = D04 No. 2 + D03 No. 1)/ (3)
RS0H3 = (SELFF No. 1 + D04 No. 1 + D03 No. 2)/ (3)
RS0H4 = (SELFF No. 1 + D04 No. 1 + D03 No. 1)/ (3)
RS0L1 = (SELFF No. 1 + D02 No. 2 + D01 No. 2)/ (3)
RS0L2 = (Selff No. 1 + D02 No. 2 + D01 No. 1)/ (3)
RS0L3 = (SELFF No. 1 + D02 No. 1 + D01 No. 2)/ (3)
RS0L4 = (SELFF No. 1 + D02 No. 1 + D01 No. 1)/ (3)
RSDH1 = (SELFF No. 1 + RSH0RF2 + D08 No. 2 + D07 No. 2)/ (3)
RSDH2 = (SELFF No. 1 + RSHORF2 + D08 No. 2 + D07 No. 1)/ (3)
RSDH3 = (SELFF No. 1 + RSH0RF2 + D08 No. 1 + D07 No. 2)/ (3)
RSDH4 = (SELFF No. 1 + RSH0RF2 + D08 No. 1 + D07 No. 1 (3)
RSDL1 = (SELFF No. 1 + RSHORF2 + D06 No. 2 + D05 No. 2)/ (3)
RSDL2 = (SELFF No. 1 + RSH0RF2 + D06 No. 2 + D05 No. 1)/ (3)
RSDL3 = (SELFF No. 1 + RSHORF2 + D06 No. 1 + D05 No. 2)/ (3)
RSDL4 = (SELFF No. 1 + RSH0RF2 + D06 No. 1 + D05 No. 1)/ (3)
RSHORF2 = (RSHORF No. 1)/ (2)

The logic circuit 296 is associated with the ADD/SUB circuit 32, and, in response to the ADD signal and the RD0ZFF signal, it provides the RADD flag signal. The logic circuit 298 is also associated with the ADD/SUB circuit 32, and, in response to the SUB signal and the RD0ZFF signal, it provides the RSUB signal. The RADD and the RSUB signals are applied to the logic circuit 300 to provide an RALAS signal. The logical equations for the logic circuits 296, 298, and 300 are:

RADD = RD0ZFF/ ADD TP13 + RADD TP5/ (1-3)
RSUB = RD0ZFF/ SUB TP13 + RSUB TP5/ (1-3)
RALAS = (RSUB No. 1 RADD No. 1)/ (2)

The ADD/SUB circuit 32 is a standard full adder circuit. It has as inputs the RALAS signal provided from the logic circuit 300, the RADD signal from the logic circuit 296, the RSUB signal from the logic circuit 298, and the signals appearing on the origin buss 36 and the destination buss 38.

The ADD/SUB circuit 32 provides an output to the arithmetic buss 40 in response to the signals applied thereto. The logical equations for the ADD/SUB circuit 32 are:

DB3 = (DB RALAS)/ (3)
0B3 = (0B)/ (3)
0B1 = (0B3)/ (1)
0B2 = (0B1)/ (2)
AD4 = (DB3 + CRY)/ (4)
AD1 = (AD4 + DB3 CRY)/ = ((DB(RADD + RSUB)) + CRY)/ (1)
AD2 = (AD1 + 0B1)/ (2)
AD3 = (AD2 + AD1 0B1)/ = (OB + CRY + (DB(RADD + RSUB)))/ (3)
AB = AD3/
BD4 = DB3 + RSUB)/ (4)
BD1 = (BD4 + RSUB DB3)/ (1)
CRY = TP14 No. 2 + (BD1 + CRY No. 1 OB2) (CRY No. 1 + OB2))/ (3)
CRY No. 1 = (CRY)/ (1)
TP14 No. 2 = (TP14 No. 1)/ (2)
TP14 No. 1 = (TP13)/ (1)

With the above structural description in mind, the operational description of the transfer control and register selection means 28 will now be described. For each of the four instruction signals MOV, ADD, SUB, and SFT, the fifth through 12th bits must be loaded into the DO register 266 for storage of the D and the 0 codes. The D and the 0 codes are loaded into the D0 register 266 from the memory buss 22 through the logic circuit 286. This entry is serially into the eighth stage of the D0 register 266 from times TP5 through TP12. The RD0SH signal, which is true during this time, allows the entry.

When the RDOSH signal becomes false after time TP12, the D0 register 266 is held bit static as long as the RSH0RFDL signal is false, and this signal is active only during the SFT command, when the upper four bits of the DO register 266 become a decrement-by-one counter in order to count the number of shifts. For the present, assume that RSH0RFDL is false, and that the D and the 0 codes are not binary "0."

After the D and the 0 codes have been loaded into the D0 register 266, the decoder circuit 268 decodes these and provides the proper register selection signals to select the origin and destination registers. In the case of the SFT command, only an origin register will be selected. The decode circuit 268 will do the actual decoding under the control of the SELFF signal, which is turned on at time TP12 when the RD0SH signal and either the RD0ZFFI signal or the signal on the memory buss 22 are true. This will occur as long as both the D code and the 0 code of the instruction command are not equal to binary zero. The SELFF signal will then hold until TP4. The RSO __ signals which select the origin registers normally go on from TP12-½ to TP3-½. For the MOV, ADD, and SUB instruction signals, the RSD __ signals which select the proper destination register are provided in the same manner as the RS0 __ signals as long as the RSH0RF2 signal is a logical " 0," which is the case except for the SFT instruction signal.

Where the D code and the 0 code of the instruction are both equal to binary zero, additional time must be taken to transfer the contents of the accumulator register 56 into the DO register 266 to replace bits five through 12 of the instruction signal. The accumulator register 56 output signal is designated ACC and is presented with the lowest order bits first, beginning with time TP5 and ending with time TP12. An extra 16-bit time cycle is necessary for execution of each of the instructions when the D and 0 codes of the instruction are both equal to zero. The D0 register 266 is then loaded during the times TP5 through TP12 of the extra cycle required for execution of the instruction. At this time, a serial code is performed on the incoming bits on the memory buss 22.

The D, 0 = 0 condition is detected by use of the R0DZFF signal provided by the logic circuit 274. This signal is set at time TP4 when any one of the four instruction signals is detected in the instruction decode circuit 264. As long as the signal on the memory buss 22 is false, the RD0ZFF signal will remain true at least until the RDOSH signal goes false. When the RDOSH signal goes false, the RDOZFF signal will hold until the following TP4 time, unless it has previously been reset due to the presence of a logical "1" bit on the memory buss 22. Thus, the RD0ZFF signal being true any time after TP12 indicates that the D and 0 codes of the instruction are both equal to zero.

The equation for D08 given above shows that the D0 register will accept the character from the accumulator register 56 if the RD0SH signal and the ACCD0RL signal are both true. This will be the case from TP5 through TP12 following the detection of the D, 0 = 0 condition, and the eighth stage of the D0 register 266 will then be responsive to the ACC signal applied thereto from the accumulator register 56. After this time, the normal selection will occur with the SELFF signal coming true.

The operation for the MOV, ADD, and SUB instruction signals is performed in the ADD/SUB circuit 32 in accordance with the RADD, RSUB, and RALAS signals appearing at the outputs of the logic circuits 296, 298, and 300, respectively. For the MOV, ADD, and SUB instructions, a data signal is present on the origin buss 36, and, for the ADD and SUB instructions, a data signal is present on the destination buss 38. These signals are provided from a "1" gate from times TP13-½ through the following TP4-1/2. A 1-1/2 bit delay in the ADD/SUB circuit 32 will put the output data on the arithmetic buss 40 from times TP15 through the following TP6. The occurrence of the ADD or the SUB signals from the instruction decode circuit 266 results in the triggering of a latch circuit in one of the logic circuits 296 or 298, resulting in the respective application of the RADD signal or the RSUB signal from times TP13 through the following TP5. If the RDZ0FF (D, 0 = 0) signal is true, the RADD signal and the RSUB signal are postponed one cycle. Only one of the RADD or the RSUB signals will be provided to the ADD/SUB circuit 32, or neither of these signals will be provided in the event that a M0V instruction has been provided on the memory buss 22.

For a M0V instruction signal, the ADD/SUB circuit takes the data appearing on the origin buss 36, delays it one and one half bit times, and then applies it to the arithmetic buss 40. In the event the RADD signal is applied, the ADD/SUB circuit 32 will perform a binary addition of the signals on the origin buss 36 and the destination buss 38 and apply a signal resulting from the binary addition to the arithmetic buss 40. Similarly, if the RSUB signal is true, the ADD/SUB circuit 32 will subtract the binary number of the signal appearing on the origin buss 36 from the binary number of the signal appearing on the destination buss, and apply a signal manifesting the difference to the arithmetic buss 40.

The RLDACFF signal is provided by the logic circuit 270 from time TP5 through TP12 to cause the accumulator means 44 to load the signal appearing on the arithmetic buss 40 into the accumulator register 56.

The operation in the case of the SFT command is different from that in the case of the MOV, the SUB, and the ADD commands. The number of shifts to be executed is the D code of the instructions, and, thus, the execution time is a direct function of this parameter. The D08 equation of the D0 register 266 is repeated here for easy reference:

D08 =RD0SH (MB + ACC ACCDORL) + RDOSH/ RSH0RFDL RD0ZFF/ (D05 RDCCFF)/ (D05 + RDCCFF) +(RD0SH + RSH0RFDL)/D08

The first term of this equation is for the D, 0 = 0 condition, which operates the same for the SFT command instruction as it did for the other three instructions. The third term is a holding term for the MOV, ADD, and SUB instructions. If both the RD0SH and the RSH0RFDL signals are false, the D0 register becomes a bit static. When the RSH0RFDL signal is true, for the SFT command, the fifth through eighth stages of the D0 register become a decrementing counter. The second term in the D08 equation is the implementation for the decrementing action. When RD0SH signal is false, indicating that the register is not being loaded, the RD0ZFF signal is false, indicating that the D, 0 0 condition, and the RSH0RFDL signal is true, indicating that an SFT instruction is to be executed, the down count term becomes (D05 RDCCFF)/(D05 + RDCCFF).

When the SFT instruction is being executed, a complete character shift in the selected register is accomplished each eight bit times, since the RDCCFF signal is set each TP4 and TP12 and reset each time a logical "1" bit appears as the D05 signal. The down counter tracks the number of shifts, and, as long as it is not binary zero, the RDCCFF signal is set each 8 bit times.

The DC01FF signal is set by the DC01 signal triggering a flip-flop, and this signal holds until time TP4. The DC01 signal occurs whenever the count in the fifth through eighth stages of the D0 register 266 is 0–0–0–1 at either time TP5 or time TP13 and the RSH0RFDL signal is false. This indicates that the SFT instruction signal is nearly complete; the DC01FF signal goes true, the RRESH signal then goes false for one bit time, allowing the RSH0RF signal to be reset and thus bring the SFT instruction execution to a halt.

The RCLRFF signal is set for the case where the 0 code, or register number, is non-zero and the D code, or number of shifts, is zero. The equation for RCLRFF indicates that it is set with the RD0ZFF signal false (indicating that both the D and the 0 codes are not zero) and the DD00 signal true (indicating that the number of shifts is zero). This is the situation desired for the CLR subinstruction of the SFT instruction, and a signal appears on the CLEAR line which is the RCLRFF signal inverted by a "1" gate and then applied through an inverting driver.

When the RCLRFF signal goes true, the RRESH signal can go false after the following TP3 time. This, in turn, resets the RSHORF signal, and at this point the CLR instruction response is finished.

The only valid response for the memory response buss 66 to the MOV, SUB, ADD, and SFT instructions is "read next instruction," which occurs at time TP14-½. From the equation for RRNIF, it is seen that the RRNIF signal will become true during the TP14 time and that this signal is inverted by a "1" gate and applied to the memory response buss 66 one half-bit time later. Hence, the response will always be at time TP14-½.

Figure 16F:
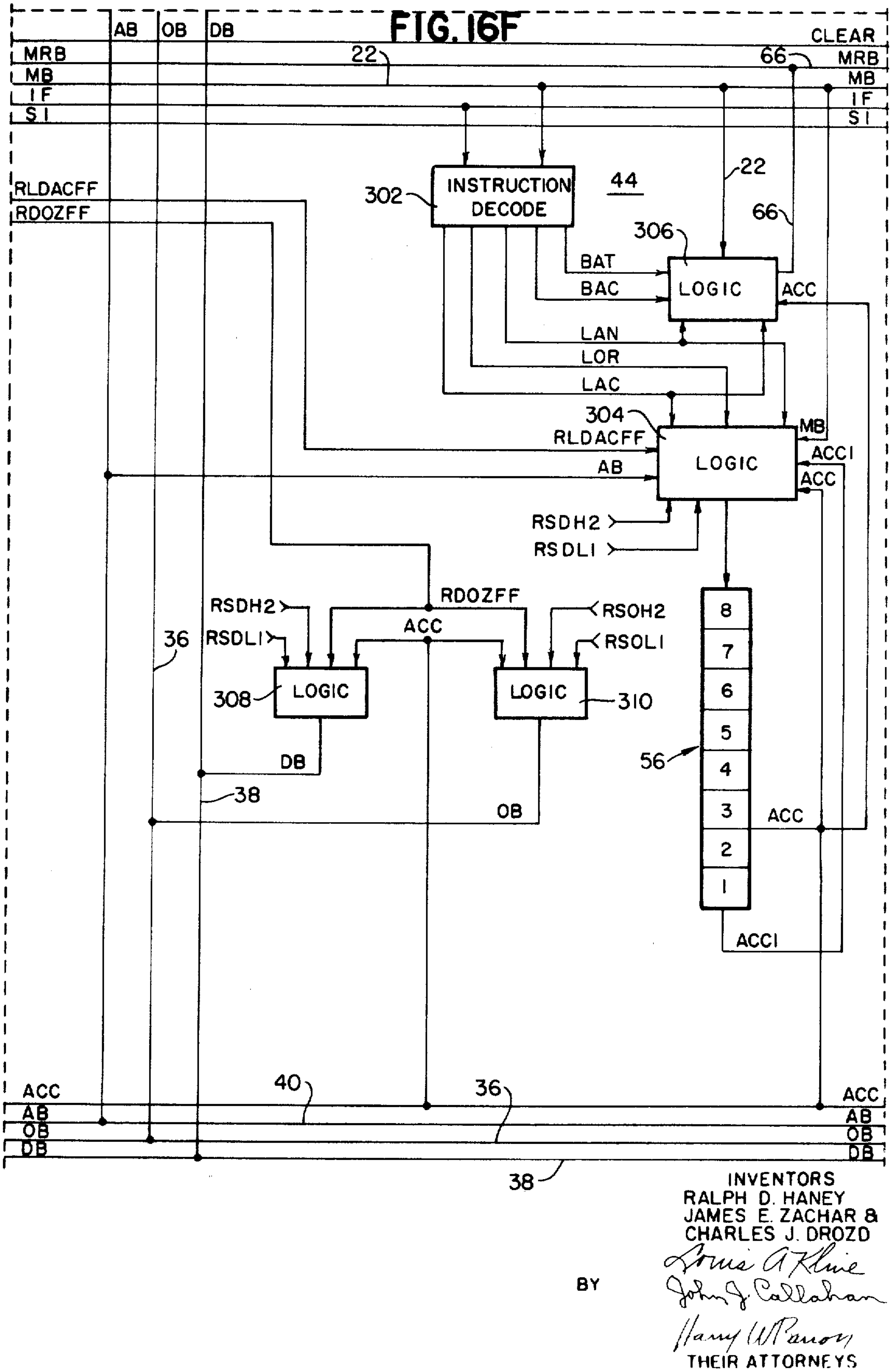

Referring now to FIG. 16F, there is shown the detailed logic diagram of the accumulator means 44. The accumulator means 44 includes the eight-bit accumulator register 56 and the logic portion 58, which includes an instruction decode circuit 302 and four logic circuits 304, 306, 308, and 310. The instruction decode circuit 302 is responsive to the signals appearing on the memory buss 22 and to the IF instruction flag signal provided by the logic circuit 188 in FIG. 16B, and it provides five signals, which respectively are the BAT, the BAC, the LAN, the LOR, and the LAC signals. Each of these five signals becomes true when the instruction decode circuit 302 detects the operation code for the instruction having the same designation.

The logic circuit 304 is responsive to the LAN signal, the LOR signal, the LAC signal, the signal on the memory buss 22, an ACC1 signal, an ACC signal, the RLDACFF signal from the transfer control and register selection means 28, the signal appearing on the arithmetic buss 40, and the RSDH2 and RSDL1 selection signals applied from the decoder circuit 268 in the transfer control and register selection means 28. In response to these signals, the logic circuit 304 performs the logic to obtain the accumulator register 56 eighth stage output signal. The BAT, the BAC, the LAN, and the LAC signals are applied to the logic circuit 306, which additionally has the signal appearing on the memory buss 22 and the ACC signal provided from the output of the third stage of the accumulator register 56. In response to these signals, the logic circuit 306 provides the proper response to the memory response buss 66.

There are also provided two additional logic circuits, 308 and 310, which couple the ACC accumulator register 56 output signal to the origin buss 36 and the destination buss 38. The logic circuit 308 has applied thereto the RSDH2 and the RSDL1 signals, and its output is connected to the destination buss 38. The logic circuit 310 has applied thereto the RS0L1 and the RS0H2 signals, and its output is connected to the origin buss 36. In addition, the ACC signal from the output of the third stage of the accumulator register 56 and the RD0ZFF signal which is applied from the logic circuit 274 in the transfer control and register selection means 28 are applied to both logic circuits 308 and 310.

The logic equations for the instruction decode circuit are:

LLLFF = IF TP2 MB/ MBDLY/ + LLLFF TP12/ (1-3)
LAC = LLLFF MB/ MBDLY TP4 + LAC TP12/ (1-3)
LAN = LLLFF MB TP4 + LAN TP12/ (1-3)
LOR = LLLFF MB MBDLY/ TP4 + LOR TP12/ (1-3)
MBDLY = MB (1-3)
BBFF = IF TP2 MB MBDLY + BBFF TP14/ (1-3)
BAT = BBFF TP4 MB/ MBDLY + BAT TP14/ (1-3)
BAC = BBFF TP4 MB/ MBDLY/ + BAC TP14/ (1-3)

From these equations, it is seen that the LAC, LAN, and LOR signals are set after time TP4 and hold through time TP12, and that the BAT and BAC signals are set after time TP4 and hold through time TP14. The LLLFF signal is used to decode the first two bits of the LAC, LAN, and LOR signals, which both are 0–0, and the BBFF signal is provided to decode the first two bits of the BAT and BAC signals, both of which are 1–1. It should be noted that the LAN signal is true whenever the LAN or the LOR instruction signal appear on the memory buss 22 because of the fact that the third and fourth bits of the operation code for the LAN signal are 1–1 and the same bits for the LOR signal are 0–1, and the fourth-bit redundancy causes this to occur.

The logical equations for the accumulator register 56 and for the logic circuit 304 are:

ACC8 = AB(LDACFF + ACCREC3) + ACAN0RIN + MEMBUSD2 + ACC1 ACCHOLD (1-3)
ACC7 = ACC8 (1-3)
ACC6 = ACC7 (1-3)
ACC5 = ACC6 (1-3)
ACC4 = ACC5 (1-3)
ACC3 = ACC4 (1-3)
ACC = ACC3
ACC2 = ACC3 (1-3)
ACC1 = ACC2 (1-3)
RLDACFF = TP14 RD0ZFF/ (MOV + ADD + SUB) + RLDACFF TP6/ (1-3)
LDACFF = (RLDACFF No. 1)/ (3)
ACCRCE = RSDH2 + RSDL1 (1-3)
ACCREC3 = (ACCREC)/ (1-2-3)
ACANOR = LOR(MB + ACC3) + MB ACC3 LAN (1-3)
ACANORIN = ACANOR (1-3)
MEMBUSD1 = MB LAC (1-3)
MEMBUSD2 = MEMBUSD1 (1-3)

ACCHOLD No.2 = (RLDACFF No.1 RACCRNI No.1)/ (2)

RACCRNI = TP6 (LAN + LAC) + TP14/ RACCRNI (1-3)

ACCHOLD = (ACCREC3 No.1 + ACCHOLD No.2) (3)

The logic circuit 304 performs the necessary logic to satisfy the first equation for ACC8 given above. The first term in this equation is the one which causes the accumulator register 56 to be loaded from the arithmetic buss 40 at the appropriate time. The LDACFF signal is true from time TP15 through the following TP6 , and the arithmetic buss 40 has the results of the MOV, ADD, or SUB instructions provided by the ADD/SUB circuit 32 during this same TP15 through TP6 time.

The third term in the equation for ACC8 (the MEMBUSD2 term) causes the accumulator register 56 to be loaded from the memory buss 22 for the LAC instruction. The C code of the LAC instruction appears on the memory buss 22 from time TP6 through TP13. The MEMBUSD2 signal then delays this 1 bit time to frame the bits from time TP7 through TP14. This establishes the basic timing for the accumulator register 56. The lowest order bit will thus be provided by the first stage of the accumulator register 56 as the ACC1 signal each TP7 and TP15 time.

The second term in the DO8 equation, ACANORIN, causes the accumulator register 56 to be loaded for the LOR and the LAN instructions. Data is taken from the third stage of the accumulator register 56 as the ACC3 (or ACC) signal, to time it with the memory buss 22 data. The ACANOR signal provides the results of logic for the LAN or LOR instructions, and the ACANORIN signal delays this result by one bit time for the input.

The fourth term of the ACC8 signal, ACC1 ACCHOLD, acts as the hold term on the accumulator register 56 whenever it is not loading other signals; that is, it allows the stored contents to recirculate every eight bits.

The logic circuit 306 is provided for testing the accumulator register 56 contents for the BAT and BAC commands and for providing the proper responses to the memory response buss 66. The logical equations for the logic circuit 306 are:

RACBRFF = TP4 + BAT RACBRFF (ACC3 + MB/) (1-3)

RTAB4 = (TP12 (BAT + BAC) + TP13 RACBRFF)/ (4)

RTAB1 = (RTAB4)/ (1)

RACCOMFF = TP4 + BAC RACCOMFF (RACL4 + MB ACC3) (1-3)

RACL4 = (MB + ACC3)/ (4)

RACCRNI = TP6 (LAN + LAC) + RACCRNI TP14/ (1-3)

TAB4 = (TP13 RACCOMFF + TP14 RACCRNI)/ (4)

TAB1 = (TAB 4)/ (1)

MRB = (RTAB1 + TAB1)/ -

The RACBRFF signal from the first equation above is unconditionally set with TP4. If the BAT instruction signal is provided on the memory buss 22, the RACBRFF signal remains true as long as either the signal then occurring on the memory buss 22 is false or when true if the ACC3 output signal is also true. This signal is valid through time TP13.

The RACCOMFF signal is set un conditionally after time TP4 and holds when a BAC instruction is being executed as long as the memory buss 22 data is the same as the ACC3 output from the accumulator register 56. It will be valid through time TP13. The RACCRNI equation is provided in response to either the LAN or the LAC signals from after time TP6 through time TP14 if the LAN or the LAC signals are provided.

The TAB1 signal is true at time TP14-½ when the RACCRNI signal is true at time TP14 or at time TP13-½ when the RACBRFF signal is true at time TP13. The TAB1 signal is applied through an inverting driver to the memory buss 66 to indicate the "read next instruction" response or the "take absolute branch" response. The RTAB1 signal is true at time TP12-½ whenever the BAT or the BAC signals are provided by the instruction decode circuit 302. The RTAB1 signal is also true at time TP13-½ when the RACBRFF signal holds through time TP13. The RTAB1 signal indicates either the "-take absolute branch" response or the "don't take absolute branch" response when it is outputted through an inverting driver to the memory response buss 66.

The equations for the logic circuits 308 and 310 are:

DB = (RSDH2 + RSDL1 + RDOZFF + ACC3)/ (1)

OB = (RSOH2 + RSOL1 + RDOZFF + ACC3)/ (1)

The output of the accumulator register 56 is the ACC3 signal, which is the ACC signal in FIG. 16, and can be provided either to the origin buss 36 or the destination buss 38 according to these equations.

It should also be noted that the equations for ACC8, ACCREC, and ACCREC3 given above with respect to the logical equations for the accumulator register 56 show how the arithmetic buss 40 signal is loaded into the accumulator register 56 when it is selected as a destination register. The equation for RLDACFF shows that, when any other register is selected as a destination register by the MOV, the ADD, or the SUB instructions, the signal appearing on the arithmetic buss 40 is also applied through the logic circuit 304 into the accumulator register 56.

Figure 16G:
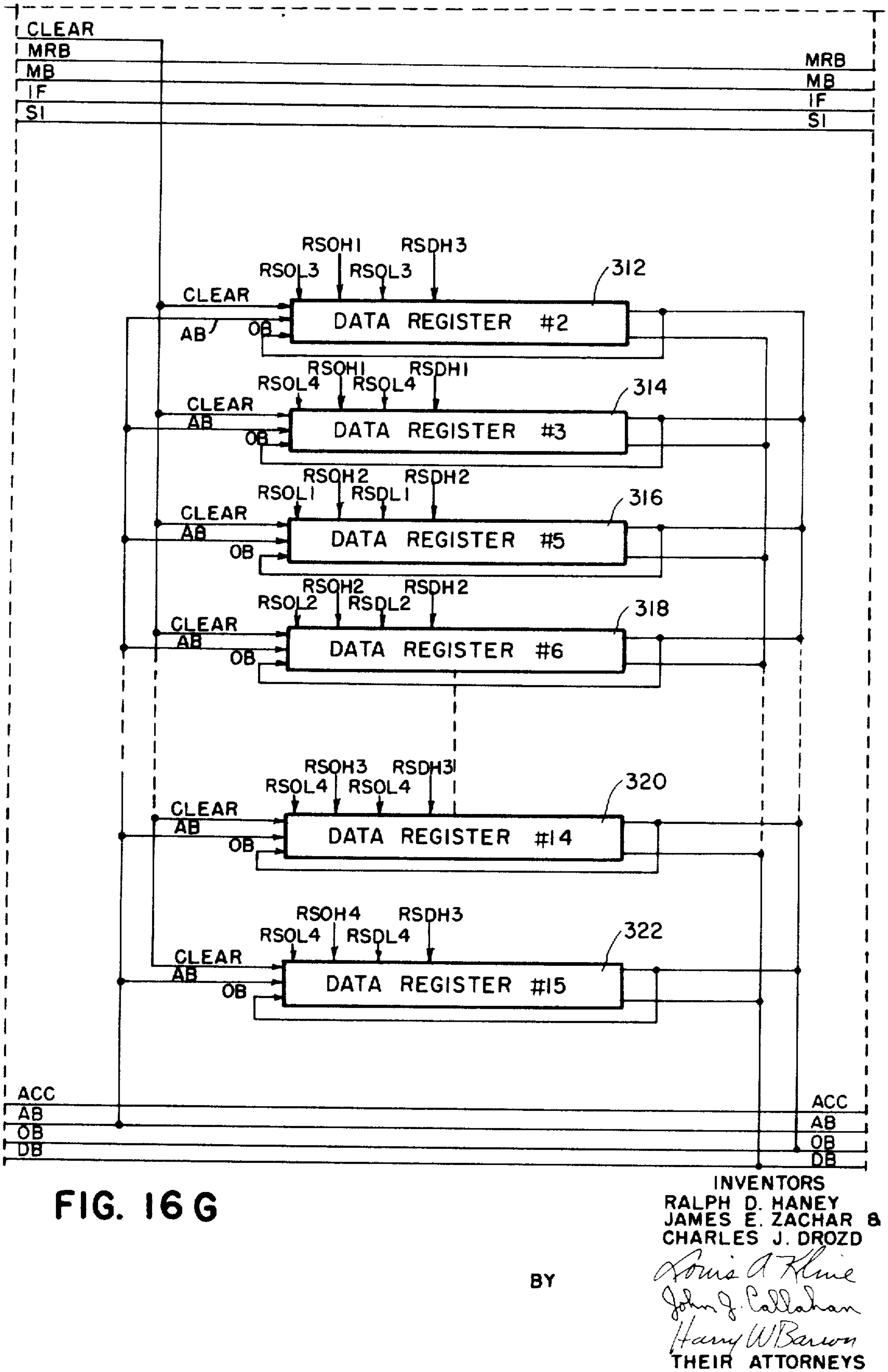

Referring now to FIG. 16G, there are shown a plurality of storage registers 312, 314, 316, 318, 320, and 322. These storage registers have been labeled as data register 2, data register 3, and data registers 5 through 15. The input buffer register which is included in the input/output means 46 is the register designated as number 0, the RAR/TA/RTC register means 42 is the register number1, and the accumulator register 56 is the register number 4.

For any particular application, all of the registers 312, 314, 316, 318, 320, and 322 may not be necessary. However, they are shown in FIG. 16G to show that they are all available for use.

The storage registers 312, 314, 316, 318, 320, and 322 may be any number of eight-bit characters in length. Each of the registers is constructed similarly with the exception of the size. The logical equations for a two-character register are:

CH1B8 = AB REC3 + CH2B1 REC2 + HOLD CH1B1 (1-3)

CH1B7 = CH1B8 (1-3)

CH1B6 = CH1B7 (1-3)

CH1B5 = CH1B6 (1-3)

CH1B4 = CH1B5 (1-3)

CH1B3 = CH1B4 (1-3)
CH1B2 = CH1B3 (1-3)
CH1B1 = CH1B2 (1-3)
CH2B8 = CH1B1 (REC3 + REC2) + HOLD CH2B1 (1-3)
CH2B7 = CH2B8 (1-3)
CH2B6 = CH2B7 (1-3)
CH2B5 = CH2B6 (1-3)
CH2B4 = CH2B5 (1-3)
CH2B3 = CH2B4 (1-3)
CH2B2 = CH2B3 (1-3)
CH2B1 = CH2B2 (1-3)
REC22 = RSOH1 + RSOL4 (1-3)
REC22No.1 = (REC22)/ (1)
REC22No.2 = (REC22No.1)/ (2)
REC33 = RSDH1 + RSDL4 (1-3)
REC33No.1B = (REC33)/ (1)
REC33A = (REC33)/ (1)
REC33NO.2 = (REC33A)/ (2)
REC2 = (REC33No.1B + CLEAR + REC22No.2)/ (3)
REC3 = (CLEAR + REC33No.2)/ (3)
HOLD = (REC33No.1B + REC22No.1)/ (3)
ORGOB = (RSOH1 + RSOL4 + CH2B3)/ (1)
DESDB = (RSDH1 + RSDL4 + CH2B3)/ (1)
OB = (ORGOB)/ -
DB = (DESDB)/ -

The operation of each character stage is the same, no matter which character is considered. Hence, only the first character stages will be considered in detail.

From these equations, it is seen that the eighth stage of the first character is coupled to the arithmetic buss 40 when the REC3 signal indicates that it has been selected as a destination register. The eighth stage of the first character is also connected to the CLEAR signal through the REC3 signal, and this causes the register to be cleared to a binary zero state. The eighth stage of the first character is further connected to the first stage of the second character, as indicated by the second term of the CH1B8 equation, given above. The third term of the CH1B8 equation is a holding term which allows each character of the register to circularly shift itself on an eight-bit timing cycle except when the HOLD term is true, and this occurs when the register is selected as either an origin or a destination register. The REC2 signal and the HOLD signal will be of opposite polarities, and, hence, when the register is selected as either an origin register or a destination register, the characters in the register will shift from one to another least significant bit first, and the second character will then be circularly shifted back to the input of the eighth stage of the first character.

The first stage of the second character is connected to the origin buss 36 and the destination buss 38, depending upon whether the register is selected as an origin register or a destination register. The equations for this are shown above by the ORGOB and the DESDB equations, respectively.

Figure 16H:
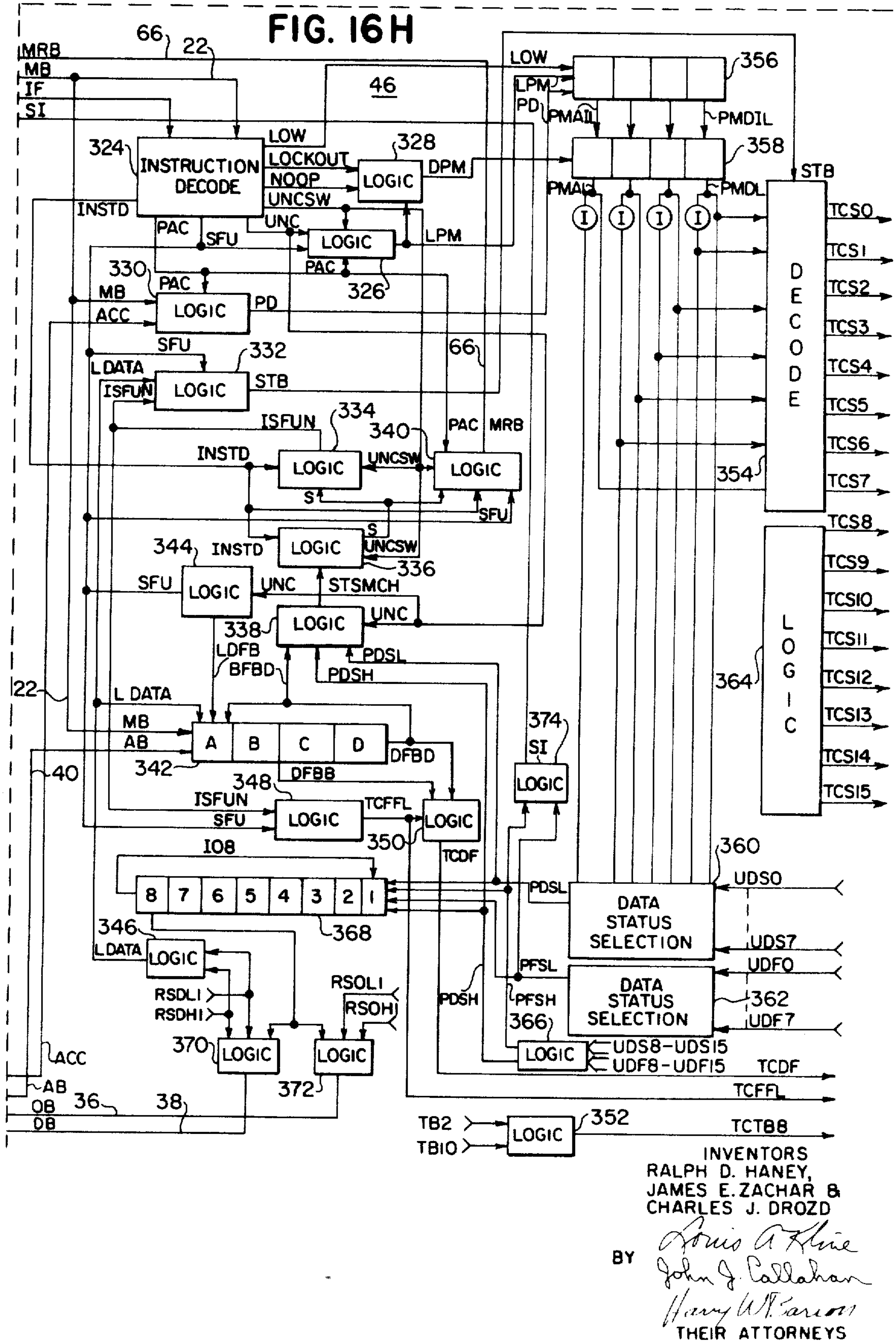

Referring now to FIG. 16H, there is shown a detailed diagram of the input/output means 46. The input/output means 46 provides 16 signals, TCSO through TCS15. Each of these 16 signals is connected to one of the peripheral units which may be associated with the digital processor 10. Hereinafter, the term "port" will be used to mean a place to which one of the 16 possible peripheral units can be attached. These 16 signals TCS0 through TCS15 may be thought of as the port select signals. When one of these signals is turned on, the response of the port to which that signal is applied comes under the control of the digital processor 10. The input/output circuitry 46 also has 16 data/status lines to receive 16 data/status signals, UDSO through UDS15, and 16 data flag lines to receive sixteen data flag signals, UDF0 through UDF15, from the peripheral units connected to the ports. The signal which is normally sent on one of the data/status lines from a particular port is indicative of the coded status of that particular port at that given time unless the data flag signal from that port is high. In this event, the data/status line is carrying data information being applied to the digital processor 10 from that particular port. In addition to transmitting the 16 TCS0 through TCS15 port select signals, the input/output means 46 also sends to each of the ports the TCDF data/function signal, which is a signal that conveys either eight bits of data information or eight bits of function information. Also, the TCFFL function flag signal is sent, which in a low state indicates that the TCDF signal is data and in a high state indicates that the TCDF signal is function information. Finally, the input/output means 46 transmits a TCTB8 signal to each of the sixteen peripheral units which are connected to the 16 ports. The TCTB8 signal is merely a timing signal to synchronize the timing of the peripheral units with the timing of the digital processor 10.

The input/output means 46 includes an instruction decode circuit 324, which is responsive to the signal appearing on the memory buss 22 and the IF instruction flag signal applied from the logic circuit 188 in FIG. 16B. In response to these two signals, the instruction decode circuit 324 provides a PAC signal, an SFU signal, and an UNC signal in response to these three types of instruction signals appearing on the memory buss 22. In addition, the instruction decode circuit 324 provides a LOW signal, a LOCKOUT signal, an NOOP signal, a UNCSW signal, and an INSTD signal. The logic equations for the instruction decode circuit 324 are:

SFU = (TP16 + SFU((MB(TP1+TP4)+MB/(TP2 +TP3))
IF + IF/ TP1/))TCIR (1-3)
UNC = (TP16+UNC((MB(TP1+TP3+TP4)+MB/ TP2
IF + IF/ TP1/))TCIR/ (1-3)
UNCSW = (UNC TP16 + UNCSW TP16/)TCIR/ (1-3)
PAC = TP16 + PAC(IF MB/+IF/TP1) (1-3)
NOOP = PAC TP6 (MB+INSTD/) + NOOP TP16/ (1-3)
INSTD = MB (1-3)
REMTOLOCK = PAC TP6 MB/ INSTD + REMTOLOCK TP16/ (1-3)
LOCKOUT = TCIR/(REMTOLOCK TP16 + LOCKOUT(INSTD + (PAC TP6 MB)/)) (1-3)

As seen from these equations, the SFU signal is unconditionally reset by the TCIR signal. The same is true for the UNC signal. Assuming that the TCIR signal is false, then the SFU signal is set after time TP16. If the SFU instruction operation code 1-0-0-1 is present on the memory buss 22 during the next four bit times (TP1 through TP4) and if the IF signal is true, then the SFU signal will be provided. When the IF signal goes false at the end of time TP4, the SFU signal, if set, will hold until the following TP1. The UNC signal works the same way for the UNC instruction operation code 1-1-a0-1. The UNCSW signal is the UNC second word signal and is set after time TP16 and the UNC signal and reset with the following TP16 timing signal. The UNCSW signal therefore remains true for the second 16 bit times of the UNC instruction signal. The PAC signal is set after each TP16 time and holds as long as the signal on the memory buss is 0-0-0-0 during times TP1 through TP4, and the IF signal is high. If the PAC signal is not reset by time TP4 by a logical "1" appearing on the memory buss 22, it will hold until the following TP16 time.

The NOOP, the REMTOLOCK, and the LOCKOUT signals are associated with the PAC command. The NOOP signal is set for all cases except where the C code of the PAC command is equal to 00000001; that is, for all PAR subinstructions. The REMTOLOCK signal is set only when the C code of the PAC instruction is equal to 00000001; that is, the PAL subinstruction. It subsequently sets the LOCKOUT signal at TP16, which is reset by the occurrence of a PAR subinstruction signal. The INSTD signal is the signal on the memory buss 22 delayed 1 bit time. The remaining signal in the above logical equations is the LOW signal, which may be either a logical "1" or a logical "0," and this respectively determines whether the low order eight ports are being selected or whether the high order eight ports are being selected. The LOW signal is hard wired to be either a logical "0" or a logical "1" to inform the circuits to which it is applied whether they are to be associated with the eight low order ports (logical "1") or the eight high order ports (logical "0").

The logic circuit 326 is responsive to the UNCSW signal, the UNC signal, the SFU signal, and the PAC signal, and it provides an LPM signal according to the equation:

LPM = TP5 (UNC UNCSW/ + SFU + PAC) + LPM TP9/ (1-3)

The LPM signal is turned on after time TP5 and remains on through time TP9 whenever the PAC, the SFU, the UNC, or the UNCSW signals occur.

The logic circuit 328 is responsive to the LOCKOUT signal, the NOOP signal, and the LPM signal to provide the DPM signal. This signal can be on only during the TP9 time when the LPM signal is on and both the LOCKOUT signal and the NOOP signal are false. The DPM signal prohibits the port memory transfer, as will be explained hereinafter. Its equation is:

DPM = TP9 LPM LOCKOUT/ NOOP/ (1-3)

The logic circuit 330 is responsive to the signals appearing on the memory buss 22, the signals provided by the accumulator register 56, and the PAC signal, and it provides the PD signal according to the logical equation:

PD = MB PAC/ + ACC PAC (1-3)

This signal shows that the accumulator register 56 output signal, ACC, is to be put into the port memory when the PAL subinstruction is being applied on the memory buss 22.

The logic circuit 332 is responsive to the SFU signal, the LDATA signal, and the ISFUN signal, which will be described hereinafter, and it provides an STB signal according to the logical equation:

STB = TP10 (SFU + ISFUN) + LDATA TP2 + STB TP2/ TP10/ (1-3)

The STB signal is set by either the SFU signal or the ISFUN signal after time TP10, and it calls for transmission of functions for the SFU instruction and the UNC instruction, respectively. The STB signal is reset at the following TP2 time unless the LDATA signal is true, in which case it is reset at the following TP10 time.

The ISFUN signal which is applied to the logic circuit 332 is provided by the logic circuit 334 in response to the INSTD signal, the UNCSW signal from the instruction decode circuit 324, and an S signal which is provided from the logic circuit 336. The logic circuit 336 provides the S signal in response to the INSTD signal, the UNCSW signal, and an STSMCH signal applied thereto from the logic circuit 338. The logic circuit 338 is responsive to the UNC signal from the instruction decode circuit 324 and also to a PDSL signal, a PDSH signal, and a DFBD signal, all of which will be described hereinafter. The logic equations for the logic circuits 334, 336, and 338 are:

STSMCH = TP16 UNC+STSMCH(DFBD(PDSL +PDSH) + DFBD/ (PDSL+PDSH)/)Tp5/ (1-3)

S = STSMCH TP5 + UNCSW TP6(S INSTD/ + S/ INSTD) + S(UNCSW (TP6+TP13))/ (1-3)

ISFUN = UNCSW(TP7 INSTD S + ISFUN) (1-3)

The STSMCH signal is provided when the status code of the UNC instruction is the same as the status code provided to the digital processor 10 from the unit connected to the port selected by the P code of the UNC instruction. The instruction status code appears as the DFBD signal, and the unit status signal is one of the PDSL or PDSH signals. The comparison is to take place from the TP1–TP4 times of the second character of the UNC instruction. The STSMCH signal is set after TP16 time when UNC is true, and it is held as long as the DFBD signal is the same value as the one of the PDSL or PDSH status signals provided. The S signal samples the condition of the STSMCH signal at time TP5 just after the port status and instruction S codes are compared. The S signal is set if all four bits of the DFBD and the selected one of the PDSL or PDSH signals compare. At time TP6, the S signal is allowed to reset unless it is set by the second term of the equation. It will be reset if the current value of the S signal is opposite to the T code of the UNC instruction. This is the condition for not taking the relative branch but going on to execute the next sequential instruction command if the unit status equals the S code. Therefore, from TP7 until TP13, when the S term is again allowed to reset, the S signal represents the condition for not branching. Where a function is to be issued to a particular port, the ISFUN signal is turned on, and it is set to remember to issue the function.

The logic circuit 340 is responsive to the INSTD, the PAC, the UNCSW, and the SFU signals from the instruction decode circuit 324 and the S signal from the logic circuit 336. In response to these signals, the logic circuit 340 provides a pulse at the proper time on the memory response buss 66. The logical equations for the logic circuit 340 are set forth below:

RB=(TP13(SFU+PAC+UNCSW S)
+TP7 UNC UNCSW/+UNCSW TP6
(INSTD S+INSTD/ S/))/ (1-2-3)
MRB==(RB)/ (1)

The response "read next instruction" is given at time TP14-½ for the SFU instruction, the PAC instruction, and the second word of the UNC instruction when the S signal is true, as shown by the first term of the equation for RB. Note that there is a one-and-one-half-bit delay between the time the bit is tested to come on (at time TP13) and the time it does come on (at time TP14-½), due to the "1–2–3" gate combination. The response "read next word" is given for the first word of the UNC instruction, as shown by the second term of the RB equation at time TP8-½. The response for "take relative branch" is given at time TP7-½ for the second word of the UNC signal when the T code of this instruction which occurs during time TP5 is the same value as S just after the STSMCH is sampled at time TP5, as shown by the third term of the RB equation.

There is also a four bit data/function buffer shift register 342 having stages A, B, C, D in order from least significant to most significant. The output of each stage is a DFB_ signal, where the letter of the stage is inserted in the blank. The input to stage A of the data/function buffer 342 is the signal appearing on the memory buss 22 and the signal appearing on the arithmetic buss 40, the LDATA signal, the LDFB signal provided by the logic circuit 344, and the DFBD signal provided by the output of the D state of the data/function buffer 342. The logic circuit 344 is responsive to the SFU and the UNC signals provided from the instruction decode circuit 324 and provides the LDFB signal in response thereto. The logic circuit 346 is responsive to the RSDL1 and the RSDH1 signals and provides the LDATA signal in response thereto. The logical equations for the data/function buffer 342 and for the logic circuits 344 and 346 are:

DFBA = LDFB MB + LDATA AB + LDFB/ LDATA/ DFBD (1-3)
DFBB=DFBA (1-3)
DFBC=DFBB (1-3)
DFBD=DFBC (1-3)
LDFB=TP8(SFU+UNC)+TP16 UNC
+LDFB TP4/ TP12/ (1-3)
LDATA/=(RSDH1+RSDL1)(TP6+LDATA) (1-3)

The logic circuit 348 is responsive to the ISFUN signal provided from the logic circuit 334 and the SFU signal provided from the instruction decode circuit 324, and it provides TCFFL function flag signal. The logic circuit 350 is responsive to the TCFFL signal from the logic circuit 348 and the DFBB and DFDD signals provided from the B and D stages of the data/function buffer 342. In response to these signals, the logic circuit 350 provides the data/function TCDF signal to the selected port. The logical equations for the logic circuits 348 and 350 are:

TCDF=TCFFL DFBB+TCFFL/ DFBD (1-3)
TCFFL=TP11 (SFU+ISFUN)+TCFFL TP3/ (1-3)

The data/function signal TCDF provided by the logic circuit 350 carries two types of information to the 16 peripheral units which may be connected to the digital processor 10. The first type is data information which has been moved from a register to the input/output register of the input/output means 46. The second type of information is function information which is contained in bits *b*9 through *b*12 of the SFU instruction signals appearing on the memory buss 22 or in bits *b*1 through *b*4 of the second word of the UNC instruction signal appearing on the memory buss 22. Both types of the information carried on the TCDF line must first be buffered by the data/function buffer 342 to align them with the TCTB8 timing signal which is provided by the logic circuit 352 according to the equation:

TCTB8=TP2+TP10 (1-3)

This signal is sent to each of the peripheral units as a system timing signal to synchronize their timing. The TCTB8 signal is merely the TP2 or the TP10 signals, whichever is occurring. Thus, a bit appears on TCTB8 once every eight bit times, which is the timing by which the peripheral units coupled to the digital processor 10 will be controlled.

The loading of the data/function buffer 342 will now be described. The signal appearing on the memory buss 22 is loaded into the data/function buffer 342 whenever the LDFB signal is true. This occurs from time TP9 through TP12 for the SFU commands and from times TP1 through TP4 for the second word of the UNC commands. The LDFB signal is also true from time TP9 through TP12 of the first character of the UNC instruction signal, so that the status or S code thereof can be loaded into the data/function buffer 342. This status must be delayed to make it coincide with the status coming from the units and data/function buffer 342 is used for this purpose.

The LDATA signal is normally false, since neither the RSDH1 or the RSDL1 signals is true except in the case when the input/output register of the input/output means 46 is selected as a destination register. Therefore, the LDATA/signal is normally true and has no effect on the equation under this situation. However, when the RSDL1 and RSDH1 signals are true, the LDATA/signal will be false one bit time later and will remain false until the following TP6 time. The data which is applied to the arithmetic buss 40 will be occurring from time TP15 through the following time TP6. The LDATA/term is false for these eight bit times which frames the data on the arithmetic buss 40. The arithmetic buss data passes through the data/function buffer 342 whenever the input/output means 46 is selected as a destination register. In this manner, the data/function buffer 342 is acting as a four-bit delay when data is to be transferred to one of the peripheral units.

As the data or function information is being applied through the data/function buffer register 342, a determination must be made whether this is function or data information. The TCFFL function flag signal provided by the logic circuit 348 makes this determination. When this signal is true, the information passing through the data/function buffer 342 is function information, and, when this signal is false, the information is data information. The signal would be true, for instance, from time TP12 to the following time TP3 for the SFU instruction signal. Also, if the ISFUN signal is true, the TCFFL signal will be true from time TP12 through the following TP3 time for the second word of the UNC instruction.

The appropriate one of the port select strobe output signals, TCSO through TCS15, must be raised whenever function or data information is being sent on the TCDF line. The strobe signals TCS0 through TCS7 are provided from a decode circuit 354, which has associated therewith four-bit storage registers 356 and 358, a data/status selection circuit 360, and a data flag selection circuit 362. The data/status selection circuit 360 is responsive to the UDS0 through UDS7 signals applied from the units connected to the low order seven ports, and the data flag selection circuit 362 is responsive to the UDFO through UDF7 signals provided from the units connected to the low order seven ports.

The circuits 354, 356, 358, 360, and 362 are all associated with the low order (zero through seven) ports. Identical circuits are provided, but not shown in detail in FIG. 16H, for the high order ports (eight through fifteen). These circuits are a logic circuit 364, which corresponds to the decode circuit 354 and two four-bit port storage registers 356 and 358, and a logic circuit 366, which corresponds to the data/status selection circuit 360 and the data flag selection circuit 362. The logic circuit 364 applies the TCS8 through TCS15 signals, and the logic circuit 366 is responsive to the UDS8 through UDS15 and the UDF8 through UDF15 signals. The operation of the logic circuits 364 and 366 is identical with the operation and structure of the decode circuits 354, the four-bit port storage registers 356 and 358, the data/status selection circuit 360, and the data flag selection circuit 362, and a description, other than this, for the circuits 364 and 366 will not be given.

The most significant stage of the four-bit initial port memory storage register 356 is responsive to the low signal and the PD signal. Each stage is responsive to the LPM SIGNAL. The initial port memory storage register 356 provides from its four bit positions the PMAIL, the PMBIL, the PMCIL, and the PMDIL signals, respectively. These four signals are applied to the respective four stages of the four-bit final port memory storage register 358, along with the DPM signal. Each stage from the final port memory storage register 358, respectively, provides a PMAL PMBL PMCL, PMDL signal.

The PMAL through PMDL signals and the inverted versions of the PMBL through PMDL signals are all applied to the decode circuit 354, which decodes these signals to provide respective TCSO through TCS7 strobe signals which are subsequently applied to the units connected to the ports zero through seven. The TCSO through TCS7 signals cause these units to know that they are being selected.

The PMBL through PMDL signals and the inverted PMAL through PMDL signals are all applied to the data status selection circuit 360 and to the data flag selection circuit 362.

The logical equations for the circuits 354, 356, 358, 360, and 362 are:

PMAIL = LPM(PD LOW+PD/ LOW/)+LPM/ PMAIL (1-3)
PMBIL = LPM PMAIL+LPM/ PMBIL (1-3)
PMCIL = LPM PMBIL + LPM/ PMCIL (1-3)
PMDIL = LPM PMCIL + LPM/ PMDIL (1-3)
PMAL = DPM PMAIL + DPM/ PMAL (1-3)
PMBL = DPM PMBIL + DPM/ PMBL (1-3)
PMCL = DPM PMCIL + DPM/ PMCL (1-3)
PMDL = DPM PMDIL + DPM/ PMDL (1-3)
TCSO = STB/ + PMAL + PMBL + PMCL + PMDL (1-3)
TCS1 = STB/ + PMAL + PMBL + PMCL + PMDL/ (1-3)
TCS2 = STB/ + PMAL + PMBL + PMCL/ + PMDL (1-3)
TCS3 = STB/ + PMAL ± PMBL + PMCL/ + PMDL/ (1-3)
TCS4 = STB/ + PMAL + PMBL/ + PMCL + PMDL (1-3)
TCS5 = STB/ + PMAL + PMBL/ + PMCL + PMDl/ (1-3)
TCS6 = STB/ + PMAL + PMBL/ + PMCL/ + PMDL (1-3)
TCS7 = STB/ + PMAL + PMBL/ + PMCL/ + PMDL/ (1-3)
PDSL = PMAL/ (PMBL/ (PMCL/ (PMDL/ UDSO + PMDL UDS1) + PMCL (PMDL/ UDS2 + PMDL UDS3)) + PMBL (PMCL/ (PMDL/ UDS4 + PMDL UDS5) + PMCL (PMDL/ UDS6 + PMD UDS7))) (1-3)
PFSL = PMAL/ (PMBL/ (PMCL/ (PMDL/ USF0 + PMDL UDF1) + PMCL (PMDL/ UDF2 + PMDL UDF3)) + PMBL (PMCL/ (PMDL/ UDF4 + PMDL UDF5) + PMCL (PMDL/ UDF6 + PMDL UDF7))) (1-3)

Although the high order circuits, which are shown generally by the logic circuits 364 and 366, are not going to be described in detail herein, the logic equations for these circuits are:

PMAIH = LPM (PD LOW + PD/ LOW/) + LPM/ PMAIH (1-3)
PMBIH = LPM PMAIH + LPM/ PMBIH (1-3)
PMCIH = LPM PMBIH + LPM/ PMCIH (1-3)
PMDIH = LPM PMCIH + LPM/ PMDIH (1-3)
PMAH = PMAIH DPM + DPM/ PMAH (1-3)
PMBH = PMBIH DPM + DPM/ PMBH (1-3)
PMCH = PMCIH DPM + DPM/ PMCH (1-3)
PMDH = PMDIH DPM + DPM/ PMDH (1-3)
TCS8 = STB/ + PMAH + PMBH/ + PMCH/ + PMDH/ (1-3)
TCS9 = STB/ + PMAH + PMBH/ + PMCH/ + PMDH (1-3)
TCS10 = STB/ + PMAH + PMBH/ + PMCH + PMDH/ (1-3)
TCS11 = STB/ + PMAH + PMBH/ + PMCH + PMDH (1-3)
TCS12 = STB/ + PMAH + PMBH + PMCH/ + PMDH/ (1-3)
TCS13 = STB/ + PMAH + PMBH + PMCH/ + PMDH (1-3)
TCS14 = STB/ + PMAH + PMBH + PMCH + PMDH/ (1-3)
TCS15 = STB/ + PMAH + PMBH + PMCH + PMDH (1-3)

$$PDSH = PMAH/PMBH/(PMCH/(PMDH/\ DS15 + PMDH\ DS14 + PMCH(PMDH/\ DS13 + PMDH\ DS12)) + PMBH(PMCH/(PMDH/\ DS11 + PMDH\ DS10) + PMCH(PMDH/\ DS9 + PMDH\ DS8))) \quad (1\text{-}3)$$

$$PFSH = PMAH/(PMBH/(PMCH/(PMDH/\ DF15 + PMDH\ DF14) + PMCH(PMDH/\ DF13 + PMDH\ DF12)) + PMBH(PMCH/(PMDH/DF11 + PMDH\ DF10) + PMCH(PMDH/\ DF9 + PMDH\ DF8))) \quad (1\text{-}3)$$

The port data PD signal, which is the four-bit code for the port to be selected, is applied into the initial port memory storage register 356. This register will be held bit static as long as the LPM (load port memory) signal remains false. The DPM (dump port memory) signal, when true, will force a parallel shift into the final port memory register 358. At this time, the output signals PMAL–PMDL from the final port memory storage register 358 will be provided to the decoder circuit 354, and the appropriate one of the TCSO through TCS7 signals will be sent.

The data status selection circuit 360 is a logic tree type of selector. The data/status line which is connected from the selected port will appear as the PDSL signal one bit time after it has been applied to the data/status selection circuit 360. All other data/status lines which are applied to the data/status selection circuit 360 will be blocked. The data flag selection circuit 362 acts in the same way and provides a PFSL signal in response to the one of the data flag signals UDFO through UDF7 which is provided from the selected port. The remaining ones of the UDF0 through UDF7 signals which are applied from the non-selected ports will be blocked.

The logic circuit 366, in response to the UDS8 through UDS15 and the UDF8 through UDF15 signals, will provide a PFSH and a PDSH signal, in the same manner as the circuits 360 and 362 provided the PDSL and the PFSL signals.

Each of the PDSL, PFSL, PDSH, and PFSH signals are applied to the first stage of an eight-stage input/output buffer register 368. The output of the eighth stage is also applied as the input of the first stage. The logic equations for the input/output buffer register 368 are:

$$I01 = PFSH\ PDSH + PFSL\ PDSL + (PFSH + PFSL)/\ I08 \quad (1\text{-}3)$$
$$I02 = I01 \quad (1\text{-}3)$$
$$I03 = I02 \quad (1\text{-}3)$$
$$I04 = I03 \quad (1\text{-}3)$$
$$I05 = I04 \quad (1\text{-}3)$$
$$I06 = I05 \quad (1\text{-}3)$$
$$I07 = I06 \quad (1\text{-}3)$$
$$I08 = I07 \quad (1\text{-}3)$$

The output from the eighth stage of the input/output buffer 368 is applied as one input to each of the logic circuits 370 and 372. The logic circuit 370 also has applied thereto the RSDL1 signal and the RSDH1 signal. The logic circuit 372 also has applied thereto the RSOL1 and the RSOH1 signals. The logic circuit 370 applies its output to the destination buss 38, and the logic circuit 372 applies its output signal to the origin buss 36. The equations for the logic circuits 370 and 372 are:

$$OB = (RSOH1 = RSOL1 + I08(PFSH + PFSL)/ + PFSH\ PDSH + PFSL\ PDSL)/ \quad (1)$$

$$DB = (RDSH1 + RDSL1 + I08\ (PFSH + PFSL)/ + PFSH\ PDSH + PFSL\ PDSL)/ \quad (1)$$

When information in the form of either data or status is sent from one of the units coupled to the digital processor 10, this information is buffered in the input/output buffer 368. It remains stored in the input/output buffer 368 until it is called for by another command, such as an MOV command, instructing the information to be moved from the input/output buffer 368 to another location in the digital processor 10. In this case, the input/output register 368 is selected as either a destination register or an origin register, and the appropriate one of the logic circuits 370 or 372 applies the data to either the origin buss 36 or the destination buss 38.

The logic circuit 374 has applied thereto the PFSL signal and the PFSH signal, and it provides the SI signal in response to the signals in accordance with the logical equation:

$$SI = (PFSL + PFSH)\ (TP2 + TP10) \quad (1\text{-}3)$$

The SI signal is applied to the eighth stage of the indicator register 62. Thus, bit *b8* of the indicator register 62 is set whenever the input/output register 368 is loaded.

What is claimed is:

1. A digital processor comprising
   read-only memory means for providing a serial sequence of instruction signals in a serial-by-bit manner to a memory buss;
   a plurality of storage registers each of which can assume a condition manifesting the storage thereby of at least one character of information, each of said registers being capable of being selected to provide a stored signal indicative of a stored character of information in a serial-by-bit manner to at least one of either a destination buss or an origin buss, each of said registers further being capable of being selected to respond to a signal appearing on an arithmetic buss;
   register selection means responsive to certain first ones of said instruction signals for selecting at least one of (1) a register to provide signals to said origin buss, (2) a register to provide signals to said destination buss, or (3) at least one register which responds to the signals on said arithmetic buss;
   one of said registers further having associated therewith logic means responsive to certain second ones of said instruction signals appearing on said memory buss to affect the condition of said register and responsive to certain other of said instruction signals to provide signals to said read-only memory means indicating the condition of said one register.

2. The invention according to claim 1 wherein said read-only memory means includes means responsive to certain of the signals provided to said read-only memory means by said one register for affecting the sequence of the instruction signals provided by said read-only memory means.

3. The invention according to claim 2:
   wherein said signal is provided to said read-only memory from said one register through a memory response buss; and wherein said register selection means provides a signal to said read-only memory means through said memory response buss.

4. The invention according to claim 1 wherein said one register is always selected along with another one of said registers to be responsive to the signal appearing on said arithmetic buss for selected ones of said certain first instruction signals.

5. The invention according to claim 4 wherein said processor further includes an adder/subtractor means which responds to the occurrence of any one of said selected ones of said certain first instruction signals, in such a manner that any signals caused to appear on at least one of said origin buss or said destination buss are processed thereby in a predetermined manner in accordance with which particular one of said selected certain first instruction signals occurs, said adder/subtractor means thereafter providing a signal to said arithmetic buss.

6. The invention according to claim 5:

wherein said register selection means and said adder/subtractor means respond to a first one of said selected ones of said certain first instruction signals to cause information signals to be applied from a selected origin register through said origin buss to said adder/subtractor means and from a selected destination register through said destination buss to said adder/subtractor means, said adder/subtractor means adding the information manifested by the origin buss and destination buss signals and applying a signal manifesting the added information through said arithmetic buss to said register selected to be responsive to said arithmetic buss signal and to said one register;

wherein said register selection means and said adder/subtractor means respond to a second one of said selected ones of said first instruction signals to cause information signals to be applied from a selected origin register through said origin buss to said adder/subtractor means and from a selected destination register through said destination buss to said adder/subtractor means, said adder/subtractor means subtracting the information manifested by the signal appearing on said origin buss from the information manifested by the signal appearing on said destination buss and applying a signal manifesting the subtracted information through said arithmetic buss to said register selected to be responsive to said arithmetic buss signal and to said one register; and wherein said register selection means and said adder/subtractor means respond to a third one of said selected ones of said instruction signals to cause information signals to be applied from a selected origin register through said origin buss to said adder/subtractor means, said adder/subtractor means causing a signal manifesting the same information to be applied through said arithmetic buss to a register selected to be responsive to said arithmetic buss signal and to said one register.

7. The invention according to claim 6:

wherein said first, second, and third ones of said selected first instructions include codes designating the operation to be performed in response to the instruction being provided, which register is to be selected as a destination register to apply a signal to said destination buss and which register is to be selected as an origin register to apply a signal to said origin buss and to be responsive to the signal appearing on said arithmetic buss;

wherein said register selection means selects said origin and destination registers according to the codes which designate the registers to be selected as origin and destination of said instruction then being provided in the event said codes are not respectively a first certain number, including zero, and a second certain number, including zero, and performs the operation designated by the code designating said operation; and wherein said register selection means selects said origin and destination registers according to a code stored by said one register in the event the codes of said instruction then being provided which designate said origin and destination registers are respectively said first and second certain numbers, and performs the operation designated by the code designating said operation to be performed.

8. The invention according to claim 6:

wherein each of said selectable registers includes at least one stage, each of said stages being capable of storing a character of information; and wherein said signal applied to said destination buss from said selected destination register manifests the character stored in the most significant stage thereof, said information applied to said origin buss from said selected origin registers manifests the character stored in the most significant stage thereof, all other characters in said selected registers being increased one stage in significance.

9. The invention according to claim 8 wherein the signal manifesting information applied to said origin buss from said selected origin register is also applied to the least significant stage of said origin register to cause that information to be stored therein.

10. The invention according to claim 1:

wherein each of said selectable registers includes at least one stage, each of said stages being capable of storing a character of information;

wherein one of said instructions has first, second, and third portions which respectively convey information concerning an operation code, a register selection code, and a constant number code;

wherein, in the event neither said register selection code or said constant number code is respectively a second certain number, including zero, or a third certain number, including zero, said register selection means responds to said operation code portion of said one instruction by selecting a register according to the register selection code portion of said one instruction and by causing the characters stored by said selected register to be circularly shifted a number of character positions specified by the constant number code of said one instruction;

wherein, in the event said constant number coded portion of said one instruction manifests a first certain number, said register selection means responds to said operation code of said one instruction by selecting a register according to the register selection code of said instruction and clearing said selected register; and wherein, in the event said register selection code of said one instruction manifests said second certain number and said constant number code of said one instruction manifests said third certain number, said register selection means responds to said operation code of said one instruction by selecting a register according to a code stored in said one register and circularly shifting the characters in said selected register a given number determined by another code stored in said one register.

11. A digital processor comprising:

a memory buss;

a memory response buss;

an arithmetic buss;

an origin buss;

a destination buss;

read-only memory means for providing a serial sequence of coded instruction signals in a serial-by-bit manner to said memory buss;

a plurality of storage registers each of which can assume a condition manifesting the storage thereby of at least one coded character of information, each of said registers being capable of being selected to provide a signal manifesting a stored character of information in a serial-by-bit manner to at least one of either said origin buss or said destination buss, each of said registers further being capable of being selected to respond to a signal appearing on said arithmetic buss;

register selection means coupled to said memory buss, said memory response buss, said arithmetic buss, said origin buss, and said destination buss and responsive to first certain ones of said coded instruction signals appearing on said memory buss for selecting at least one of (1) a register to provide a signal to said origin buss, (2) a register to provide a signal to said destination buss, and (3) a register to respond to signals appearing on said arithmetic buss to store the character manifested by said arithmetic buss signal;

operating means coupled to said origin, destination, and arithmetic busses and to said register selection means for operating on signals appearing on said origin and destination busses in a manner determined by the response of said register selection means to an instruction signal and to apply a signal indicative of the results of the operation performed to said arithmetic buss; and accumulator register means coupled to said memory buss, said memory response buss, said origin buss, said destination buss, and said arithmetic buss, and to said register selection means for storing at least one coded character of information, said accumulator register means capable of being selected by said register selection means, said accumulator register means further being responsive to second certain ones of said coded instruction signals in a manner (1) to affect the coded condition of said character stored thereby or (2) to apply a signal through said memory response buss to said read-only memory means indicating the coded condition of said character stored thereby, said read-only memory means responding to said signal applied thereto from said accumulator register means to affect the sequence of said instruction signals provided thereby.

12. The invention according to claim 11 wherein said accumulator register means is selected to be responsive to a signal appearing on said arithmetic buss and to store the character manifested by that signal whenever one of said storage registers is selected to be responsive to said signal appearing on said arithmetic buss.

13. The invention according to claim 11:

wherein said second certain ones of said instruction signals each have first and second coded portions which respectively manifest an operation to be performed and a constant number associated with said operation to be performed;

wherein said second certain instruction signals, which have a first coded portion manifesting that the operation to be performed is to affect the coded condition of the character stored by said accumulator register means include instructions for causing (1) the constant number of said second portion to be stored by said accumulator register means, (2) the logical AND result of said constant number and said stored character to replace said stored character, and (3) the logical OR result of said constant number and said stored character to replace said stored character; and wherein said second certain instruction signals which have a first coded portion manifesting that a signal is to be applied to said read-only memory means indicating the coded condition of said character stored in said accumulator register means include instructions for causing said signal to be applied in the event (1) the stored character and the coded constant portion of said instruction signal are the same, or (2) the stored character has a logical bit of one type in each bit position that said constant has a logical bit of one type.

14. The invention according to claim 13:

wherein signals are applied to said memory response buss after said operating means has completed operating on the signals applied thereto and after said accumulator means has affected the condition of its stored character;

wherein said read-only memory means is inhibited from providing another instruction signal until at least after a signal is applied to said memory response buss; and wherein the signals applied to said memory response buss convey different meanings depending upon the time during which they are applied thereto.

15. A digital processor comprising:

read-only memory means having a plurality of multibit storage locations, there being a multibit coded instruction stored in each of said locations, said read-only memory means being responsive to a coded location selection signal which is applied thereto to provide a signal manifesting the coded information stored in a then selected location thereof, the code of said location selection signal determining said then selected location;

address control means including a counter which can have the count thereof changed by an incremental amount or a nonincremental amount, said address control means providing said location selection signal to said read-only memory means, the code of said location selection signal being a function of the then existing count of said counter, said address control means being capable of providing an address signal manifesting a function of the then existing count in said counter in response to a first one of said read-only memory signals being applied thereto, said first read-only memory signal causing the count in said counter to be nonincrementally changed; and return address register means responsive to said first read-only memory signal capable of performing at least one of (1) storing information which is a function of the address manifested by said address signal in response to an address signal applied thereto from said address control means, and (2) providing a return address signal which manifests the information being stored thereby to said address control means, said return address signal causing the count in said counter to nonincrementally change to a value which is a function of the information manifested by said return address signal.

16. The invention according to claim 15:

wherein said first read-only memory signal includes, as a portion thereof, coded information manifesting a constant value, including zero; and wherein said address control means is responsive to said first read-only memory signal to cause the count in said counter to change to a value which is the information manifested by said return address signal as modified by said constant value.

17. The invention according to claim 15:

wherein said first read-only memory signal causes said address signal to be provided by said address control means, said return address register means responding to said address signal by storing the information manifested by said address signal; an wherein the count in said counter is nonincrementally changed to a count manifested by the next sequential read-only memory signal.

18. The invention according to claim 15 wherein said first read-only memory signal causes said address signal to be provided by said address control means and causes said address control means to be responsive to said return address signal to cause the count in said counter to change to a value which is manifested by said return address signal.

19. The invention according to claim 18:

wherein said first read-only memory signal includes, as a portion thereof, a coded constant number, including zero; and wherein said counter changes its count to a value manifested by said return address signal, as modified by said constant number.

20. The invention according to claim 15 wherein said address control means is responsive to a said read-only memory signal, which includes, as a portion thereof, information manifesting a constant number, including zero, for causing the count of said counter to be modified by said constant number.

21. A digital processor capable of having connected thereto a plurality of peripheral units each of which can apply signals to or receive signals from said digital processor comprising:

a memory buss, a memory response buss, an arithmetic buss, an origin buss, and a destination buss, each of said busses being capable of coupling a serial-by-bit signal from one selected point in said digital processor to another selected point in said digital processor;

read-only memory means for providing instruction signals to said memory buss in response to instruction selection signals applied thereto;

instruction selection means responsive to signals applied thereto from said memory buss and said memory response buss for providing said instruction selection signals to said read-only memory;

a plurality of selectable storage registers each of which includes at least one stage in which a multibit digital character can be stored, each of said selectable storage registers being connected to said origin buss, said destination buss, and said arithmetic buss, each of said selectable registers being capable of being selected to apply a signal manifesting the character stored in the most significant stage thereof to one of either said origin buss or said destination buss, and when selected to apply a signal to said destination buss to store, as the least significant character thereof, the information manifested by the signal appearing on said arithmetic buss;

input/output means coupled to said memory buss, said memory response buss, said arithmetic buss, said origin buss, and said destination buss, including logic means responsive to said instruction signal capable of either applying signals to a selected one of said peripheral units or receiving signals from a selected one of said peripheral units, said selected peripheral unit being selected by said logic means responding to said instruction signal, said signal applied to said selected peripheral unit being determined by at least one of the response of said logic means to said instruction signal or said input/output means being selected to be responsive to the signal appearing on said arithmetic buss, said signal applied to said input/output means by said selected peripheral unit being either compared with a signal derived from said logic means response to said instruction signal or being applied to one of said origin or destination busses, in the event said signal applied to said input/output means is compared with said signal derived from said logic means response to said instruction signal, said logic means applying either a signal to said memory response buss indicating the results of the comparison or a signal, derived from said logic means responding to said instruction signal, to said selected peripheral unit; and operating means responsive to said instruction signal for selecting at least one of which selectable storage register is to apply signals to said origin buss, which selectable register is to apply signals to said destination buss, whether said input/output means is to be selected to apply a signal to said origin buss or said destination buss, or whether said input/output means is to be selected to be responsive to a signal appearing on said arithmetic buss, said operating means further being responsive to any signals appearing on said origin buss and said destination buss to apply a signal to said arithmetic buss after operating on said signals in accordance with a logical response to said instruction signal.

22. The invention according to claim 21 wherein said instruction signal appearing on said memory buss which causes said input/output means logic to respond thereto is one of a first or a second type, said first type including coded information manifesting the type of instruction, a peripheral unit to be selected, and a signal to be applied to said peripheral unit, said second type of instruction including coded information manifesting the type of the instruction, a peripheral unit to be selected, a code to be compared with the code manifested by a signal applied to said input/output means from the selected peripheral unit, a subinstruction code manifesting action required as a result of the comparison to be made, a code manifesting a signal to be sent to said peripheral unit for certain of said subinstruction codes when the comparison to be made is one result and a code manifesting a constant value which causes said instruction selection means to affect the instruction selection signal applied to said read-only memory means for said certain subinstruction codes where said comparison to be made is another result and where other of said subinstruction codes occur and the comparison to be made is one result.

23. The invention according to claim 22:

wherein said digital processor further includes an accumulator means which can be selected to apply a signal to either said origin buss or said destination buss manifesting a character of information stored thereby; and wherein said input/output means further is responsive to the provision of a third type of instruction signal on said memory buss for causing the logic means thereof to lock one peripheral unit thereto and perform any subsequent instruction signals with respect to said one peripheral unit regardless of any code manifesting a peripheral unit to be selected, said one peripheral unit being determined by said logic means response to a signal manifesting the code of the character stored in said accumulator means.

24. A digital processor comprising:

memory means for providing a sequence of serial by bit coded memory signals in response to the code of a program control signal applied thereto;

program control means for providing a coded program control signal in which the code thereof may be nonincrementally changed upon command of a branch signal;

logic means responsive to said coded memory signals for performing a logical operation and providing one of a series of signals, each signal of said series of signals occurring at a different time, one of said series of signals being said branch signal; and coupling means for coupling said logic means signal to said program control means, said program control means, in response to said branch signal nonincrementally changing the code of said program control signal.

25. The invention according to claim 24 wherein the code of said program control signal is changed in accordance with said sequence of coded memory signals whenever said branch signal is provided by said logic means.

26. The invention according to claim 24 wherein said logic means signals are pulse signals occurring at specified times and the response of said program control means to nonincrementally change the code of said program control signal occurs when said branch signal occurs at a first specified time.

27. The invention according to claim 30:

wherein said memory means stores a plurality of multibit digital words in sequentially ordered locations each of which are defined by the code of said program control signal; and wherein said program control means includes additional means coupled to said logic means and responsive to said logic means signal for identifying a word read from said memory means as being an instruction word to which said logic means is to respond or a branch word to which said program control means is to nonincrementally change the code of said program control signal, said additional means identifying said word read from said memory means in accordance with the time said logic means signal occurs.

28. The invention according to claim 27 wherein said logic means includes test register means which stores a given multibit digital word, said test register means being responsive to one of said instruction words that includes a multibit digital constant to determine if said given word has a certain relationship with said constant, said test register means providing a signal to said coupling means during a first given time whenever said certain relationship exists and providing a signal to said coupling means during a second given time whenever said certain relationship does not exist, said program control means responding to said test register means signal which occurs during said first given time by reading the next sequential word from said memory and causing said next sequential word to become the code of said following program control signal, said additional means identifying said next sequential word as being a branch word.

29. The invention according to claim 28 wherein said program control means includes means for ignoring said next sequential word in the event said test register means signal occurs during said second given time and reads the word following said next sequential word, said additional means including means for identifying said word following said next sequential word as an instruction word.

30. The invention according to claim 29 wherein said logic means includes other means which stores a multibit digital signal and responds to a two word instruction signal which includes a special coded portion in each word thereof, said other means responding to said first word by providing said logic signal to said coupling means during a third time and by determining whether the special coded portion of said first word is identical to the stored multibit signal, said program control means responding to said logic means signal occurring during said third time to cause the next sequentially ordered word to be read and not treated as an instruction signal, said logic means responding to said second word by providing said logic means signal to said coupling means during a fourth time in the event said determination was one way and providing said logic means signal to said coupling means during a fifth time in the event said determination was another way, said program control means responding to said logic means signal provided during said fourth time by altering the code of said program control signal by an amount determined by the special coded portion of said second word and said program control means responding to said logic means signal provided during said fifth time by incrementing by one the code of said program control signal.

31. The invention according to claim 30 wherein said fourth time occurs prior to the time said special coded portion of said second word is serially provided by said memory means.

* * * * *